United States Patent
Bardsley et al.

(10) Patent No.: US 8,382,485 B2
(45) Date of Patent: Feb. 26, 2013

(54) METHODS AND APPARATUS FOR PROVIDING REALISTIC MEDICAL TRAINING

(75) Inventors: Ryan Scott Bardsley, Andover, MA (US); Mark Peter Ottensmeyer, Cambridge, MA (US); Joseph Thomas Samosky, Newton, MA (US); Steven L. Dawson, Carlisle, MA (US)

(73) Assignee: The General Hospital Corporation, Boston, MA (US)

( * ) Notice: Subject to any disclaimer, the term of this patent is extended or adjusted under 35 U.S.C. 154(b) by 1227 days.

(21) Appl. No.: 12/067,260

(22) PCT Filed: Sep. 28, 2006

(86) PCT No.: PCT/US2006/037663
§ 371 (c)(1),
(2), (4) Date: Mar. 18, 2008

(87) PCT Pub. No.: WO2008/018889
PCT Pub. Date: Feb. 14, 2008

(65) Prior Publication Data
US 2008/0227073 A1 Sep. 18, 2008

Related U.S. Application Data

(60) Provisional application No. 60/721,848, filed on Sep. 29, 2005.

(51) Int. Cl.
G09B 23/28 (2006.01)
(52) U.S. Cl. .................. 434/262; 434/265; 434/267
(58) Field of Classification Search .............. 434/267
See application file for complete search history.

(56) References Cited

U.S. PATENT DOCUMENTS

| | | | | |
|---|---|---|---|---|
| 3,520,071 A | * | 7/1970 | Clark et al. | 434/265 |
| 3,564,729 A | * | 2/1971 | Ackerman | 34/266 |
| 3,620,611 A | * | 11/1971 | Parrent et al. | 353/20 |
| 3,947,974 A | * | 4/1976 | Gordon et al. | 434/266 |
| 4,331,426 A | * | 5/1982 | Sweeney | 434/265 |
| 4,588,383 A | * | 5/1986 | Parker et al. | 434/265 |
| 4,702,241 A | | 10/1987 | Gravenstein et al. | |
| 4,773,865 A | * | 9/1988 | Baldwin | 434/268 |
| 4,797,104 A | | 1/1989 | Laerdal et al. | |
| 4,915,635 A | * | 4/1990 | Ingenito et al. | 434/396 |
| 5,055,052 A | | 10/1991 | Johnsen | |

(Continued)

FOREIGN PATENT DOCUMENTS

| | | |
|---|---|---|
| EP | 1 215 993 B1 | 12/2004 |
| WO | WO 97/14462 | 10/1996 |

(Continued)

OTHER PUBLICATIONS

Lonsdale, P., and Vavoula, G. (2004). Research into current technology that could be applied to the design of learning spaces. Report prepared for JISC project "eSpaces: Study on how innovative technologies are influencing the design of physical learning spaces in the post-16 sector".*

(Continued)

Primary Examiner — Robert J Utama
(74) Attorney, Agent, or Firm — Quarles & Brady LLP

(57) ABSTRACT

Method and apparatus to provide simulation of a human casualty. In one embodiment an autonomous casualty simulator includes a processing module having a scenario progression controller and a physiological modeling system to receive sensor input and to control effectors. The autonomous casualty simulator can be contained in a nominal human mannequin form.

25 Claims, 26 Drawing Sheets

U.S. PATENT DOCUMENTS

| | | | |
|---|---|---|---|
| 5,137,458 A * | 8/1992 | Ungs et al. | 434/262 |
| 5,180,896 A | 1/1993 | Gibby et al. | |
| 5,259,764 A * | 11/1993 | Goldsmith | 434/267 |
| D350,563 S | 9/1994 | Eggert | |
| 5,391,081 A | 2/1995 | Lampotang et al. | |
| 5,403,192 A | 4/1995 | Kleinwaks et al. | |
| 5,419,706 A * | 5/1995 | Levy et al. | 434/409 |
| 5,509,810 A * | 4/1996 | Schertz et al. | 434/262 |
| 5,560,351 A | 10/1996 | Gravenstein et al. | |
| 5,584,701 A | 12/1996 | Lampotang et al. | |
| 5,769,641 A | 6/1998 | Lampotang et al. | |
| 5,772,442 A | 6/1998 | Lampotang et al. | |
| 5,772,443 A | 6/1998 | Lampotang et al. | |
| 5,779,484 A * | 7/1998 | Lampotang et al. | 434/266 |
| 5,853,292 A * | 12/1998 | Eggert et al. | 434/262 |
| 5,868,579 A | 2/1999 | Lampotang et al. | |
| 5,873,731 A | 2/1999 | Predergast | |
| 5,882,207 A | 3/1999 | Lampotang et al. | |
| 5,887,611 A | 3/1999 | Lampotang et al. | |
| 5,890,908 A | 4/1999 | Lampotang et al. | |
| 5,900,923 A * | 5/1999 | Prendergast et al. | 351/221 |
| 5,941,710 A | 8/1999 | Lampotang et al. | |
| 5,945,056 A * | 8/1999 | Day et al. | 264/250 |
| 5,947,744 A | 9/1999 | Izzat | |
| 5,975,748 A | 11/1999 | East, IV et al. | |
| 6,007,342 A | 12/1999 | Tjolsen | |
| 6,048,209 A * | 4/2000 | Bailey | 434/267 |
| 6,050,826 A * | 4/2000 | Christianson et al. | 434/262 |
| 6,135,105 A | 10/2000 | Lampotang et al. | |
| 6,161,537 A | 12/2000 | Gravenstein et al. | |
| 6,171,066 B1 | 1/2001 | Irokawa et al. | |
| 6,193,519 B1 | 2/2001 | Eggert et al. | |
| 6,273,728 B1 | 8/2001 | van Meurs et al. | |
| 6,428,321 B1 * | 8/2002 | Jurmain et al. | 434/238 |
| 6,461,165 B1 | 10/2002 | Takashina et al. | |
| 6,527,558 B1 * | 3/2003 | Eggert et al. | 434/262 |
| 6,535,714 B2 | 3/2003 | Melker et al. | |
| 6,545,660 B1 | 4/2003 | Shen et al. | |
| 6,575,757 B1 * | 6/2003 | Leight et al. | 434/273 |
| 6,597,948 B1 * | 7/2003 | Rockwell et al. | 607/5 |
| 6,638,073 B1 * | 10/2003 | Kazimirov et al. | 434/272 |
| 6,780,016 B1 * | 8/2004 | Toly | 434/262 |
| 6,910,896 B1 | 6/2005 | Owens et al. | |
| 6,957,961 B1 | 10/2005 | Owens et al. | |
| 6,969,259 B2 * | 11/2005 | Pastrick et al. | 434/265 |
| 7,021,940 B2 * | 4/2006 | Morris et al. | 434/268 |
| 7,114,954 B2 * | 10/2006 | Eggert et al. | 434/262 |
| 7,238,027 B2 * | 7/2007 | Kilvington et al. | 434/430 |
| 7,316,568 B2 * | 1/2008 | Gordon et al. | 434/262 |
| 7,350,704 B2 * | 4/2008 | Barsness et al. | 235/435 |
| 7,601,003 B2 * | 10/2009 | Quest et al. | 434/254 |
| 7,665,995 B2 * | 2/2010 | Toly | 434/262 |
| 7,811,090 B2 * | 10/2010 | Eggert et al. | 434/273 |
| 2001/0014772 A1 | 8/2001 | Lampotang et al. | |
| 2003/0040700 A1 | 2/2003 | Hickle et al. | |
| 2003/0043095 A1 * | 3/2003 | Silverbrook | 345/87 |
| 2003/0091968 A1 | 5/2003 | Eggert et al. | |
| 2003/0233049 A1 | 12/2003 | Lampotang et al. | |
| 2004/0126746 A1 * | 7/2004 | Toly | 434/262 |
| 2004/0157199 A1 | 8/2004 | Eggert et al. | |
| 2004/0234933 A1 * | 11/2004 | Dawson et al. | 434/262 |
| 2005/0100873 A1 * | 5/2005 | Meythaler et al. | 434/267 |
| 2006/0121430 A1 | 6/2006 | Winnike et al. | |
| 2007/0292829 A1 * | 12/2007 | King et al. | 434/268 |

FOREIGN PATENT DOCUMENTS

| | | |
|---|---|---|
| WO | WO 98/29154 | 7/1998 |
| WO | WO 99/42034 | 8/1999 |
| WO | WO 01/34024 A1 | 5/2001 |
| WO | WO 03/011377 A1 | 2/2003 |
| WO | WO 2005/032327 A3 | 4/2005 |
| WO | WO 2005/089848 A1 | 9/2005 |
| WO | WO/2005/096249 | 10/2005 |
| WO | WO 2005/012211 A1 | 12/2005 |
| WO | WO 2006/088373 A1 | 8/2006 |

OTHER PUBLICATIONS

PCT/US2006/037663 International Search Report dated Mar. 5, 2008.

Dag K.J.E. Von Lubitz, Klaus-Peter Beier, James Freer, Howard Levine, Timothy Pletcher, David Treloar, William Wilkerson, Eric Wolf, Simulation-based Medical Training; The Medical Readiness Trainer Concept and the Preparation for Civilian and Military Medical Field Operations, May 16-18, 2001, VRIC, Virtual Reality International Conference, Laval Virtual, University of Michigan Health System, Ann Arbor, MI 48109, USA.

Willem L. Van Meurs, Ph.D., Michael L. Good, M.D., Samsun Lampotang, Simulator and Training Device, Jun. 6, 1997, University of Florida, College of Medicine, Gainsville, Florida 32610-0254.

J. B. Cooper and V. R. Taqueti, "A brief history of the development of mannequin simulators for clinical education and training", Qual Saf Health Care 2004; 10(Suppl 1):i11-i18; 10.1136/qshc.2004.009886.

J. S. Denson, MD and Stephen Abrahamson, PhD, "A Computer-Controlled Patient Simulator", JAMA, Apr. 21, 1969, vol. 208, No. 3, pp. 504-508.

* cited by examiner

Coronal Plane      Sagittal Plane

METHODS AND APPARATUS FOR PROVIDING REALISTIC MEDICAL TRAINING

CROSS-REFERENCE TO RELATED APPLICATIONS

This application is a National Stage application of and claims the benefit of International Patent Application PCT/US2006/037663 filed Sep. 28, 2006, published in the English Language on Feb. 14, 2008, as WO2008/018889, which application claims benefit from U.S. Provisional Application No. 60/721,848, filed Sep 29, 2005, all of which are incorporated herein by reference.

STATEMENT REGARDING FEDERALLY SPONSORED RESEARCH

The Government may have certain rights in the invention pursuant to Department of Defense grant DAMD 17-02-2-0006, as amended with funds from Research Area Directorate II/Combat Casualty Care.

BACKGROUND

There a number of known medical simulation systems that are directed to particular training aspects. One such system is provided by Medical Education Technologies Inc.'s (METI, Sarasota, Fla.) known as HPS, directed to high level anesthesia and critical care training system. However, this system lacks portability and stand-alone capabilities. In addition, the HPS system does not realistically model trauma except as cardiopulmonary sequelae of hypovolemic states. The METI ECS is semi-portable, and the SAPS is a portable, instructor-initiated model-driven control environment that can be programmed to respond according to pre-programmed algorithms or can be manually overridden.

Also known in the art is a system provided by Laerdal Medical AS (Stavanger, Norway) including mannequin systems for first responder basic first aid resuscitation and Advanced Cardiac Life Support training. These systems lack accurate realism and require line-of-sight and an instructor to operate them. Laerdal also offers a base model (Tuff Terry) consisting of a rigid plastic human form that has no treatment responses to be used for modeling patient transport and extraction. Gaumard Scientific Company, Inc. (Miami, Fla.) produces HAL S3000, a mobile, instructor-driven model-based system that can be used for anesthesia and life support training in first responder and in-hospital training, however, it also requires line-of-site instructor operation and is not capable of use in harsh environmental conditions.

In the civilian world, many technical and medical specialties care for trauma victims, including Emergency Medical Technicians (EMTs), paramedics, police officers, fire and rescue teams, HAZMAT teams, nurses, surgeons, and emergency physicians. Homeland Security personnel, including those involved with mass casualty training, CBRNE event scenarios, community disaster teams and other emergency first responders must also be trained in emergency management and mass casualty skills. Training these specialists typically involves some interaction with a simulator. The civilian sector relies on training that includes a combination of simulated patients and real cases to provide the breadth of experience needed to be competent in providing medical care.

Medical simulation systems can be found in situations ranging from total team training, to individual procedure simulators, to basic skills development simulators. A system which encourages medic responsibility and allows for transfer-of-care enables a higher level of total team training. Recertification and reevaluation occur throughout the practitioner's career at regular intervals to ensure the care provided is based on up-to-date standards, and oftentimes to refresh skills.

It is believed that the three leading causes of preventable battlefield death are extremity hemorrhage, tension pneumothorax and airway complications. The leading causes of death because of combat wounds are:
Penetrating trauma: 31%
Uncorrectable chest trauma: 25%
Potentially correctable torso trauma: 10%
Exsanguination from extremity wounds: 9%
Mutilating blast trauma: 7%
Tension pneumothorax: 5%
Airway complications: 1%

Improvements in the training of the soldier medic could improve the killed in action (KIA) rates by 15-20%. Suggested critical tasks for medics to learn to higher proficiency include:
Conducting a rapid patient primary survey (Airway, Breathing, Circulation);
Inserting a nasopharyngeal airway and placing the casualty in the recovery position;
Treating life threatening chest injuries with occlusive dressings and being able to perform a needle decompression; and,
Controlling external hemorrhage.

Another recent development within the Army is the advent of the CLS (Combat Life Saver) program. The CLS course was established to provide for immediate, far-forward medical care on a widely dispersed battlefield while awaiting further medical treatment and evacuation. The proponent for the CLS course, the US Army Medical Department Center and School (AMEDDC&S), recently updated the CLS course to include skills that were recommended from lessons learned in Operations Iraqi Freedom and Enduring Freedom. These revisions include instruction in:
Decision-making skills for treating a casualty when under fire, when not under fire, and during casualty evacuation (tactical combat casualty care or TC3).
Use of the emergency trauma dressing (ETD; a.k.a. Israeli Bandage), an improvement from the old field dressing. The ETD contains elastic ties that ensure the ability to create a functional pressure dressing.
Use of the combat-application tourniquet (CAT), an improvement from the cravat-and-stick tourniquet. The CAT has self-contained components and can be applied with one hand.
Insertion of the nasal airway for treating a casualty with facial injuries or profound levels of unconsciousness.
Use of a large-bore needle to relieve air from a casualty's chest cavity when a chest wound, with collapsed lung, causes cardiovascular compromise (a tension pneumothorax).
Employment of the SKED litter, a kind of rigid plastic wrap-around litter that can be carried or dragged.

BRIEF DESCRIPTION OF THE DRAWINGS

The exemplary embodiments contained herein will be more fully understood from the following detailed description taken in conjunction with the accompanying drawings, in which.

DETAILED DESCRIPTION

The present invention provides methods and apparatus for simulating a human casualty where mechanisms, power sources, and process controls are self-contained within the shape and volume of a nominally-sized human form allowing a person to locate, diagnose, treat, observe a change in condition of, and transport the simulated casualty, outside of the line-of-sight of an instructor and without the necessity of someone operating the simulator. This autonomous systems design places the medic at the center of a sensor-processor-effector loop.

Figure 1:
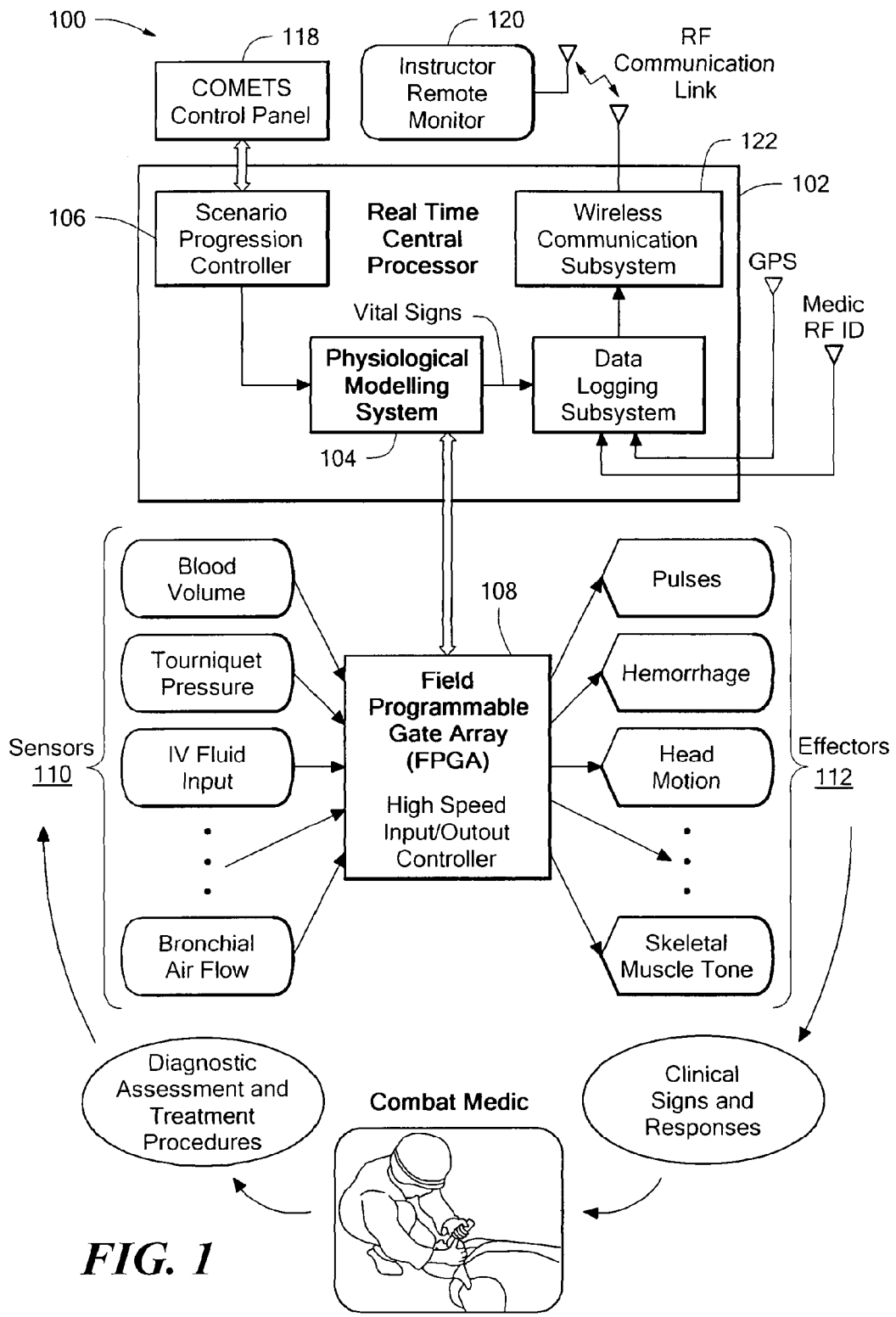
FIG. 1. is a top level schematic depiction of an overall architecture of an autonomous casualty simulator in accordance with an exemplary embodiment of the invention.

FIG. 1 shows an exemplary system 100 having a central processor module 102 having a physiological modeling system 104 coupled to a scenario progression controller 106. The physiological modeling system 104 can include a controller 108 to receive sensor data 10 for diagnostic assessment and control effectors 112 to provide simulated physiological responses, as described in detail below. In one embodiment, the controller 108 is implemented in a field programmable gate array (FPGA).

In general, sensors 110 detect and measure the medic's diagnostic and treatment procedures, the controller 108 computes physiological responses based on pre-programmed physiological models, and effectors 112 display clinical signs and responses back to the medic. The medic "closes the loop": medic decisions and actions directly determine the fate of the simulated casualty. To achieve this high level of self-contained patient simulation, an embedded real-time central computer processor autonomously controls the system.

In an exemplary embodiment, the system is self-contained. As used herein, self-contained means that the elements needed to effect physiological simulation during use are contained within the mannequin. The term self-contained does not preclude communication, such as wireless communication/control, with the system, such as by an instructor.

Before describing the invention in detail, some general information on the invention system is provided. Invention embodiments are referred to as an Autonomous Casualty Simulator (ACS). This is not intended to be limiting, but rather, to convey a general concept for the illustrative embodiments contained herein. In one embodiment, the Autonomous Casualty Simulator (ACS) is the height and weight of a nominal adult male (approximately 72" tall and 190 lbs). In one embodiment, the structural system is an articulated skeletal chassis, which is accurately jointed to enable mobility and range of motion similar to a real human skeleton. Covering the skeleton and the internal mechanical and computational components of the ACS is a modeled representation of the relevant muscles and skin covering needed to accurately depict the outer structure of an adult male. The user preconfigures the system for operation by setting controls on the ACS Control Panel 118 located on the lower back of the chassis. The scenario progression controller 106 (FIG. 1) generates a sequence of trauma events (hemorrhage, airway constriction, hemothorax, etc.) resulting in the high-fidelity simulation of a particular trauma case. The central processor 102 logs and timestamps data, including vital signs, medic radio frequency identification (RFID) and global positioning system (GPS) coordinates. The ACS unit also can communicate with an instructor remote monitor 120 via a wireless radio frequency (RF) link 122.

One characteristic of the ACS system is responsiveness. The ACS can provide an interactive experience to the medical trainee by actively sensing (1) applied interventions; and, (2)

its own internal physiological state. This is achieved by incorporating a set of sensors that communicate with the central programmable controller. Sensors are included to monitor medic actions and interventions including but not limited to: identifying the trainee (via RFID tags), measuring intravenous (IV) fluid input, tourniquet pressure, location of needle insertion and depth of insertion during needle thoracotomy to relieve tension pneumothorax, sternal displacement (during administration of cardiopulmonary resuscitation (CPR)), head acceleration and cervical spine angle.) Additionally, sensors can be included to measure physiological variables including but not limited to: blood volume, hemodilution, and bronchial air flow. Additional sensors provide data on system parameters such as battery charge level and internal temperature. This list of sensors and variables sensed is representative, but is not necessarily exclusive of other sensors and variables.

A range of effectors generates both general clinical signs and specific trauma clinical signs as well as other responsive behaviors. Physiologic signs are produced by effectors, such as electromechanical actuators, to generate palpable peripheral pulses and drivers for lung expansion and contraction. Specific trauma states are produced by effectors such as valves to admit blood or air into the pleural space and peripheral blood flow controllers to produce pulsatile flow of blood out of a lacerated artery. Additional responsive behaviors are produced by effectors such as motors to turn the head in the direction of a voice and an amplified speaker to produce voice, vocalizations of pain and sounds of labored breathing.

Self-Contained, Autonomous Functionality in Humanoid Form Factor

In one aspect of the invention, ACS functionality, including its mechanisms, sensors, actuators, power sources and automatic control systems, so as to fit within the size and shape constraints of a realistic, nominal human form.

It is understood that the term "nominal" refers to a range within plus or minus two standard deviations of the average height, weight and volume of the age- and gender-matched human that the ACS is designed to simulate. This is equivalent to approximately the central 95% of the distribution for height, weight and volume.

In one embodiment for the ACS, the target human is an adult male, with height 72" (1.83 m) and weight 190 lbs. (86.4 kg). The volume of a male human with this size and weight is approximately 2.8 cubic feet (0.079 m$^3$). In one embodiment, the entirety of the structural, computing, sensing, actuating, fluidics, power and communications elements have been designed to fit within this very limited volume. Furthermore, all apparatus must meet the even more restrictive constraint of fitting within this volume as embodied in the morphology of a human body, with correct external anatomic form and proportions of the head, neck, torso and limbs.

Computer Control System

As described above in FIG. 1, in an exemplary embodiment the ACS is controlled by an onboard computer system that is based on a two-part architecture: a real-time central processor 102 and a field-programmable gate array (FPGA) 108. This combination allows a lower speed—and therefore lower power and lower heat—Pentium II class processor to handle overall control, communications, and data logging, while the FPGA interfaces directly to the sensors and effectors, offloading low-level data acquisition and processing tasks from the central processor and providing the advantage of the high-speed parallel processing power afforded by FPGA technology. In an exemplary embodiment, the algorithms and models of physiology are implemented across both the real-time processor (for more mathematically complex functions) and the FPGA (for simpler, faster, more "reflexive" responses.) This partitioning of function may be regarded as analogous to that found in the human central nervous system, with the central processor providing the higher-level computation and communication abilities of the brain and the FPGA providing the fast, reflexive responses and peripheral sensory-effector integration of the spinal cord.

Computational Architecture: Real-Time Processor, Real-Time Operating System and Field-Programmable Gate Array (FPGA)

In an exemplary embodiment, the central programmable processor (computer controller) is specified to be rugged, compact, shock and temperature tolerant, have a real-time clock (for data logging) and use flash memory rather than a hard drive to eliminate fragile moving parts susceptible to drop and impact shock. One embodiment employs the use of a real-time operating system (RTOS) on the central processor because of the greater reliability and immunity to crashing afforded by an RTOS that is designed specifically for embedded, unattended control applications often in mission-critical environments such as the central control computer of an automobile or avionics system.

One embodiment incorporates a Field-Programmable Gate Array (FPGA) to implement physiology, sensor and actuator processing algorithms directly in silicon. (An alternative embodiment could implement these algorithms in a custom-built Application Specific Integrated Circuit (ASIC).) This provides extremely fast processing and very high resistance to software crashes, since algorithms executing on an FPGA are effectively hard-wired circuits that function independently of and in parallel with each other and with any external operating system. These algorithms are thus immune to conventional system crashes and interruptions.

An RTOS is typically much more compact than a standard operating system (such as Microsoft's Windows XP) and therefore also offers the advantage of fast booting (typically on the order of one second). This ensures that the system is ready for use soon after it is turned on and maximizes the productive use of instructors' and trainees' time. Both the RTOS and the FPGA also offer tight control of input-output timing, a critical requirement for a system such as ACS with a large number of sensors and actuators. (An RTOS, by definition, provides real-time deterministic control with guaranteed bounds on response latency. This is distinctly different than a conventional operating system, where many actions such as disk reads or network activity can interrupt I/O processing, causing unexpected and random delays.) For example, tight control of timing signals to a pulse actuator ensures that a prescribed steady pulse is actually actuated at a constant rate and is perceived by the trainee as a regular rhythm. Unbounded interrupts generated in a central processor with a conventional operating system architecture could produce a pause or irregularity in the pulse actuator's action, and this could be falsely interpreted by the trainee as having clinical significance.

Another embodiment uses a state-space model to represent the sequence of events specified by the configuration of the controls on the ACS Control Panel. State-space models are used as the framework for building robust, maintainable applications since they can represent complex, interdependent systems in simple, graphical terms. Lower-level processing of sensor inputs and effector outputs, including "reflexive" responses (such as pupil response to light) are executed directly on the FPGA. Overall system control, timing, communications and data-logging functions are programmed to run on the real-time central processor executing under the RTOS.

Another embodiment employs an algorithmic architecture termed the state space-multidimensional lookup table methodology to provide a means of generating complex physiological responses that is both flexible and robust. This will be described in detail below.

Data Logging

One embodiment uses an onboard flash drive to provide non-volatile data storage in a rugged, shockproof medium. Assuming a maximum data logging rate of 1 Hz, approximately 1 MB of storage is required per hour of data logged. Approximately 300 bytes of storage will be required to hold logged variables for each time point, including, but not limited to:

Vital signs
  Heart rate
  Heart rhythm
  Respiratory rate
  Respiratory depth
  Systolic blood pressure
  Diastolic blood pressure
  Level of consciousness
Sensor data
  Cervical spine angle
  Head acceleration
  Arm tourniquet pressure
  Leg tourniquet pressure
  Left and right intrathoracic pressure (for tension pneumothorax events)
  Left and right main bronchus airflow
  Total blood volume
  Administered fluid volume
  Core body temperature
Times of occurrence of programmed or automated trauma events
  Initiation of limb hemorrhage
  Pneumothorax
  Tension pneumothorax
  Hemothorax
  Airway obstruction
  Shock
  Seizure
  Medic RF-ID
  GPS coordinates
  Time-of-day stamp Continuous binaural digital audio signal recorded from the ear canal microphones can be compressed using the MPEG-1 layer III (mp3) codec at a rate of 96 kbps with variable bit rate encoding, sufficient for excellent fidelity for voice recordings. The resulting compressed data stream requires approximately 43 MB per hour of recorded audio.

Physiological Systems Modeling

One aspect of the ACS invention provides continuous physiology: in one embodiment ACS is built around trauma-relevant physiological systems and responses, and these systems respond continuously and realistically throughout a training scenario—e.g., ACS will "die", spontaneously and without instructor input, if effective care is not given to it. This approach ensures that trainees learn that ongoing assessment and treatment is crucial to patient survivability: continuous physiology will require ongoing assessment and continuous responsibility.

In one embodiment, the models used are based on empirically observed and measured human physiological responses to various physiological challenges such as hemorrhage or airway occlusion. These empirical data may be derived from a plurality of sources, including clinically observed data used as the basis for accepted standards of trauma physiology and care, such as the "gold standards" as codified in the Advanced Trauma Life Support Program Manual (American College of Surgeons, 6th ed., 1997) and the Special Operations Forces Medical Handbook (Yevich, Whitlock, Broadhurst et al., 2001). The empirical data may also be derived from experimental science, such as the lower-body negative pressure (LBNP) model of human physiological responses to blood loss. The empirical data may also be derived from quantitative data records obtained from trauma patients, for example, while they are attended by medical personnel and connected to physiological monitoring instrumentation during treatment and transport.

In another embodiment, the physiological models used may additionally incorporate validated data generated by quantitative and computational models of cardiovascular physiology; in particular, one embodiment utilized the physiological models developed Heldt, 2004 and Heldt, Chang, Verghese and Mark, 2003. In one embodiment, as needed, based physiological responses on the Guyton model of fluid and circulatory regulation (Guyton, Coleman and Granger, 1972; Guyton, Coleman, Cowley et. al, 1972) and models specifically developed to run in real-time for teaching cardiovascular physiology (Davis 1991; Davis and Mark, 1990; Campbell, Zeglen, Kagehiro and Rigas, 1982; Sah and Moody, 1985).

It is understood that any of these embodiments may additionally incorporate practical advice from emergency medicine physicians, trauma specialists and military physicians and medics. By tuning the models with heuristics derived from the experience of these trauma experts we created a system that does not merely respond "by the book", but to every extent that is practicable matches the responses seen in real-life in the field.

The models of Heldt et al. provide an understanding of cardiovascular responses to orthostatic stressors. The Heldt model is a very large (over 100 parameters), computationally intensive model that offers exquisite detail in modeling the cardiovascular system and its response to external stressors, but is not suitable for execution in real-time. One aspect of the current invention is a process for leveraging this work to develop simplified and computationally efficient models of cardiovascular dynamics that, despite their simplicity, capture the dynamics of trauma-relevant physiological responses and can be executed in real-time and with high reliability on the ACS central computer. This enables the ability, for example, to provide real-time responses in ACS to changing variables such as blood volume during the simulation of exsanguinating hemorrhage.

Architecture, Algorithms and Process to Imiplement Physiological Models and Automatic Control Another embodiment describes and includes the process to meet the need for autonomous control and accurate physiological modeling in ACS by means of a compact, computationally efficient implementation of algorithms that can run in real-time on the embedded real-time processor and FPGA.

In one embodiment, the real-time physiological models and control algorithms running on the central processor architecture are implemented by a combination of state-space and multidimensional lookup table techniques, supplemented where needed by solvers for low-order (primarily 1st and 2nd order) differential equations. State-space methodology is employed to simulate principal physiological and clinical states, and to incorporate time-dependent and behavior in the models. In an exemplary embodiment, the physiological state at any given time is a function of five parameters:

1. The specific trauma event sequence specified to occur by the instructor.

2. Current time relative to the trauma event sequence.
3. Current sensor inputs values.
4. Current physiological status values (a function of the present state and the sensor inputs).
5. The preceding state history.

Within a given state, a set of multidimensional lookup tables relates input (independent) and output (dependent) variables. Typically, input variables are derived from sensor signals in the system, and reflect some physical variable that is affected by treatment of the simulated patient. Example input variables are total blood volume, administered IV fluid volume and bronchial air flow rate. Output variable examples are cardinal physiological status values, such as heart rate and blood pressure. Output variables are used to generate signals that control vital sign effectors in the system, such as pulse effectors and hemorrhage effectors.

An example lookup table is shown in Table 1. This lookup table relates the independent variable of Total Blood Volume to the output variables Heart Rate, Systolic Blood Pressure, Diastolic Blood Pressure, Pulse Pressure, Respiratory Rate, Urine Output and Mental Status. Note that the data provided in this table are representative data.

TABLE 1

Example lookup table relating the input variable
Total Blood Volume to eight different output variables - representative data only

| ATLS Hemorrhage Category | Baseline | Class 1 Up to 15% loss | Class 2 15 to 30% loss | Class 3 30 to 40% loss | | Class 4 >40% loss | | |
|---|---|---|---|---|---|---|---|---|
| Total Blood Volume Class Endpoints (%) | 100 | 85 | 70 | 60 | 50 | 40 | 35 | 0 |
| Heart Rate (bpm) | 80 | 100 | 120 | 140 | 160 | 180 | 0 | 0 |
| Systolic BP (mm Hg) | 120 | 120 | 120 | 100 | 80 | 60 | 0 | 0 |
| Diastolic BP (mm Hg) | 80 | 80 | 90 | 80 | 70 | 60 | 0 | 0 |
| Pulse Pressure (mm Hg) | 40 | 40 | 30 | 20 | 10 | 0 | 0 | 0 |
| Respiratory Rate (rpm) | 20 | 20 | 30 | 40 | 40 | 40 | 0 | 0 |
| Urine Output (mL/hr) | 30 | 30 | 20 | 5 | 0 | 0 | 0 | 0 |
| CNS/Mental status | Baseline | Anxiety 1 | Anxiety 2 | Anxious, Confused | Lethargic, Confused | Unconscious | Unconscious/ Dead | Unconscious/ Dead |

The lookup table functions within the system as follows. During a hemorrhage simulation, the blood fluid flow sensor measures the rate of flow of blood simulant. The central programmable processor totals the flow measurements to generate a measure of total blood lost. We define the following variables:

$B\dot{V}e(t)$ is the rate of blood emitted (lost) at time t, as measured by the blood fluid flow sensor $BVe(t)$ is the total blood emitted (lost) by the system at time t $BV_0$ is the initial total blood volume $BV(t)$ is the total blood volume at time t $BV\%(t)$ is the blood volume percentage at time t (percent of initial total blood volume)

ATLS refers to the Advanced Trauma Life Support Manual and the trauma treatment guidelines contained therein, published by the American College of Surgeons Committee on Trauma. 6$^{th}$ ed., 1997. Note that here and in what follows the term "blood" may be used as a compact term for "blood simulant". It is to be understood that any references to the term "blood" as used in respect to the ACS do not refer to actual human blood, but rather a liquid used to simulate relevant perceptual attributes of actual blood, such as its liquidity and color We further define that time t=0 is the instructor-defined start time of a particular instance of a particular simulation training scenario.

Then:

$$BVe(t) = \int_0^t B\dot{V}e(\tau)d\tau$$

for the embodiment in which the blood fluid flow sensor provides as output a continuous (e.g., analog) signal proportional to flow rate. Alternatively:

$$BVe(t) = \sum_{i=0}^{t=N} B\dot{V}e(i)$$

for the embodiment in which the blood fluid flow sensor provides as output a discrete (digital) pulse signal, the pulse rate being proportional to flow rate. In this case N is the total number of pulses output between the start time and the current time t.

The central programmable processor then executes the following computation to determine the total blood volume percentage at time t:

$$BV\%(t) = \frac{BV_0 - BVe(t)}{BV_0} \times 100\%$$

Figure 2:
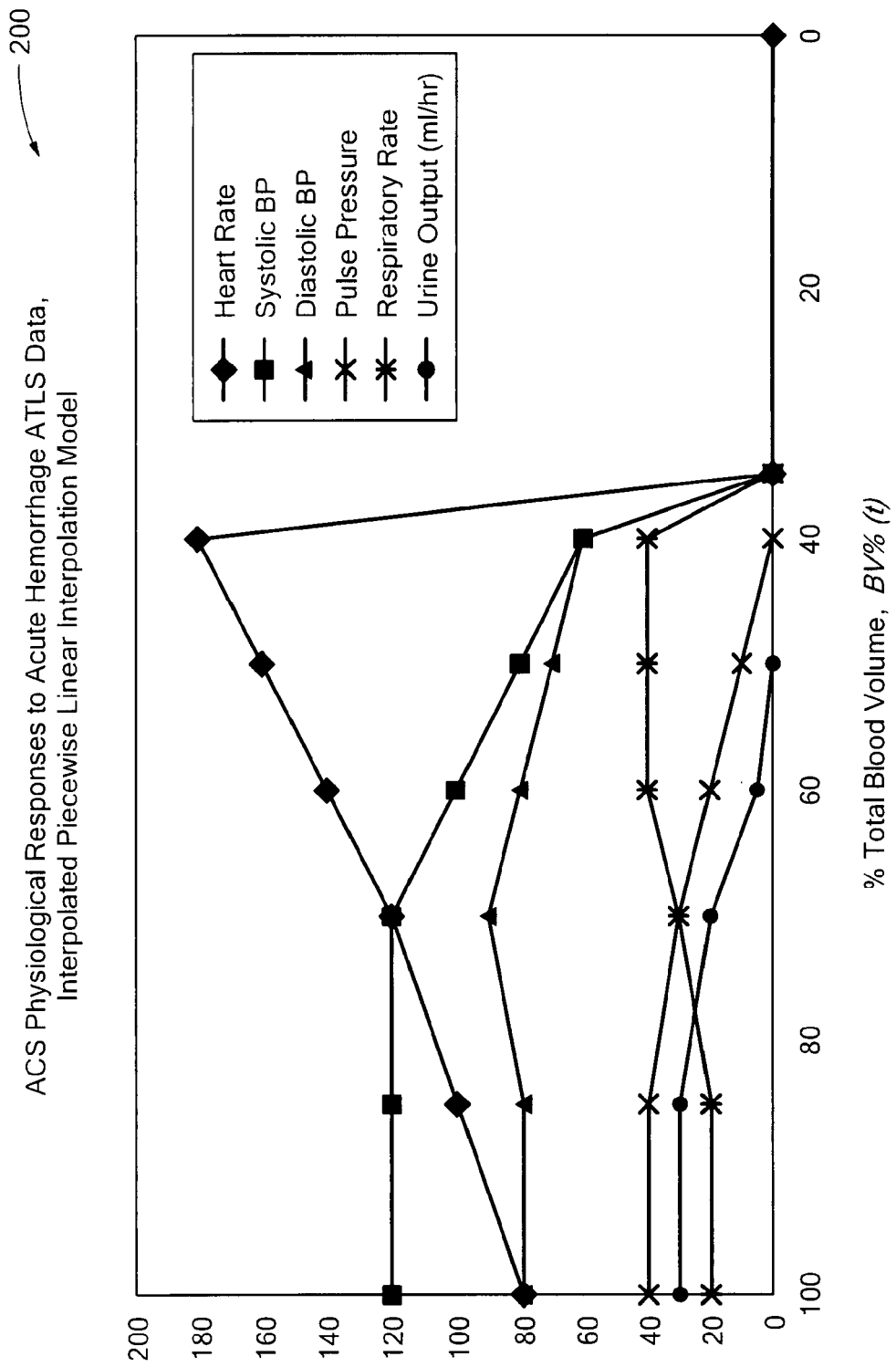
FIG. 2. is a graphical depiction of an encoding relationship between an independent variable (BV %(t)) and several dependent variables (HR, SBP, DBP, PP, RR, UO).

The independent variable $BV\%(t)$ is then applied as an index variable to the data in Table 1; corresponding values of the output variables are determined by interpolation between given data points. This is illustrated in the graph 200 in FIG. 2, in which the input variable BV %(t) is assigned to the abscissa and the output variables are assigned to the ordinate of the graph.

The output variables at time t may then be employed in computations of additional physiological parameters. The output variables, or functions of them, may also be employed as control signals (after appropriate conversion to analog or digital electronic signals) for actuators such as, for example, pulse effectors, respiratory motion actuators or audio generators of heart sounds.

In the above example a one-dimensional lookup table is employed to relate one input variable to one output variable. The relationship between physiological variables in ACS will typically be more complex, with an output variable being a function of two or more input variables., and the lookup table technique can be extended to embody relationships between variables in which the value of an output variable depends on two or more input variables. In the general n-dimensional case, an output variable is a function of n input variables. This relationship can be programmatically represented by an n-dimensional lookup table, typically implemented as an n-dimensional array of data points in the memory of the central processor.

For example, level of consciousness (LOC) is a function of systolic arterial pressure (SAP) and blood oxygenation (% $SpO_2$), as well as the current neurological state. Blood oxygenation is, in turn, a function of hematocrit (HC7) and total bronchial airflow rate $A\dot{V}_T^Y$. Thus, LOC can be expressed:

$$LOC=f_1(SAP, f_2(HCT, A\dot{V}_T))$$

$f_1$ and $f_2$ are each implemented as two-dimensional lookup tables, each of which can be viewed mathematically as a surface above a two-dimensional domain. Changes in input values move the output values to new locations on this surface. The technique extrapolates to higher dimensions, where n-dimensional lookup tables implement hypersurfaces above n-dimensional ranges.

The use of multidimensional lookup tables to embody the relationships between key physiological variables is a key enabling methodology. Replacing complex, high-order differential equation (DEQ) models with lookup tables enables real-time performance and increases stability and reliability, particularly for a system subject to nondeterministic human inputs (i.e., the medical trainee's interventions) since DEQ solvers have the potential to diverge (i.e., "crash") for extreme or unanticipated out-of-bounds values (or combinations of values) of input variables and parameters.

The combination of state space methodology and multidimensional lookup tables provides a means of generating complex physiological responses that is both flexible and robust. In cases where an output variable depends not just on the current value of one or more input variables but also on the past history of those variables, a series of states can be employed to approximate this history-dependent behavior. The history of one or more input variables determines which of a plurality of possible states is the current state, and each state has associated with it a particular lookup table relating input and output variables for that state. Thus the relationship of the output variables to the input variables can vary depending on the time history of the input variables.

For example, in the hemorrhage example above, if the total blood volume percentage reached a value of 40% or less, brain and heart tissues would be significantly hypoperfused and experience severe hypoxia. Within approximately 5 minutes, there would be irreversible loss of brain and heart function. At this point, administration of IV fluid or other resuscitative measures would be ineffective—they would not produce the same input-output variable behavior as they would have if administered earlier in the time course of the scenario. This time-dependent behavior can be implemented using the state space and lookup table methodology described herein.

Figure 3:
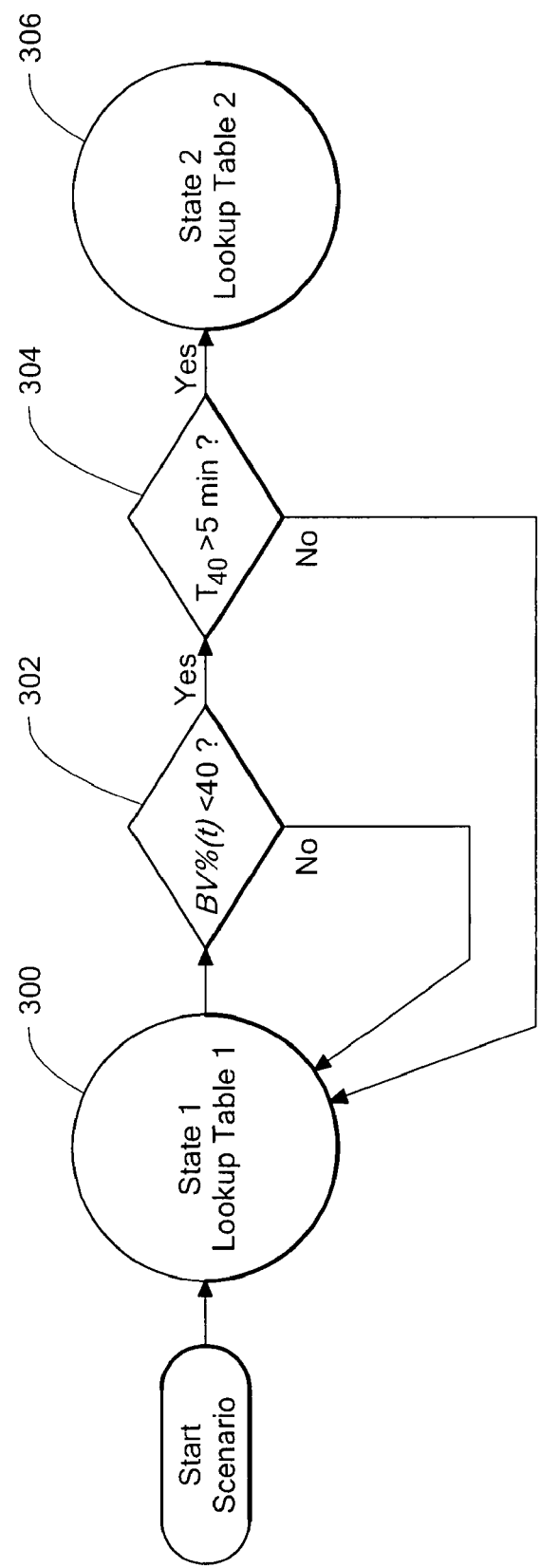
FIG. 3. is an exemplary a state space lookup table methodology for robust, real-time modeling and computation of physiological responses.

For an example, referring to FIG. 3. At the start of the scenario State 1 300 is entered. State 1 300 has associated with it Lookup Table 1 which is used to relate input and output variables. (Lookup Table 1 could, for example, be based on the input-output variable relationships presented above in Table 1.) At a regularly recurring interval the total blood volume percentage variable is tested 302 to see if it has fallen below 40%. If yes, a timer variable, $T_{40}$, whose value is the elapsed time that the total blood volume percentage is under 40%, is tested 304 at a regularly recurring interval to determine if it exceeds 5 minutes. If yes, a new physiological state, State 2 306, is entered. State 2 now has associated with it Lookup Table 2 which encodes a different set of input-output variable relationships than Lookup Table 1. For example, Lookup Table 2 could specify that all output variables have the constant value 0, representing the irrecoverable cessation of vital signs (death).

This is a simplified example to illustrate some features of the state space-multidimensional lookup table methodology. In practice, the tests for state transitions may be quite complex, involving multiple ranges of the test variables or test variables that are functions of input variables, output variables and time.

The use of state space methodology combined with lookup tables to relate input and output variables enables the incorporation of real-world human physiological response data (from sources such as described above) directly into a simulated trauma scenario. If, for example, a patient who was attached to vital signs monitoring instrumentation developed a tension pneumothorax in the field and was treated, the data record from this event (obtained subject to pertinent guidelines regarding consent and confidentiality) could be incorporated into a set of lookup tables in the ACS that would generate in the simulation exactly the same responses as occurred during the evolution of the actual clinical case.

In cases where empirical data on the human physiological responses to specific courses of trauma and its treatment is sparse or unavailable, the data informing the state space structure and lookup tables can be derived from quantitative computational models of human physiology. The essence of this process is to run the quantitative physiological model, which may be complex and computationally intensive, off-line (that is, on a higher-powered computer external to the ACS system) for a range of independent variables and parameters in order to obtain data that captures the relationship between the variables of interest. This modeling is physiologically realistic but time-consuming; for example it may require on the order of several minutes per model run each time a set of input parameters is changed. These generated data are then employed to create multidimensional lookup tables that can be implemented in the FPGA. Changes in sensor inputs to ACS (blood volume, bronchial air flow) are interpreted by the lookup tables and cause corresponding changes in the vital signs and output effector responses. The physiology is effectively encoded in the lookup tables, which, unlike the original model, are compact and fast.

The state space-multidimensional lookup table methodology may be used to represent highly nonlinear physiological system behavior. Representation to within desired bounds on accuracy over a wide range of system behavior may be obtained by creating a sufficient number of states such that system behavior within each state is adequately approximated by the associated lookup table. Each state is defined so as to encompass a limited regime of system behavior, and when system variables reach the limits of a regime, a transition to a new state occurs. This process is somewhat analogous to the piecewise linearization of a nonlinear function for local analysis, where a local approximation is used to permit analysis that otherwise would be intractable. The approach also is analogous to the technique of gain scheduling in control systems, wherein different control functions are defined for different ranges of the system variables.

Figure 4:
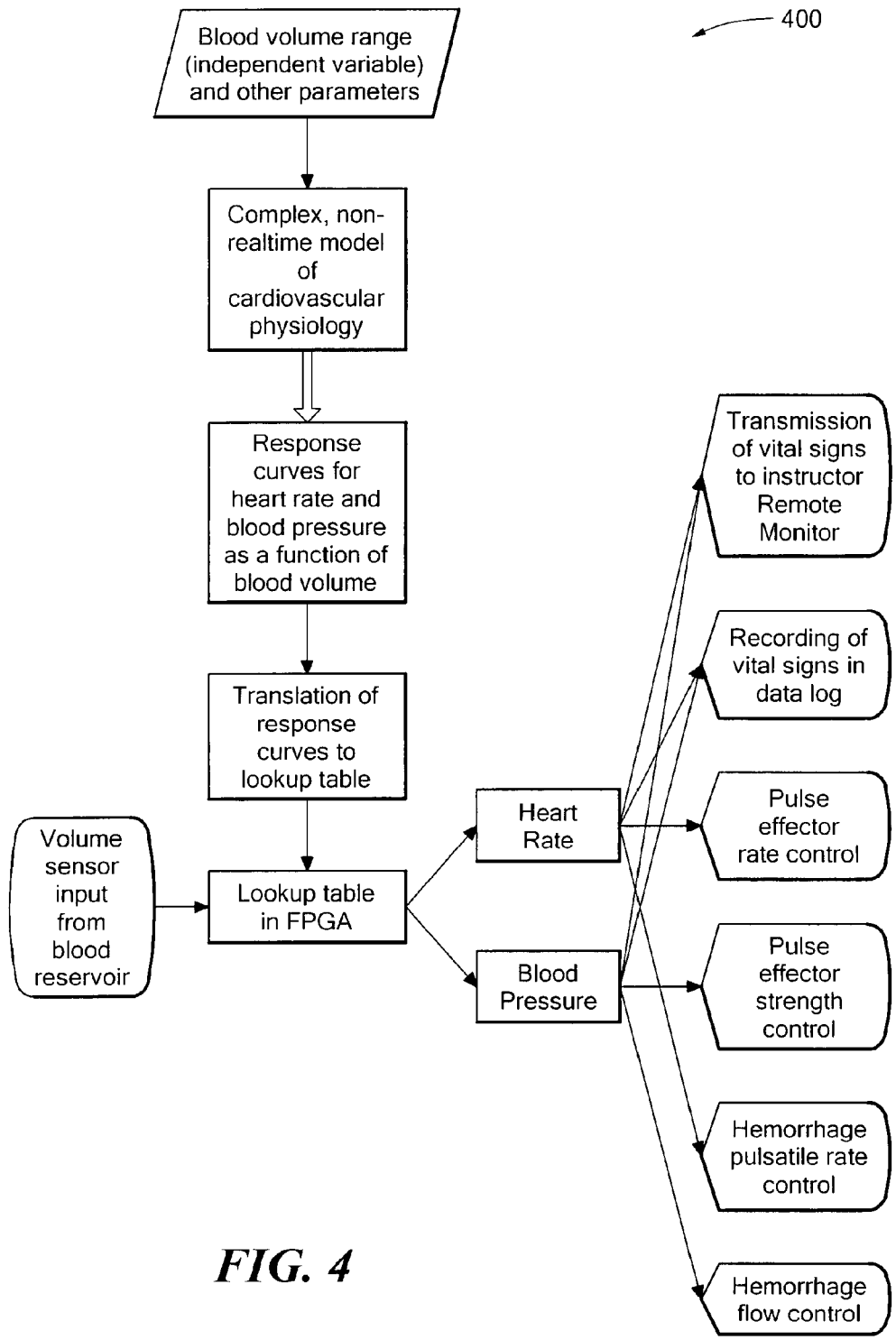
FIG. 4. is a flow diagram showing an exemplary process for generating real-time physiological response using pre-computed response curves.

As a specific example of translating the physiological behavior of a computational model to a lookup table that relates input variables to output variables, we illustrate a process 400 in FIG. 4 for one component of physiological repertoire: the response of heart rate and blood pressure to hemorrhage. Starting at the top of the figure, a desired set of independent and dependent physiological variables is chosen for modeling. In this example, to determine the responses of heart rate (HR) and arterial blood pressure (BP) to hemorrhage, the independent variable are specified to be total blood volume (TBV) and the dependent variables are heart rate (HR) and systolic and diastolic arterial blood pressure (SAP and DAP). A function is specified that decreases blood volume with time and the model is run to determine the output curves for HR, SAP and DAP.

Figure 5:
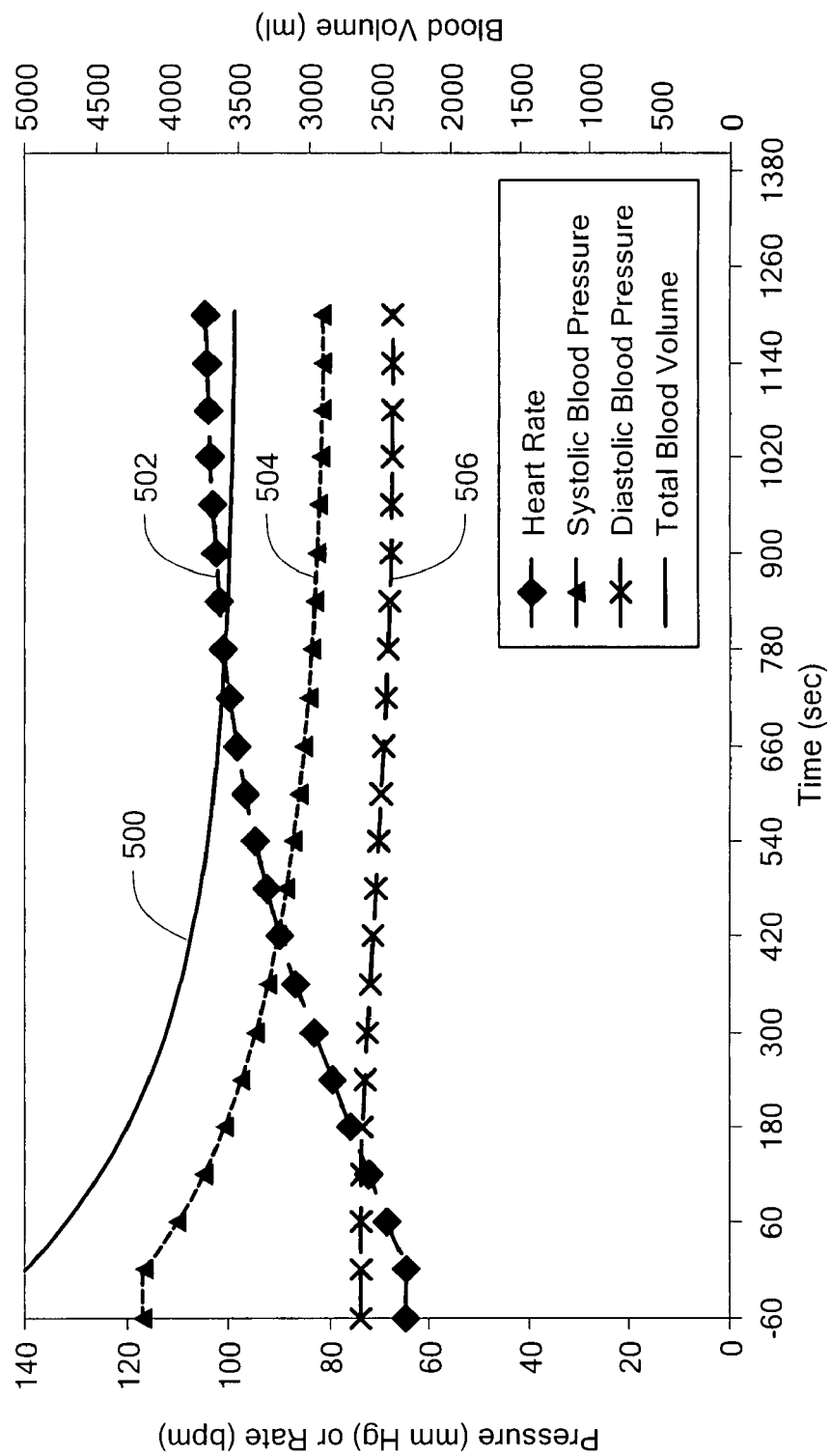
FIG. 5. is a graphical depiction of exemplary response curves for physiological variables generated by the Heldt model, where variation of heart rate, systolic arterial blood pressure and diastolic arterial blood pressure is shown for a 1500 ml drop in blood volume beginning at t=0 and extending over 20 minutes.

FIG. 5 shows an example of the data curves produced by the Heldt model. The solid curve 500 is total blood volume: initially, TBV is 5000 ml, a nominal value for a 70 kg male. At time t=0, a severe hemorrhage is modeled by specifying TBV to decrease by 1500 ml over the course of approximately 20 minutes. The Heldt model then computes the corresponding changes in HR 502, SAP 504 and DAP 506, which are also shown on the graph. These curves are encoded (by a computer external to the ACS) into lookup table data that enable the input variable TBV to be mapped to the output variables HR, SAP and DAP. These lookup tables are coded in the FPGA for fast, real-time computation.

There are limits to the accuracy of any computational model and, especially with extreme perturbations to physiological variables, real physiological responses may not be fully captured and predicted by one model. An example is cardiovascular system behavior as exsanguination proceeds to the point of death, where the rise in heart rate will ultimately convert to a precipitous decline. For obvious reasons, deliberate experimental validation of a cardiovascular model in humans is not possible for this condition. However, quantitative data does exist for other animals and qualitative data exists based on the observations of clinicians treating trauma patients. For example, the drop in heart rate with severe exsanguination is due to a mechanism known as the Bezold-Jarisch reflex and this has been qualitatively and quantitatively described in published literature, such cases we will extend the data curves generated by the Heldt model (or other models) with additional data from validated sources so the full range of physiological response needed is available. The use of lookup tables facilitates this process, since response curves from different models can be spliced together to cover the entire desired range of variation of an independent variable. Specific models can be chosen to cover subranges for which each model is optimally suited. The result is an accurate model of physiological responses that any one model may be incapable of providing.

As the requisite lookup table is coded in the FPGA, the ACS system can respond realistically to a simulated hemorrhage scenario. As shown in the bottom left of FIG. 4, for example, during a hemorrhage scenario an internal sensor measures the hemorrhage flow rate, from which the remaining volume in the internal blood reservoir can be calculated. This sensor data is read into the FPGA and after numerical integration, is mapped to HR and BP via the lookup table. The HR and BP variables are state variables that provide a window into the overall health of the simulated patient as well as provide the appropriate physiologic response. As shown in FIG. 4, these variables can be relayed to the instructor remote monitor 120 (FIG. 1) for real-time display and are recorded in the onboard data log with a time stamp.

Further, the HR and BP variables are displayed to the trainee through simulated clinical physical signs generated by effectors. For example, HR will set the rate of the pulse effectors in the carotid, brachial, radial and femoral arteries, and will likewise set the frequency of pulsatile flow in a bleeding artery by controlling the rate of opening of the arterial fluid flow valve. BP will be used to set the strength of the pulse effectors and will also influence the amplitude of the arterial flow. The relationship of BP to pulse strength is set individually for each pulse site—for example, peripheral pulses in the radial arteries cannot be felt when SAP drops below roughly 80 mm Hg, and this same effect will be replicated in ACS by turning off the radial pulse effectors when the computed SAP drops below 80 mm Hg.

Specific Physiological System Functions

In one embodiment, the architecture of the physiological modeling system is broadly divided into three main subsystems: cardiovascular, respiratory and neurological. Functions to be modeled and implemented in each of these subsystems are described below.

Cardiovascular System Model

In one embodiment, the central physiology processor computes cardiac rate and rhythm, and systolic and diastolic blood pressures. Total blood volume is sensed and the central physiology processor responds with realistic changes in cardiac rate, blood pressure, respiratory signs and level of consciousness. Bronchial airflow is sensed and the central physiology processor responds with appropriate changes in cardiac rate and blood pressure. Pulse rate and strength are determined by cardiac rate and systolic blood pressure. If systolic blood pressure drops below a critical threshold, peripheral pulses disappear. The rate and volume of hemorrhage is controlled based on cardiac rate and systemic blood pressure. The volume of administered IV fluid is sensed and is a variable that influences the computation of cardiac rate and blood pressure (and, through the respiratory and neurological systems dependencies on these variables, administered fluid also affects respiratory responses and level of consciousness.) Hemodilution is computed from sensor measurements of total blood volume and administered fluid volume. Hemodilution is monitored by the central physiology processor, which responds with realistic changes in cardiac and respiratory signs and level of consciousness. Cardiac arrest can be programmed to occur at a specified time, as well as whether arrest responds to resuscitation and, if so, the duration of arrest until response (assuming effective intervention by the medic). Cardiac arrest may also be generated automatically by the physiological modeling system sufficient if sufficient deterioration occurs in the simulated patient's cardiovascular status.

Extremity Trauma Modules

In one embodiment, the torso of the ACS system becomes a platform for a variety of unique trauma modules to connect to. Depending on the specific training goals, individual ACS units can be customized by connecting the arm and leg modules in a configuration to match the training objectives. The connection provides transport and return of, but is not limited to: blood, IV fluid, power, and data.

In another embodiment, the individual trauma module contains a piece of hardware such as a USB key, flash drive, or other form of non-volatile memory which can be preloaded with the control mechanisms necessary to run the mechanics and electronics contained on the attached limb. The hardware would communicate with the central processor via a common Application Programming Interface (API) for control purposes and enable relevant common ACS data logging. This allows for more advanced modules, such as an ultra-realistic femur fracture management limb, to work with the same ACS torso which accepts a low-cost plastic limb without pulses or hemorrhage capability for use in extraction-only exercises.

A further embodiment describes a hemorrhage control system with each removable limb module having the following features:
  Strong common structural connection
  Simple locking release mechanism
  Presence indicator switch to tell the central processor that the device is attached or detached
  Method of informing the system which module is connected A further embodiment describes a hemorrhage control system with each removable limb module supporting the following features:
  Anatomically correct weight
  High-pressure arterial flow
  Low-pressure venous flow
  Soft-tissue hemorrhaging
  Protruding bone
  Bone marrow seepage
  Position sensor to monitor relative orientation to the master unit
  Durable skin covering
  Realistic muscle and fat layers A series of different limb modules could be part of the system, allowing the presentation to the trainee either healthy, undamaged limbs, or limbs with various injuries, up to and including full traumatic amputation. The upper extremity limb modules could include:
  Healthy upper arm from slightly below the shoulder to slightly below the elbow, including the elbow joint
  Blast/gunshot injury to upper arm, including the components described above, but with an open wound and visible damage to the humerus
  Full arm blow-off above the elbow, which will include only the upper arm down to the location of the blow-off.
  Healthy lower arm, from below the elbow through to the hand
  Blast/gunshot injury to lower arm, including moulaged open wound
  Full lower arm blow-off above the wrist Lower extremity modules could include:
  Healthy upper leg from below the hip joint to below the knee joint
  Fractured femur module, with closed fracture and mechanisms for generating simulated compartment syndrome
  Traumatic amputation above the knee, including only a stump
  Healthy lower leg, from below the knee and including the foot
  Blast/gunshot injury to the lower leg, including moulaged open wound
  Full lower leg blow-off below the knee with accompanying foot module for limb salvage complications.

In one embodiment, the limb trauma module connection points will be located in the upper half of the humerus and in the upper part of the femur. Another embodiment includes connections just below the elbow and just below the knee for lower extremity trauma modules to be connected. Each connection point will include reinforced and rigid mechanical latches to hold the components above and below that point together; quick release fluid connectors with integral shut-off valves to carry blood simulant to the sites of injury and IV fluid from venous access locations, and other fluids as appropriate (e.g. fluid to pressurize compartment syndrome thigh elements); ruggedized electrical connectors to send control signals to electrically actuated pulsation units and receive data from pressure sensors in each.

Each connection point includes a release mechanism that frees the limb segment upon deliberate manipulation of a push-button-like element. The push-button is offset beneath the surface of the limb segment, and protected from inadvertent activation.

The exposed bone and soft tissue damage are anatomically correct and have realistic appearance.

Hemorrhage Generation & Control System

One aspect of the trauma training system is the system's capacity to bleed and have its bleeding controlled through proper application of direct pressure, tourniquets or other techniques for hemostasis. The ACS contains a replaceable supply of blood simulant, a system to pressurize the blood and a series of valves which direct the flow of blood simulant to the sites of bleeding. Further, these valves can be controlled such that by their controlled opening and closing, pulsatile bleeding (e.g. arterial spurting) can be generated. In addition, pressure sensors can detect application of pressure and the sensor signals can be used by the computer controller to modulate and/or arrest bleeding as appropriate through alteration of the pressure applied to the blood simulant reservoirs or through modulation of the commands to the control valves.

In one embodiment, blood simulant is created by injecting concentrated liquid colorant and thickener into one-liter bags of saline solution (e.g. Hospira, Inc., p/n NDC 0409-7983-09), which are then agitated to thoroughly mix the components. These bags of blood simulant form the disposable (yet refillable) simulant containers.

Blood simulant will pass through a series of channels embedded in the heat sinking elements of the central control unit and any other components which generate heat so that it will have a temperature above ambient when it is released through injury sites. Pressure applied to a limb or artery must be sensed for several of ACS functions, including the ability to stop arterial bleeding by either diffuse direct pressure, localized pressure applied to an artery or by application of a tourniquet. Limb pressure sensing is also needed to detect palpation by a medic for triggering pain vocalization-for example, in the case of palpation of a thigh with presence of a fractured femur.

Pressure Sensing System

A common functional requirement in medical simulators is the detection of external pressure applied by hand or mechanical device to the exterior of a limb or other body part for the purpose of constricting a subjacent luminal structure such as an artery or vein. An example is the detection of the pressure applied by a tourniquet to the upper arm to constrict the brachial artery and stop the flow of blood in the case of a severe hemorrhage from an artery distal to the point of pressure application.

We describe an inventive pressure sensing system that allows the measurement of pressure applied at any point along a linear path. The pressure sensing system can be applied to measure the pressure applied to a variety of linear structures, including tubular structures, and including but not limited to simulated arteries, veins and nerves.

The pressure sensing system is durable, flexible, stable, relatively immune to noise and can be calibrated.

Figure 10:
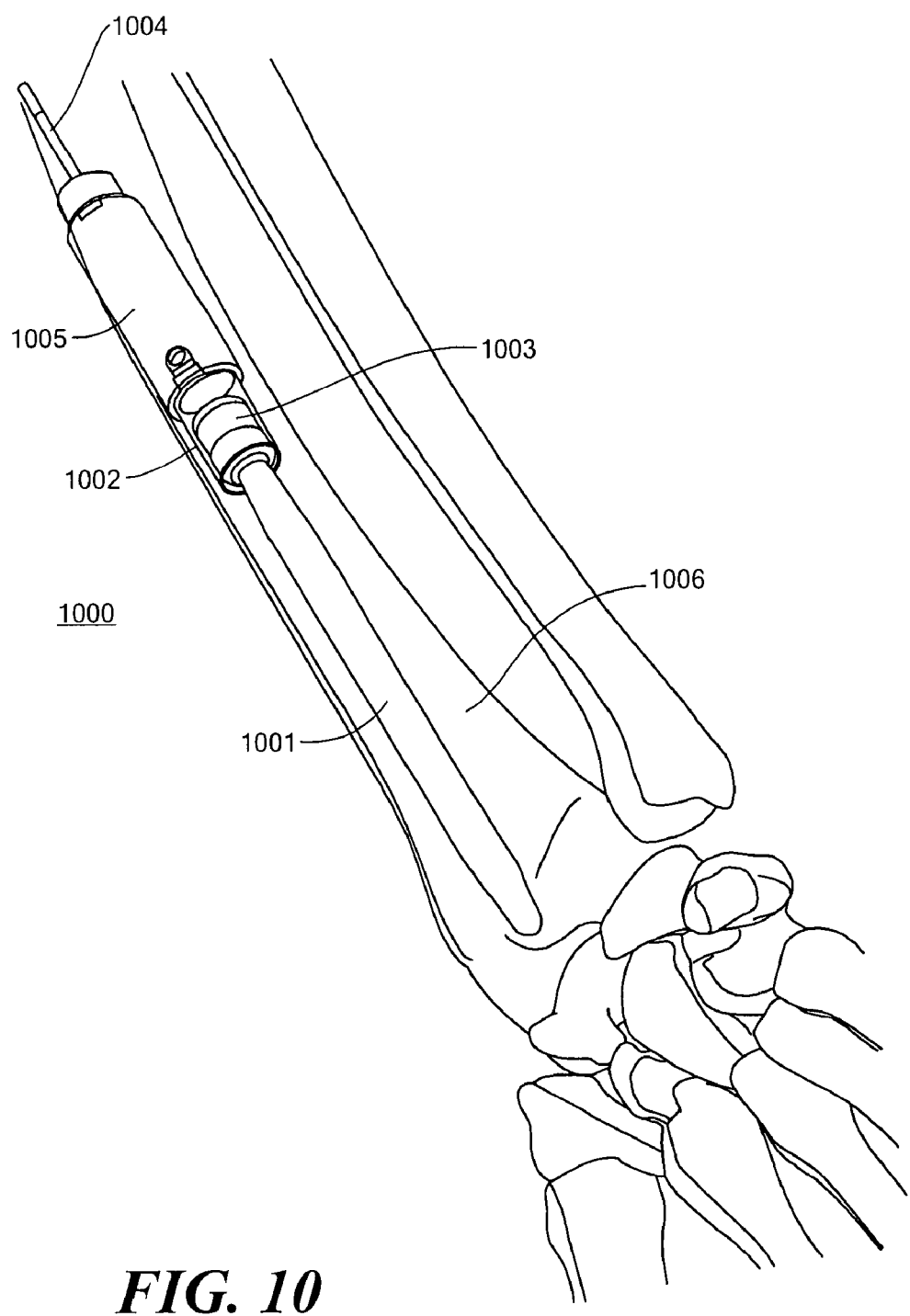
FIG. 10. is a pictorial representation of a fluidic pulse generator.

One embodiment shown in FIG. 10 includes a hollow elastomeric tube (representative materials are polyvinyl chloride (PVC), silicone and neoprene) that is located in a mannequin limb in the position that an artery, vein or nerve would be found in a human. This tube is termed the sense tube. In the case that the pressure sensing system is employed to measure the pressure applied to a simulated artery, the tube is termed the sense artery. This designation distinguishes the tubular sensing element from the flow artery. A separate component of the hemorrhage simulation system through which a regulated amount of blood simulant flows.

The sense tube has a diameter that approximates the diameter of the native target structure (artery, vein or nerve) for which applied pressure is to be sensed. (In the case of the brachial artery, the main artery providing blood flow to the arm, the inner diameter is approximately 3/16".) The tube is closed at the distal end by means of a barbed plug or other durable closure. The tube may be unbranched (strictly linear) or branched: a tube with a plurality of branches can be used to emulate the branching course of a native vessel or nerve.

In an exemplary embodiment, the tube is surrounded by a local material environment that emulates the local environment of the native target structure. For example, the sense tube may be surrounded by a compliant layer of material such as a medium-density polyurethane foam that emulates the viscoelastic material properties of the soft tissue surrounding a native artery, vein or nerve. Additionally, the tube may be positioned in proximity to a simulated bone.

The tube is filled with a moderately viscous, incompressible fluid that has low vapor pressure to prevent evaporation (representative fluids include glycerine or silicone oil). The open, proximal end of the tube is attached to a solid state gage pressure transducer. This transducer can be located in the trunk of the ACS body, a location that offers mechanical protection and a more controlled temperature environment than the limb (factors promoting signal stability and low drift.) The transducer voltage signal output is connected to one of the analog-to-digital converter inputs in the central computing system.

Alternately, the transducer can be mounted within the limb segment, so that the sense artery does not require separable fluid connectors between the sensing region and the transducer, which could potentially admit air, rendering the pressure measurement inaccurate. In this case, only electrical connections need to be made between limb segments and the ACS torso.

Pressure applied to the limb via hand or tourniquet is transmitted via the soft tissue in the limb to the flexible, fluid-filled sense tube, increasing the fluid pressure within the tube. The incompressible fluid transmits the pressure to the pressure transducer, which converts the pressure signal to an analog electrical signal that is measured by the central computer system.

Described below is the application of the pressure sensing system to measure pressure applied to a simulated artery to stop the flow of blood due to a traumatic injury.

The range of the transducer should be sufficient to enable accurate measurement of the range of pressure needed to stop arterial flow. A nominal maximum systolic arterial pressure is 250 mm Hg (4.83 psi). Allowing for a factor of two overpressure during application of a tourniquet, an appropriate range of pressure sensed by the transducer is approximately 0 to 10 psi.

The pressure sensing system has the desirable property of localized measurement in a region approximating the spatial extent of an artery. Thus, for example, hand pressure applied to the skin directly superjacent to the sensor's tube will elicit a larger signal than if the hand is positioned farther away. The pressure transducer's electrical signal output is digitized and becomes an input variable in the physiology system algorithms that control the effector valves that regulate the flow of blood simulant in the flow artery of the limb. The programming of the central processor compares the transducer output signal (after calibration and scaling) to the current value of the systolic blood pressure, which is taken as a threshold pressure value above which arterial flow is cutoff. If the transducer output signal exceeds the threshold value, the central processor sends a signal to close the solenoid valve that regulates the flow of blood simulant in the artery in the limb. In this way hand or tourniquet pressure of sufficient intensity and in the correct placement will result in cessation of bleeding.

Because the pressure sensing system measures pressure along a spatial region conforming to the spatial location of the actual artery, pressure applied in the wrong location will be less effective or ineffective at generating a signal of sufficient intensity to trigger cessation of blood flow. This provides valuable hands-on experience to a trainee, emphasizing the importance of both magnitude and location of pressure application to stop hemorrhage.

In the body, the anatomy of both an artery and the local tissue neighborhood around an artery can influence how pressure applied at the skin surface is transmitted to the artery. For example, if there is an amputation of the lower leg or foot, or severe traumatic laceration to the arteries of the lower leg or foot, a tourniquet applied below the knee may be ineffective in stopping hemorrhage; a tourniquet properly applied above the knee will result in hemostasis. The reason for the difference is the anatomical position of the arteries above and below the knee relative to the muscles and bones. In the upper leg, the femoral artery, the main artery of the lower limb, is located relatively superficially, with only the relatively thin sartorius muscle interposing between the artery and the skin. The femoral artery feeds into the popliteal artery in the region behind the knee: the popliteal artery is also relatively easily compressed by application of external pressure. Below the knee there are three main arteries that supply the lower leg: the anterior tibial artery, the posterior tibial artery and the fibular (peroneal) artery. For much of its course, the anterior tibial artery runs between the tibia and fibula. A tourniquet applied below the knee will transmit pressure to the rigid tibia and fibula, but the artery between them will be relatively shielded from receiving this pressure, and hence blood flow through it may not be stopped. This is an important learning point for trainees. The pressure sensing system described herein can be implemented to meet this training need. A branched sense artery (or multiple independent linear sense arteries) can be located so as to emulate the native morphology and course of the femoral, popliteal, anterior tibial, posterior tibial and fibular arteries. This sense artery (or arteries) can be placed in a similar anatomical relationship to simulated muscles, bones and skin as the real arteries are situated to the native muscles, bones and skin. A tourniquet that is correctly applied to the simulated leg above the knee will transmit more pressure to the sense artery than a tourniquet applied below the knee, where the simulated bones (tibia and fibula) shield the sense artery from external pressure just as in the real case. The central programmable processor will measure the pressure and respond differently in the two cases, actuating appropriate hemostasis in the lower-leg flow artery only when the tourniquet has been correctly applied. In the case that separate sense arteries are employed for the upper and the lower leg, the application of a tourniquet (incorrectly) to the lower leg can be specifically detected and this error can be recorded for later review and remediation. In this way, a common error of training can be detected, trainee performance can be assessed and appropriate feedback can be given to improve future performance.

Additionally, the pressure sensor system can be quantitatively calibrated by application of the following procedure:
1. Apply a standard, calibrated blood pressure cuff around the exterior of the limb containing the embedded pressure sensor.
2. Inflate the cuff to a series of pressure values covering the maximum range of systolic blood pressures to be modeled by the system. An example series of values would be from 80 mm Hg to 200 mm Hg at intervals of 10 mm Hg.
3. At each cuff pressure, measure the signal output of the pressure transducer.

The resulting series of data pairs (transducer output voltage, applied pressure) yields a calibration curve that quantitatively maps transducer signal output to actual applied pressure. Once the calibration curve is obtained, accurate simulation of hemostasis is achieved by programming the hemorrhage control algorithm to stop blood flow only when the sensed transducer output in a bleeding limb indicates an applied pressure that is greater than cardiovascular system current value of systolic arterial pressure (SAP).

Additionally, this pressure sensing system incorporates a means to automatically calibrate the zero pressure point of the system. Changes in temperature or long-term evaporation of the fluid in the sense tube can potentially change the baseline (zero) pressure in the fluid. The system therefore incorporates in the programming of the software that executes on the central processor a routine to automatically rezero the pressure sensor at the start of each scenario. The routine executes as follows: at the start of a training scenario, a startup routine reads the current value of the pressure transducer output signal for a time period of nominally several seconds, averages the value over this time period, and sets the baseline, or zero-reference, pressure value to be equal to this initial averaged value. All subsequent pressure measurements made during the run of the scenario are adjusted by first subtracting the baseline value. In this way, the system auto-adjusts for changes in system parameters that could otherwise create short-term or long-term drift of the measured pressure.

Pulse Effectors

In one embodiment, palpable pulses are generated in carotid, brachial, radial, femoral, popliteal, and pedal arteries. One embodiment of the pulsation system describes a combination of an electromechanical and hydraulic system. At the location of the pulse point, an elastomeric balloon filled with water or alternatively the same fluid as used in the pressure sensing system will lie underneath the surface of the soft tissue skin. This balloon will be continuous with a tube that mates with a miniature syringe or similar piston device. The piston device is actuated using either a radio-control style servo, a solenoid, a voice coil, or other similar electromechanical device. The pulsation units are self contained, and activated electrically. Control signals for pulses in the extremities are carried through the ruggedized electrical connectors described in the Skeleton Section.

The R/C servos or voice coil or similar devices will be sufficiently strong to drive water into the balloons to generate the pulses, but not so strong that if the trainee collapses the balloon by exerting too much pressure, that they will feel the pulse continue.

Venous System

In one embodiment, a novel implementation of a simulated venous system replicates many of the features of the human venous system with respect to the specific procedure of intravenous (IV) fluid administration. Intravenous fluid (saline, Hextend or other crystalloid, whole blood simulant) can be administered via I.V. catheter under gravity or pressure feed into most of the common anatomical sites including, but not limited to, the forearm, jugular veins, antecubital fossa, dorsum of the hand, and the sternum. The amount of fluid administered is sensed by a liquid flow sensor that communicates with the central processor. The physiological modeling program executing on the central processor alters relevant vital signs, physiological states and other variables in response to the administered fluid.

In one embodiment, the physiologic response to a specific type of IV fluid can be preconfigured by the instructor on the control panel. This allows fluid-specific response without the necessity of line-of-site operation of the simulator. Oftentimes, a medic will carry only one type of IV fluid and this feature allows the physiologic system to respond appropriately to the subtle differences in fluid type without necessitating complex and expensive fluid detection systems onboard.

The simulated venous system includes simulated veins. Veins are implemented using elastomeric tubes that approximate the diameter of native veins. The tubing material must be flexible, durable, self-sealing to puncture and with a durometer and other mechanical properties that respond with realistic resistance and "pop" to venipuncture. ("Pop" is a term used in clinical parlance to describe the feeling of "give" or reduced resistance to pressure experienced at the hand of a practitioner as a needle penetrates the wall of the vein and enters the interior.) Candidate materials for the tubing include latex, neoprene and silicones.

In one embodiment of the system, the simulated antecubital veins (commonly used for IV access in the anterior region of the elbow) are soft silicone tubing, blue in color, 1/4" outer diameter, 1/16" wall thickness. In another embodiment of the system, the simulated antecubital veins are latex tubing, natural (tan) color, 1/4" outer diameter and 3/32" wall thickness.

The simulated veins must be initially charged with blood simulant. The initial charge of blood must be maintained under sufficient pressure to provide "flash back" when a needle is inserted into the vein. This refers to the visible flow of blood into an IV needle or cannula when the needle is successfully inserted into the lumen of the vein.

The venous system must be able to accept administered IV fluid and store such fluid until the end of the training scenario in a collection chamber entirely contained within the ACS. The amount of IV fluid administered must be sensed and monitored by the central computer processor.

External fluid should flow into the venous system only when the external fluid head (i.e., the signed height of the external fluid relative to the height of the venous entry point) is greater than zero.

Fluid should flow back out of a vein if the external fluid head drops below zero: i.e., if the bag of IV fluid drops below the level of the body (this is an error on the part of a practitioner).

Figure 6:
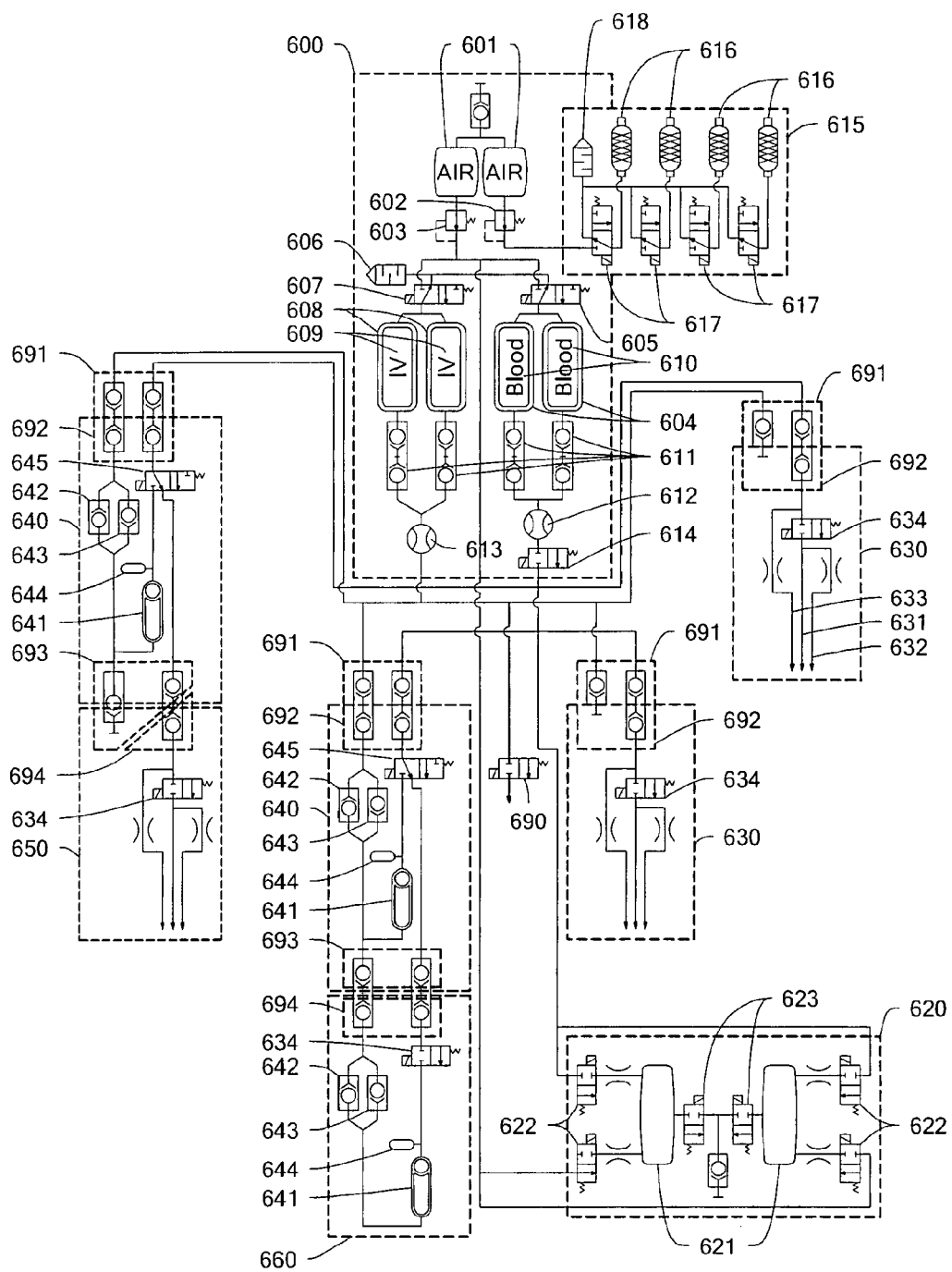
FIG. 6. is a schematic illustration of an exemplary hydraulic layout for arterial and venous systems as well as the pneumatic systems for pleural space pressurization and articulation of a neck for the system of FIG. 1.

An exemplary implementation is illustrated in FIG. 6. The system includes a central blood reservoir (shared with ACS hemorrhage control system), a solenoid valve, an elastomeric bladder, one or more synthetic veins (replaceable, and connected to the system via fluid connectors and fittings), two low-pressure check valves connected in parallel and with opposite flow orientations, a fluid flow sensor and a collecting bag or chamber. In the illustrated embodiment. with the exception of the parallel check valves, all components are connected in series, and connections are made with appropriately sized polymer tubing and fluid colmectors and fittings.

In one embodiment, the operation of the system is as follows: During the initialization start-up procedure for the ACS system, a signal from the central computer opens the solenoid-actuated valve to allow blood simulant to flow sequentially from the blood reservoir (which is maintained at a relatively high "arterial" pressure) into the elastomeric bladder, synthetic vein, through the upper check valve, through the flow sensor and into the IV fluid collection bag/chamber. This charges the venous system with blood simulant. Detection of fluid flow by the flow sensor indicates that the system is filled with blood simulant, and the central processor then closes the electric pinch valve to prevent further flow.

In another embodiment, the elastomer bladder is a small, expandable balloon of approximately 10 cc volume. It fills with blood simulant and maintains a low pressure on this volume (via elastic recoil of the bladder walls). This provides a small, low-pressure reservoir of blood simulant that is adequate to provide "flash back" into a cannula, needle or saline lock when the vein is successfully penetrated. The upper of the two check valves shown in FIG. 5 has its open flow orientation directed away from the vein; this valve provides a small amount of back pressure in the vein and maintains the distension of the elastomeric bladder.

Once IV access has been achieved, external fluid flows into the synthetic vein, through the upper check valve, through the flow sensor and into the IV fluid collection chamber. The quantity of fluid administered can be measured by integrating the flow sensor signal to obtain the net volume of fluid passing through the sensor.

In another embodiment, the lower check valve is oriented with the direction of open flow toward the vein. This allows fluid from the collection chamber to flow back into the vein and out into the catheter and external IV apparatus should the external bag be dropped below the height of the body.

In another embodiment, the cracking pressure of the check valves is specified to be 0.25 psi. This was selected so that an IV bag placed on the chest of the mannequin, at a height of approximately 20 cm above the insertion point for an antecubital IV, would have just sufficient fluid head to allow forward flow into the system. (The pressure head for water is 1.4 psi/m, yielding a pressure drop of 0.2 m*1.4 psi/m=0.28 psi for the bag placement described. This pressure is just sufficient to open a 0.25 psi check valve.) In practice, this accurately represents the minimum height of IV bag placement where forward fluid flow would be expected to occur in a real patient.

In another embodiment, the flow sensor is specified to have a flow measurement range of approximately 10 to 100 cc/min. This was chosen to match the anticipated flow rate of "wide open" IV administration of approximately 50 cc per minute. An example fluid flow sensor that meets these specifications is the McMillan model G104-03, with a measurement range of 13 to 100 cc/min at 0.5 % accuracy. Accuracy and minimum flow resolution are important parameters contributing to the accuracy of the volume measurement derived from integrating (or summating) the flow rate with respect to time.

In another embodiment, the collection chamber will consist of a rigid chamber enclosing a flexible bag which holds the IV fluid collected. The bag will have openings at the entrance to receive the fluid, and be attached to a drain valve that passes through the chamber wall. A normally open valve is attached to tubing that passes through the chamber wall, and enables equalization of air pressure between the atmosphere and the interior of the chamber. Another valve, normally closed, connects the chamber to the air pressure source that drives the blood simulant reservoirs.

To empty the collection bag, the equalization valve closes, the pressurized air valve opens and the drain valve opens. The compressed air collapses the bag containing the IV fluid and drives it through the drain valve. This draining of IV fluid would usually be done during set-up of the system or after training is completed.

Respiratory System

In a typical trauma response situation the first system that a first responder, either medic or paramedic, interacts with is the human airway. In one embodiment, the airway is anatomically accurate, extending from the mouth and nose terminating at the primary bronchi in a connection system for attachment to the lung portals. Important landmarks visualized during intubation are modeled, including, but not limited to the tongue, epiglottis and vocal cords. Anatomical features a medic is looking for during both standard and complicated airway management procedures are also represented. This complete head and neck allows oral and nasal intubation as well as surgical airway procedures. The parts of this trainer that are destroyed during the surgical airway procedure are easily replaceable, including trachea, mainstem bronchi and outer skin covering with either Velcro closures or a similar adhesive backed material.

In another embodiment, the airway management subsystem is designed to monitor what is important to the patient independent of treatment methodology. For instance, when a trainee is faced with a multiple casualty scenario, which ACS allows, the trainee may use a combitube on one patient and oral airway on a second casualty, but not have either airways or combitubes available for the next casualty in the scenario. The design allows this medic to (appropriately) treat the last casualty by potentially life-saving mouth-to-mouth resuscitation, and will record that as a correct decision. To achieve such a goal, ACS' monitoring of airway effectiveness/functionality is driven by the end result measurement of bi-directional airflow and corresponding lung volume, not by monitored user intervention, 3D location of therapeutic devices, or preprogrammed sequences of events. To achieve design goals of both standalone operation and intervention independence, instruments used in intubation do not have their 3D position tracked or their use noted by an instructor; rather the airflow to the lungs is monitored for increased or decreased flow. Flow sensors located at strategic areas in the bronchial tree passively measure this flow and feed this data into the central processor for processing and response generation. The criterion for successful intubation then becomes an increase in airflow to the lungs if provided at a time of need. Monitoring this at the lung level allows user intervention to be noted at any time during the training scenario rather than having an instructor watch what the user is doing at the current moment. Incorrect intubation past the carina and into a bronchus will be detected by the resulting left-right asymmetry of bronchial airflow.

In one embodiment, the lungs will be created from an elastomeric material similar to silicone that can be repetitively inflated and deflated via compressed air or a bellows system. When at atmospheric pressure, the lungs will resemble a collapsed lung. When inflated with compressed air from the air pump system, the lungs will expand and stretch the material to fully fill the pleural space. When the air is released, the natural material properties of the lung will cause them to contract, thus forcing the contained air out through the bronchi, past the air flow sensors, and then out through the mouth and nose.

In another embodiment, during normal respiration, air will be inhaled and exhaled through the mannequin's mouth and nostrils: exhaled air will be able to be heard and felt by the medic during primary survey. The chest will rise and fall if airway is patent and ACS is breathing. Much like a human, the lung drivers of the pulmonary subsystem will draw their air source in from the nasal and oral openings of the mannequin's head. If these openings are blocked or constricted, the lung drivers will not be able to draw in as much air. This decrease in lung volume and subsequent airflow will be detected and recorded by the pair of airflow monitors located at the termination of the left and right bronchi. If decreased ventilation persists, the CNS will appropriately begin to degrade the health of the mannequin, computing appropriate cardiovascular and neurologic responses, changing vital signs and by making the skin appear cyanotic, creating gasping sounds, or creating a bucking movement of the torso.

In another embodiment, a section of the ribs on the side of the torso will be designed to allow easy insertion and removal of the pleural portal. This portal will also flex and move with the outer rib sections throughout the breathing cycle. The portal will include an outer layer of realistic skin, anatomically correct muscle and fat layers, integrated blood pack for superficial bleeding, and structural rib and connection system. On the inside of the portal, an airtight pleural sac will be molded from 10 mil polyethylene to simulate the lining of the pleural space. The lining will be firmly molded to the back of the rib portal to provide an accurate "pop" when a clamp punctures the pleural space. The pleural space will be both liquid and airtight. Nested inside of the pleural space will be the elastomeric lung and fittings for connection to the lung inflation system, the air control system, and the blood flow system. This will be the only connection necessary to install the entire portal assembly. If a chest tube or chest dart is placed, this entire assembly will be replaced. This design was chosen to reduce the number of expensive sensors and materials that are destroyed during the process of relieving a tension pneumothorax or a hemothorax via needle decompression or chest tube thoracostomy, respectively.

In another embodiment, the section of skin and tissue layers that are destroyed during intervention comprise a replaceable portal area. A section of the rib cage is halved along the ribs and allow for the outer section to open along a hinge. Once opened, a layer of either polyethylene or similar material could be trapped between the two sections forming a simulated pleural membrane which is resistant to puncture, provides adequate "pop", and creates an air and water-tight space behind it.

In another embodiment, the polyethylene sheeting is dispensed from a replaceable roll situated along either the sternum or thoracic spine. This would allow easy turn-around of the simulator to allow the next user to place a chest tube or chest dart into a pressurized chest cavity. This roll could dispense the sheeting either manually, or be actuated by a motor-driven mechanism.

In another embodiment, when the system is operating, the ACS central processor has the ability to fill the pleural space with either air or blood, depending on the mannequin configuration selected via the control panel on the back. As the elastomeric lung is inflating and deflating, air or blood can be leaked into the pleural space, eventually preventing the lung from inflating. The solenoid valve on the lungs allows actual airflow into the lung with each squeeze of the artificial ventilation device while preventing air from leaving, pressurizing the chest cavity and requiring needle decompression. If not treated, the heart and circulation subsystems will respond to this decrease in airflow accordingly, as will the tracheal deviation inflation units. During a tension pneumothorax, for instance, increased intrathoracic pressure with decreased venous return can generate distension of the jugular veins: pressurizing the mannequin's jugular veins can simulate this sign and alert the medic to presence of this condition.

In another embodiment, the centralized location of the airflow sensors will naturally detect a decrease in lung volume and translate it into the appropriate responses necessary for a medic to diagnose and treat the condition. With proper execution, realistic release of air through the chest dart will occur if the pleural space is punctured. This design will also allow the medic to make a mistake and puncture the lung with the tip of the chest dart. If this occurs, the lung will no longer be air tight, and will not inflate when the air pump drives air into it. The end result will be reduced airflow past the central sensor, thus allowing the central processor to sense this mistake, and degrade the condition of the simulator appropriately.

In another embodiment, another feature of this design is that in the event of a hemothorax, the primary indicators of success are created for the medic allowing him to determine that his treatment was successful. If the pleural space is filled with blood, as the central processor registers the amount of blood pumped into the pleural space and adjusts the baseline condition of the mannequin, the presence of blood also restricts the lung from expanding. This is sensed as decreased airflow in the bronchial airflow sensor on that side. This sensing system, in combination with the preconfigured settings on the rear control panel, enables an accurate sequence of physiologic eyents to take place. Thus, when the medic decides to place a chest tube, blood will actually come out of the chest tube (this being the primary indicator that the tube has been placed successfully) and if suction is then applied to the tube the lung will reexpand and airflow in the corresponding bronchus will resume.

In another embodiment, the respiratory system will mimic the structures of the human system. On each side of the chest will be a rigid, partial rib-cage shaped body. This body will include rib shaped and oriented sculpted features that will be palpable through over-lying soft tissues (which simulate skin, fat and muscle as appropriate). This body will be mounted to such a linkage that it will rise and fall in a manner similar to the human rib-cage motion during breathing. At a minimum, this linkage will be a four-bar linkage designed such that the lower margin of the rib-cage body moves at approximately a 45 degree angle to the lengthwise axis of the mannequin, and the upper margin of the ribcage body moves nearly parallel to this axis. More complex motions are also possible because the ribcage body has two independent degrees of freedom, enabling both breathing styles that involve mostly the chest and diaphragmal breathing (in which either the upper part of the chest or the lower part rises and falls predominantly).

In one embodiment, the ribcage body forms the outer boundary of a sealed chamber, of the same nature as the pleural cavity in the human body. The inner surface is part of the mannequin's internal frame, and a flexible margin connects the inner and outer rigid elements, thereby creating a closed cavity. This cavity includes ports mounted in the mannequin's internal frame that permits the injection of blood simulant or air, and the removal of either, so simulate the conditions of hemothorax, pneumothorax and/or tension pneumothorax.

In another embodiment, a closed flexible bag, containing a very soft, foam-like material with large pore spaces occupies the space between the ribcage body and the mannequin frame, and act as the human lung. It has an opening that passes through the internal frame and connects with the airway components described below. The flexible bag is fashioned of a tough material that is resistant to punctures from surgical instruments. This bag has the shape of the cavity between the internal frame and the ribcage body when the ribcage body is in the "fully exhaled" state. The system is assembled in this condition so that there will be minimal volume inside the space but outside the bag. Thus, when the ribcage body is actuated to "inhale", the change in volume in the bag is equal to that of the change in volume of the pleural cavity. This also enables the collapse of the bag when blood simulant or air is injected into the pleural cavity to simulate collapsed lung conditions.

In another embodiment, the ribcage body will also have included a variety of openings that will be sealed by overlying soft tissue materials and/or removable portals. These openings will support the treatment of the collapsed lung conditions by either releasing air through a thoracostomy needle or air or blood simulant through a chest tube. Because the design of the system parallels that of the human anatomy, accurate responses will be presented, namely the sudden release of air through the needle or the passage of blood simulant through the chest tube.

In one embodiment, the quantity of air entering and leaving the lung chambers (left and right) will be measured using airflow sensors mounted to the internal frame and forming part of the passage of air from the trachea and primary bronchii elements to the flexible lung bags. The trachea and primary bronchi are fashioned from anatomically realistic materials and include anatomy from the oral cavity down to a short distance past the carina. The left main bronchus will depart at a sharper angle than the right, as is found anatomically.

Rate, depth and rhythm of respiration will be computed and controlled by the central physiology processor. Respiratory rate and rhythm will respond to sensed changes in total blood volume, hemodilution and airway patency (as sensed by the bronchial airflow sensors). Severe angulation of a fractured C-spine will be sensed and result in phrenic nerve paralysis and respiratory arrest.

Neurological System Model

In one embodiment, ACS can exhibit several levels of consciousness (LOCs): conscious, obtunded, unconscious or unconscious and neurologically compromised (irreversible loss of higher brain function.) ACS' level of consciousness responds to computed changes in systemic blood pressure and sensed changes in hemodilution and bronchial airflow. If conscious, ACS exhibits signs and behaviors characteristic of a conscious human patient (and the absence of these signs if unconscious):

The eyelids open and blink at intervals.
The eyes move.
The eyes and head turn in the direction of a voice or loud sound.

In one embodiment, ACS possesses the ability to speak. ACS can also greet a medic by name, based on sensing the medic's information via RFID tag. ACS could optionally be able to speak in a language other than English to provide realistic exposure of the trainee to scenarios involving the treatment of enemy combatants or local civilian casualties. The head turns in the direction of touch, grasp or pain to a limb. ACS vocalizes screams, moans and other expressions of pain in response to trauma.

In another embodiment, ACS exhibits "muscle tone" when conscious: skeletal joints exhibit a degree of resistance similar to that of an awake and responsive adult. When ACS becomes unconscious, the joints become loose and the body "floppy". ACS vocalizes slurred or incoherent speech if obtunded.

In another embodiment, head motion is continuously sensed by solid-state accelerometers. If the head is subjected to a sufficiently large force due to improper extrication, transport or other handling, the neurological system model will enter a state of concussion and loss of consciousness will occur.

In another embodiment, ACS can simulate signs of a generalized (tonic-clonic) seizure, manifested by loss of consciousness, body stiffening, jaw clenching and simulated rhytlumic muscle contractions resulting in shaking of the body. The implementation of these effects is via a seizure state in the neurological system.

In another embodiment, an array of temperature sensors distributed in the limbs, head and thorax of the system provide environmental temperature data that will be used, in conjunction with a core temperature and thermoregulatory model, to compute entry into hypothermic or hyperthermic states. In either state, appropriate changes will be generated in vital signs such as heart rate, respiratory rate, and level of consciousness. For example, a hypothermic ACS will become obtunded and unresponsive. Computational models of physiology will be designed around and optimized for trauma physiology and response to treatment in the field.

The animatronic systems of the ACS enable physical signs of the transition between consciousness and unconsciousness. Similarly to the head and neck elements, the joints at the shoulders and hips are also designed to enable a transition between a stiff, posable state and a limp state.

The hip and shoulder joints is to enable a range of motion similar to those of a normal trauma patient, and in the case of a human-form ACS, this requires a spherical joint at each hip and shoulder location, or a combination of other joints (e.g. serial rotary joints or differential joints).

Virtual Fragility

A medical simulator design innovation employed in multiple instances in the ACS is the use of sensors to actively measure physical variables associated with motion, angulation, force or acceleration, followed by processing to detect whether the measured physical variable has exceeded limits that would cause injury in an actual nominal human being. We term this use of intelligent sensing to detect simulated injury virtual fragility. The term indicates that we are replacing the actual fragility of a mechanical or structural element with a robust embodiment of the same element combined with sensing to detect the exceeding of limits on physical parameters that would have caused injury in an actual human patient.

For example, a conventional method to detect whether a trainee has exerted forces or torques on a simulated patient's head of sufficient magnitude to cause injury to the cervical spine would be to build a simulated cervical spine of such material and construction that the simulated spine would have similar fracture limits as an actual human cervical spine. The spine would then fracture or dislocate under application of input forces and torques similar to those that would injure an actual patient. The disadvantages to this method include that the broken elements of the simulated spine need to be physically replaced after each incidence of injury, and there is no automated, quantitative detection and recording of the time, magnitude, or duration of the action causing the injury.

In the inventive virtual fragility methodology, physical fragility is replaced with intelligent sensing of physical parameters in a robust mechanical structure. In the example of detecting cervical spine injury just cited, in one embodiment an angulation sensor (goniometer) and accelerometers are employed to continuously sense (1) the angle of the skull relative to the chest and (2) the acceleration of the head-both absolute acceleration and acceleration of the head relative to the body. These sensors communicate with the central processor which is programmed to detect whether nominal physiological limits of cervical spine angulation and head acceleration have been exceeded. If so, the program executing on the central processor records the time and sensor data during the injuring event, and further may cause changes in physiological state—for example, a force to the head of sufficient magnitude may cause the ACS to enter an unconscious state.

Eye Design

In another embodiment, the ACS eye system provides actuation in a number of different degrees of freedom. As with human eyes, the eyes pitch (move up/down) in unison, but unlike human range of coordinated eye motion, they yaw (move left/right) in unison without including vergence (aiming at a single point closer or farther away), and they blink in unison, rather than including a single eyelid winking action. Further, it is possible for the user to manually open the eyelids individually to evaluate pupilary condition.

These capabilities enable the ACS unit to blink realistically, exhibit rolling back of the eyes and closing of the eyelids during unconsciousness, and look in the direction of human voices or loud noises, demonstrating responsiveness.

The eye assembly unit includes a base-frame, forming the back of the unit and support arms that extend forward from it. To the support arms is mounted a pitch-frame which pivots about an axis defined by the center points of each of the eyeballs. To the right end of the pitch-frame is mounted an R/C servo, with its rotational axis passing tlrough the center point of the right eye, and perpendicular to the plane of the pitch-frame. The right eyeball unit is mounted to the R/C servo output shaft and to a bearing concentric with it below the R/C servo to provide stability. A control arm extends backwards from the servo output shaft behind the eyeball. The left end of the pitch-frame includes bearings to mount the left eyeball unit. The left eyeball unit includes a control arm extending backwards from its axis of the same length as the right eye control arm. The control arms are connected to each other by a rigid link such that when the right eye R/C servo turns the right eye, the left eye turns through the same angle due to the action of the connecting linkage (control arm, rigid link, control arm). This accomplishes the coupled yaw motion of the eyes. Depending on the choice of length of the rigid link, the eyes may gaze in a perfectly parallel direction, or if slightly longer, may give the eyes a slight inward fixed vergence. The latter might give the user a slight sense that ACS is focusing on them, rather than to the distance.

The pitch-frame has mounted to it an R/C servo that may have its rotational axis passing through the rotary axis of the pitch-frame, or it may be parallel but offset to it. In the former case, this servo directly drives the pitch action of the pitch-frame. In the latter, a series of gears or a toothed belt drive will transmit the torque from the servo to the motion of the pitch-frame. This accomplishes the pitch motion of the eyes, moving in unison.

Figure 8:
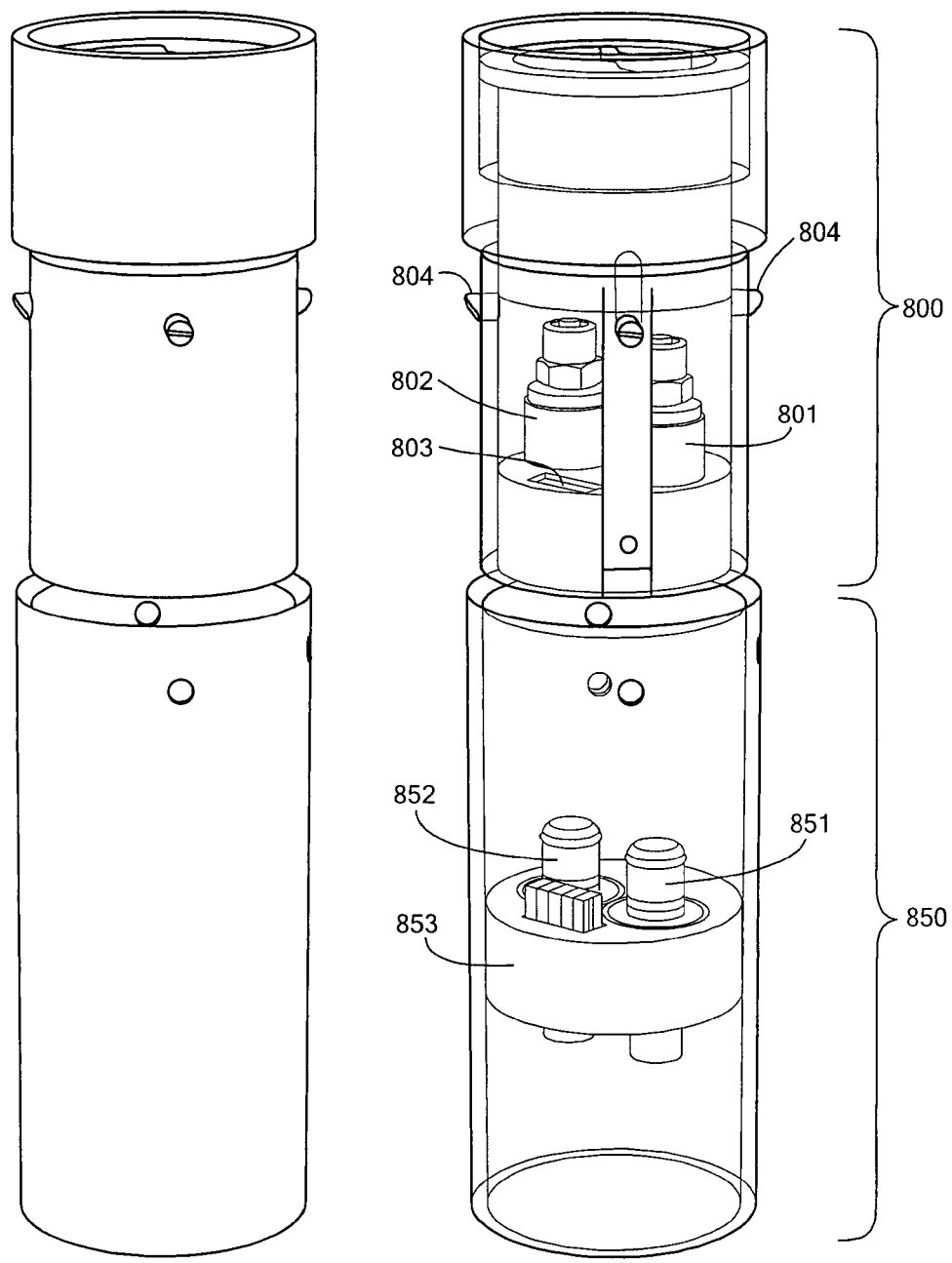
FIG. 8. is an assembly rendering of a common trauma module connection including fluid, data, power, and mechanical connectors.

An alternative design mounts the servo to the base-frame, and through a gearing mechanism, with a gear section mounted to the pitch-frame, drives the pitch-frame about its axis. The eyes are protected from contamination and damage by a sealed clear housing (as shown in FIG. 8). Unlike this figure, the eyelids are mounted outside of the housing to provide manual access to them. The eyelids are mounted about the same axis as the pitch-frame. A single servo, mounted to the base-frame, with its axis parallel to the eyelid axis controls the eyelid action.

One embodiment includes manual actuation of the eyelids with control arms extending up and down from the eyelid component at the location of the rotary bearings. The upper and lower ends of the arms are attached to elastic cables that extend backwards from the eyelids. They are connected to control arms extending up and down from a shaft concentric with and mounted to the eyelid servo. As the servo rotates the upper control arm backwards, the eyelid opens, and vice versa. The presence of the elastic cables permits a user to manually hold the eyes closed when otherwise in an open state, or open when in a closed state. Upon release, the eyelids return to the state determined by the ACS consciousness level. The elastic cables prevent damage to the servo due to excessively rapid back-driving, which could occur if there was a geared or belted connection between the servo and the eyelid components. Speed of eyelid motion is controlled by the rate of servo motion, and increased further by selecting long servo control arms and short eyelid control arms.

Another embodiment describes the range of motion of the eyelids limited by hard stops in the skull/face unit. The eyelid servo is commanded to open the eyes slightly beyond the open limit, and close beyond the closed limit. In this manner, there will be a slight preload (due to the elastic cables) that prevents the eyelids from being free to oscillate (which remains a possibility if the eyelids are commanded to an intermediate position between open and closed). Suitable selection of bearing materials with some finite friction minimize this, though care must be taken so that the friction is not so high that the elastic cable forces are lower than the friction forces.

In one embodiment, the eye assembly is a self-contained unit that could be easily replaced if damaged, rather than requiring disassembly of excessively large numbers of components from the ACS head. The eyes and constructed within a sealed, self-contained unit. The housing prevents damage to the system and prevents fluids from entering the actuator systems. The eyes are actuated so that they pitch and yaw in unison, and the pupils are independently controllable. Another embodiment employs servomotors of the type used in radio-control vehicles to actuate the eye motion. The eyelids are mounted externally to the sealed unit so they may be manually opened by users. A cam mechanism opens both eyelids simultaneously, which close upon retraction of the cam through a spring which maintains contact between the eyelids and the cam. This spring is of sufficient compliance so that the user may open the eyelid with effort similar to that required to open a human eyelid.

An alternative embodiment employs low pressure pneumatic cylinders to drive the eyelid motion. The pressure is selected such that it is not high enough to prevent manual actuation, but is sufficient to maintain the open or closed state regardless of the posture or orientation of the head.

The irises are constructed as toroidal balloons, mounted such that they are prevented from expanding radially when inflated, therefore contracting the pupil instead. They are actuated pneumatically.

Skeletal Chassis

In one embodiment, the skeleton is the fundamental structural element of the entire system. In an exemplary embodiment, the ACS skeletal chassis is extremely durable, made from a combination of non-brittle resin and reinforced metal components, and naturally articulated to move and breathe like a real human. For example, the rib sections are articulated only in the areas necessary to ensure that a medic can determine that the casualty is breathing, both unilaterally and bilaterally, and can realistically administer CPR.

The skeletal system is anatomically correct in areas that are important for correct diagnosis and treatment, as well as in areas that affect natural movement. The skeleton articulates in the appropriate major joints: cervical spine, lumbar spine, shoulders, elbows, wrists, hips, knees, and ankles. Anatomic position of the skeleton is monitored with flex sensors in key locations, while overall body location in the training environment is recorded by an on-board GPS unit, allowing tracking of the system's position during initial treatment and evacuation. Reference landmarks are obvious and durable: for example, the inguinal ligament is a durable landmark to identify the femoral pulses.

The skeleton has three "modes": conscious, obtunded, and unconscious. Conscious mode keeps certain "muscle groups" tensed to aid in movement and transportation of the mannequin. However, if the on-board central physiology processor determines, on the basis of continuous observation of physiological parameters responding to injury treatment, that the casualty loses consciousness, the "muscle groups" release and the skeleton goes limp, and becomes very difficult to carry. This can be done either with mechanical solenoid movement or with electromagnets at key areas such as the hips and scapulae. Other embodiments would be releasable detent-type mechanisms points smoothly "snap" into various positions, but the detent mechanism is retractable to allow free motion); air bladders pressing friction pads against each other within the joint; and, for the spine, running a tension cable through its length, which can then be tightened or loosened to change neck tone.

The cervical spine incorporates an accelerometer to provide relative position for the head unit. The skull has an accelerometer to register forces sustained during treatment and movement of the casualty. This data indicates when serious additional injuries are sustained during the treatment phase after initial injury.

In one embodiment, in the same way that the intercostal muscle groups contract and the costo-vertebral and costo-chondral joints flex to create the rise and fall of the chest, ACS creates similar flexibility using contractile actuators to drive the rib cage up and down. This is in keeping with the paradigm of duplicating, where feasible, the natural anatomy of the body and its functions.

In another embodiment, the shoulder system combines several technologies into a novel system for replicating accurate anatomical movement of human shoulder anatomy. Beginning at the sternum, the clavicular strut is created from an accurately shaped 0.50" to 0.75" metal rod. The sternal termination of this clavicular strut is comprised of a high-displacement ball end which is held in place by a 0.25" OD partially-threaded bolt. The opposite end of the clavicle connects rigidly to a scapular hub via either a threaded connection with a setscrew, or with a pressure fitting which when clamped prevents the clavicle from rotating relative to the hub. For extreme torsional pressures, the clavicular strut may be through-bolted to ensure proper alignment and prevent rotation within the hub if substantial pressure is applied to the shoulder assembly. The location of the joint between the clavicular strut and the scapular hub mimics that of the acromion in real human anatomy. It's height and width should replicate the appropriate landmarks to provide realistic feeling to the user.

Rigidly attached to the back of the scapular hub is the second half of the clavicular wishbone. This wishbone is attached to a central rotary damper that provides a configurable amount of damping force against the rotational forces exerted by the wishbone assembly.

The design of the jointing systems allows central processor control of muscle tone, but every joint has a built in amount of tolerance to allow a natural amount of play when articulated. This tolerance enables ACS to feel like a real human when moved, carried, or lifted. These tolerances are specific to each joint location.

The neck employs a combination of pneumatic cylinders, flexible cables and a heavy spring to generate motion and changes in muscle tone. One cylinder changes the compression of the spring, which is constrained by an upper plate, and compressed by the cylinder below. The cylinder is rigidly mounted to the thoracic skeletal structure. The upper plate is constrained by three or more cables. When in the uncompressed state, the neck is limp, and can easily be moved manually. It is further of insufficient stiffness to support the weight of the head against gravity. When compressed, the spring shortens and increases tension in the cables. In this state, the neck is of sufficient stiffness to support its own weight and resists manual manipulation.

The head is caused to turn in the yaw direction through the use of a rotary pneumatic actuator. It has a range of motion of approximately 60 degrees in each of the left and right directions. The flexibility of the neck allows slightly more motion in either direction.

Alternative embodiments include the replacement of the pneumatic cylinders with electromechanical linear actuators such as lead screws that cannot be back-driven. The shoulder joint employs a ball joint similar to those used in camera tripod mounts. It allows spherical motion, and is controllable such that resistance to motion can be varied. When in high-resistance mode, the arms will resist motion relative to the body, making it easier to move the body as a unit. When in low-resistance mode, the arms will be limp.

Skeletal motion is detected via a pair of perpendicularly oriented accelerometers. These were selected due to their minimal drift, high temperature tolerance, minimal size, and cost-effectiveness. The horizontal sensor is oriented along the axial plane of the skull and records forward and backward motion as well as side-to-side movement of the skull relative to the base of the neck. A second accelerometer is angled at 90 degrees to the first sensor and provides twisting data of the skull relative to the base of the neck. These sensors are housed in a shockproof and waterproof container that keeps them out of harms way.

At the base of the neck is a second pair of similarly orientated accelerometers that provide a reference plane for the ACS body. Without this, it may not be possible to differentiate that the head of ACS is twisted to one side from the whole body of ACS being in a similar position. These systems function regardless of orientation and do not require a calibration phase due to their method of detection. The sensors selected use a small heating element to create micro-eddies of thermal difference to gather position data relative to gravity.

When the head accelerometers detect a difference in the angle of the torso, they will attempt to orient the head so as to keep a parallel horizontal plane relative to gravity. This assumes that the skeleton is in conscious mode. The purpose of this is to make the head movement more realistic. It would do this by articulating the neck actuators accordingly. Body angle (orientation) will be continuously recorded-if a medic fails to roll a body to examine the back for an exit wound, for example, this can be seen in the data record.

Environmental Design

The central processing unit is mounted within a reopenable and resealable container mounted within the structure of the internal skeleton. Connections leaving the container are sealed through the application of high temperature silicone.

Circuitry and otherwise exposed connectors are similarly sealed throughout the system. The audio input and output system in the head (i.e. loudspeaker and ear-mounted microphones) can be provided as commercial waterproof systems.

Wiring and tubing that passes through joint regions is selected and routed so that they have an unlimited lifetime of repetitive flexing or bending. Wiring in rigid regions passes through protective channels within the skeleton's members. Rugged electrical and fluid connectors are used at the limb attachment points (upper and lower legs and arms), and the connectors are physically reinforced using aligned rods and sockets, and attachment is achieved using robust mechanical latches. One embodiment uses a latching system similar to that of airline seat belt buckles.

One possible jointing system involves the use of light pipes as a main bridge for cross-joint communication. A system of infrared LED emitters and receivers would allow non-contact transmission of data across major articulated areas such as the elbow and knee. Semi-circular disks of acrylic or similar plastic would reflect light passed through the broad side of the plastic, through its length, out to the edge where similarly it would be received by the opposite LED. This configuration would also allow the joint condition to degrade gracefully over time as no matter how scratched the joint lighting system becomes, the receiver would be sensitive enough to compensate. The use of infrared light would permit usage at night without light leakage.

Another embodiment for the power transmission is to incorporate positive and negative sides to each long bone member. The outer half of the bone could be a substantial grounded electrical member as well as providing the strong structural qualities found in conductive metals. The center half of the bone would provide positive power to the extremities. Brush connectors or some large, easily cleanable contacts would facilitate power transmission reliably during harsh conditions found in military training environments.

In an exemplary embodiment where ACS is a tetherless, autonomous system, there is the requirement that it has an internal power supply. Embodiments can include compressed gas and rechargeable batteries. Less preferred systems might include fuel cells or hybrid engine/generator systems.

Compressed gas can be used to provide motive force for mechanical actuators and brakes, however to provide a sufficient "lifetime", high pressure gas is employed with a compressor to recharge the unit between uses. In addition, the embedded computer and control valves would require electrical power.

In one embodiment, ACS makes use of rechargeable batteries to supply power for the computer, actuator, brake and sensor systems. A small air compressor, run intermittently, is employed to pressurize the blood simulant reservoir. One exemplary system is the Milwaukee V28 battery system. This commercially available battery system was designed for use with heavy-duty cordless power tools, and is currently has the highest power storage capacity of any cordless power tool battery. The recharge cycle is one hour in duration.

The battery is rated at 3 Amp-hours at 28V. A single battery can supply the central processor module at its estimated power consumption of 10 W for eight hours of continuous use. In one embodiment, two batteries are used to provide power for the total system, with care taken to minimize power consumption in the braking and actuator system.

An exemplary embodiment provides a user-friendly system to recharge the battery packs. A recharging system converts power supplied from such sources as 110 VAC typical of house-hold outlets, or vehicular 12 VDC or 24 VDC, or others that may be deemed useful by the user, into DC current and/or voltage trajectory that rapidly charges partially or fully discharged battery packs. It consists of the electrical conversion and control circuitry, and a portable housing which includes space to enclose the circuitry and form fitting enclosures into which the battery packs are inserted to mate with water resistant connectors of a type which mate with those integral to the battery packs. The recharging system is splash and rain resistant to support outdoor use or use in environments in which incidental contact with water or other fluids is possible.

ACS Control Panel

In one embodiment, tactile controls are used: robust physical knobs with detents that click into position, switches that give unambiguous tactile feedback and clear visual indicators. Physical controls have the beneficial property of unambiguous affordance: they move and actuate in simple, intuitive ways. Rotating a dial or pushing a switch is intuitive to every user—whereas training (or at least a user manual) is often required to understand the interface conventions of complex software, particularly if hidden menus and modal dialogs are used.

In another embodiment, continuous rotary encoders and momentary contact push-button switches (i.e., stateless controls) with LEDs to indicate the parameters selected by the controls. Compared to conventional rotary and linear switches that indicate their position by their physical position, stateless controls offer several advantages. First, this approach permits one-button reset of the entire control panel. When setting up a new scenario, it is often helpful to start with a clean slate. With conventional controls, all dials and switches must be physically returned to their "off" or default positions to reset the system. This is time consuming, and if a previously set switch is inadvertently overlooked, a function may be mistakenly selected. By using stateless controls to select parameters which are indicated by separate LED displays, we can perform a "soft reset" that returns all parameters to their "off" settings-this is then appropriately indicated by the LEDs. The controls themselves do not have to be moved to perform this reset.

In another embodiment, the use of stateless controls and separate indicators also enables the capability to set or change any parameter on the control panel remotely via the Instructor Remote Monitor. The change is wirelessly communicated to the system, which then sets the appropriate parameters and changes the corresponding LED indicators. The control panel always shows the correct current settings of all parameters, even if they have been changed remotely.

In another embodiment, the configuration of the panel is obvious at a glance: there is one control for each function. The current setting for each function can be determined simply by looking at the control. There are no "hidden controls" (such as functions hidden in drop-down menus): a medic instructor can learn ACS' functionality by inspection of the control panel. In a very real sense, the control panel is self-instructive: it is the user manual.

In another embodiment, the controls can be set in any order and changed at any time: there are no sequences to learn or memorize. Each control specifies one and only one action and nearly all functions are independent of other controls (a few dependencies are appropriately handled: for example, if another action is set to occur during non-responsive cardiac arrest, the action will not execute). In the terminology of user-interface design, this is a non-modal interface, offering direct access to each of ACS' features.

Numerical values for activation times and durations are entered via rotary encoders and displayed with backlit LCD displays. Activation times are specified in minutes from the scenario start time (t=0). Bar-graph indicators will be used to show the battery charge, RF signal strength from the Instructor Remote Monitor, and the levels of the internal reservoirs for blood and IV fluid.

In one embodiment, the control panel will be protected by a hinged cover. A flexible gasket encircles the periphery of the cover, sealing the control panel from moisture and dirt. All controls will be illuminated so the panel can be configured during field exercises at night. (Panel illumination can be turned off if desired.) A microswitch or magnetic proximity switch keyed to the cover hinge motion is used to automatically turn off the indicator lights and panel illumination when the panel is closed to conserve power (a "refrigerator light" mechanism).

Audio Output System

Audio output such as speech, labored respiratory sounds and other vocalizations is digitally recorded in a studio, then edited, formatted and transferred to non-volatile solid-state memory in the central processor. The individual sounds are stored in an indexed database; so individual phrases, responses or sounds can be triggered as desired.

When triggered, the stored digital waveforms are sent to a digital-to-analog (D/A) converter and output to an audio amplifier and loudspeaker. In one embodiment, the speaker is a long-throw voice coil model with a polypropylene cone and a butyl rubber surround, sourced from a supplier of car stereo systems-built to be weather and shock resistant and designed to function reliably in extremes of temperature. The speaker is mounted in the skull cavity (not the oropharynx, to avoid interference with airway assistive devices) with acoustic channels built into the zygomatic arches and other facial bones so that the sound will be perceived as emanating from the face.

The human voice is a cue for presence and simulator realism, so to achieve the highest sound fidelity a preemphasis frequency equalization system can be employed. The frequency response of the audio output system is measured (the amplifier and speaker, with the speaker in place in the head.) A 20 Hz to 20 kHz frequency sweep is played through the amplifier and speaker and the resulting sound output is recorded at a typical "medic distance" from the body using an instrumentation-grade microphone with a flat frequency response. The microphone signal is digitally recorded and Fourier transformed (using Matlab) to obtain the frequency response of the audio output system. A compensating frequency response function is then computed: this function gives the frequency response curve that "flattens" the amplifier-speaker frequency response to produce an even response over the audio range. The digital recordings of voice and other vocalizations are preemphasized (i.e., prefiltered) with the compensating frequency response curve before being stored in system memory for playback. The result is high-fidelity sound output for these recordings, despite the relatively small speaker diameter and other acoustic constraints of a speaker system mounted in the volume of a human head.

Instructor Remote Monitor

In one embodiment, while no additional apparatus or controller is required to set up the desired trauma scenario, an illustrative embodiment employs a wireless monitor to give an instructor the ability, if desired, to program, start and end a scenario remotely. The monitor also permits an instructor to view vital signs and other data in real time, monitor scenario progress, and remotely alter the scenario as desired. Access to more advanced features and configuration data of the ACS computing core can be accessed via the Advanced panel on the tablet PC. ACS will allow real-time display and control of the physiologic subsystems and their interaction throughout its operation.

Automated Debriefing

Once the training sessions have been completed and the simulation has ended, in one embodiment the Scenario Coordinator will use the wireless tablet PC to download the recorded medical treatment data via a simple Graphical User Interface (GUI) on the tablet PC. This data represents all of the variables and data points collected by the sensors throughout the mannequin during the training scenario. This data is then parsed by the Automated Debriefing software and turned into a series of talking points that are correlated to medical events that occurred during the simulation.

The purpose of the Automated Debriefing system is not to replace the medic instructor, but to generate talking points around which a higher level of conversation can take place between the unaided medic and the instructor. Because ACS functions as a standalone unit, the instructor may not be present to witness the treatment provided to the casualty. During these debriefing sessions, the instructor will have access to the identities of the medics, the entire medical treatment history, vital signs, hemodynamic values and interventional events that were generated or controlled by the medics during the FTX as well as access to the specific mannequin configuration settings which were preset by the Scenario Coordinator at the beginning of the session. This data will provide the instructor a better tool for reviewing the decisions the medic made.

Because the physiologic data collected by ACS can be compared to the configuration settings established prior to the FTX, and because the system design allows intervention independent interpretation of treatment, standardized debriefing summaries can be generated. This standardization ensures consistent training among instructors, a Military Occupation Specialty (MOS) which rotates relatively frequently. Decisions regarding relative weighting of treatments, criteria for successful treatment and triage priorities can be established by the instructor corps.

In another embodiment, by design, ACS simplifies training requirements for the medic instructors. Basic system operation is simple. Access to the deeper level programming possibilities is possible through the tablet interface, allowing instructors with more advanced training to modify training requirements or specific areas to be tested.

In another embodiment, by combining continuous physiology and time-integration, the new medic training system can create individualized milestone-linked timelines of care. This capability transparently records time of injury, time to airway control, time to hemorrhage control, effectiveness of treatment and other important milestones identified by the instructors. At the end of each exercise, every student is be given a personalized time-stamped record of intervention which will serve as the student's physical record of performance and which can be archived electronically as the instructor's record of individual and class performance.

Description of Exemplary Embodiments

FIG. 6 is a schematic drawing of combined pneumatic and blood simulant systems of the ACS. Components include an air and fluid pressurization block 600, a neck articulation system 610, a hemo-pneumothorax system 620 and limb trauma modules 630, 640, 650, 670, 680, of which a plurality are shown.

The function of the air and fluid pressurization block 600 is to store high pressure air and provide air at lower pressures to the neck articulation system 610, and the fluidic systems of the ACS. High pressure air is stored in one or more reservoirs 601 at 150 psi, which is reduced to 30 psi and 4 psi through two different regulators 602, 603. The 30 psi air is supplied to the neck articulation system 610, described below. The low pressure air is supplied first to the blood simulant pressurization chambers 604 through a normally closed (NC) two-way, three-port solenoid valve with spring return 605. Upon startup of the ACS, this valve opens, pressurizing the blood simulant. During refit of the ACS, the valve 605 returns to its NC state, and the pressurized air is allowed to exhaust through a silencer 606. The low pressure air is also supplied through a normally open (NC) two-way, three-port solenoid valve with spring return 607 to the intravenous (IV) fluid collection and ejection chambers 608. During normal operation, the chamber 608 is exhausted, allowing the IV fluid collection bag 609 to expand as it accepts administered IV fluid. During refit of the ACS, the valve 607 opens, forcing IV fluid out of the collection bags 609 and through an NC two-way, two-port valve 690 and out of the ACS.

Installation and replacement of the blood simulant containers 610 is enabled through the use of self-sealing quick-disconnect valves 611. Measurement of hemorrhage of blood simulant is accomplished with a flow sensor 612, and the quantity of IV fluid administered is measured with a second flow sensor 613. Blood simulant is prevented from flowing out through the ACS fluidic systems prematurely by a NC two-way, two-port solenoid valve with spring return 614.

The ACS torso includes four quick-disconnect structural/fluidic/electrical (SFE) connectors 691, one each located at the left and right shoulder and left and right hips joints. Each connector 691 includes fluidic channels for blood simulant and IV fluid and electrical connectors to support sensors and actuators described above and below. To these connectors 691 may be attached any appropriate limb trauma module 630, 640, 650, 670, 680, examples of which are described as follows.

The upper limb (either arm or leg) traumatic amputation module 630 includes a mating SFE connector 692. As IV fluid will not be administered to a traumatically amputated limb, there is no active IV fluid connector element in this module. The blood simulant connector supplies fluid to three outlets. Two, corresponding with arterial flow 631 and soft tissue seepage 632 are controlled with a NC two-way, two-port, spring returned solenoid valve 634, which enables the generation of pulsatile flow and the cessation of flow upon proper tourniquet or other hemostatic device placement. The third outlet corresponds with bone marrow seepage 633 which is modulated only by internal blood pressure.

The upper limb, undamaged, IV collection module 640 includes a mating SFE connector 692, and at the distal end, a second SFE connector 693 to attach to a lower limb module 660. The blood simulant enters the module 640 and is channeled either to the lower limb module 650, 660 or to the IV fluid collection loop 641, 642, 643, 644 by a two-way, three-port, spring-returned solenoid valve 645. The fluid flow to the lower limb 650, 660 is understood from the schematic. The flow to the IV fluid collection loop 641, 642, 643, 644 is momentarily enabled during refit to fill the loop with blood simulant. The loop includes a self-sealing, elastomeric vein 641 and a pair of one-way check valves 642, 643 with low, but non-zero cracking pressure, which are arranged anti-parallel to each other, in series with the IV loop. The check valves 642, 643 cause a back pressure which causes blood simulant to slightly expand the elastomeric vein 641 (and optional elastomeric bladder 644 to increase available simulant). This pressurized blood simulant is expelled through an IV needle placed into the vein 641, recreating the phenomenon referred to as "flash-back". The check valve 643 oriented to allow flow back towards the elastomeric vein is present so that if an IV needle is placed and either an IV bag is placed below the elevation of the ACS, or if the needle is left unattached and the arm is lowered below the IV collection chambers 608, IV fluid will flow out of the needle. This loss of fluid is measured by the flow sensor 613 mentioned above.

The lower limb traumatic amputation module 650 is hydraulically equivalent to the upper limb traumatic amputation module 630. Its SFE connector 694 is designed to enable connection only to the distal end of a matching upper limb IV collection module 693, preventing direct attachment of a lower limb to the shoulder or the hip.

The lower limb IV collection module 660 is hydraulically equivalent to the upper limb IV collection module 640, with the exception that there is no distal SFE connector 693 to attach additional limb segments.

The schematic diagram shows a variety of possible combinations of upper and lower limb trauma and IV collection modules. As illustrated, this configuration includes: a traumatic upper arm amputation module 630; a combination of an upper arm IV collection module 640 and a lower arm traumatic amputation module 650; a combination of upper and lower leg IV collection modules 640, 660; and an upper leg traumatic amputation module 630. It should be recognized that the function of the traumatic amputation modules would be duplicated in a non-amputation module with major hemorrhage functionality.

The schematic shows that the ACS torso contains the systems to supply and measure blood simulant lost, collect and measure IV fluid administered (and/or lost), control the limb module valving and pulsing (see below) and record module sensor signals (e.g. tourniquet pressure sensing, see below).

The ACS torso also contains the pleural cavities 621, which are capable of simulating hemo-thorax, pneumo-thorax and tension pneumo-thorax conditions. The conditions are created in the ACS by admitting low pressure air or blood simulant into one or both of the pleural cavities 621. This flow is controlled by a series of NC two-way, two-port, spring-returned solenoid valves 622. During refit, the low pressure air or blood simulant is ejected from the pleural cavities 621 by opening exhaust valves 623 (also NC two-way, two-port spring-return solenoid valves).

The neck articulation system 615 also part of the ACS torso, and is comprised of four McKibben-type air muscles 616, each of which is activated by a NC two-way, three-port, spring-returned solenoid valve 617, all of which are exhausted to a common silencer 618.

Figure 7:
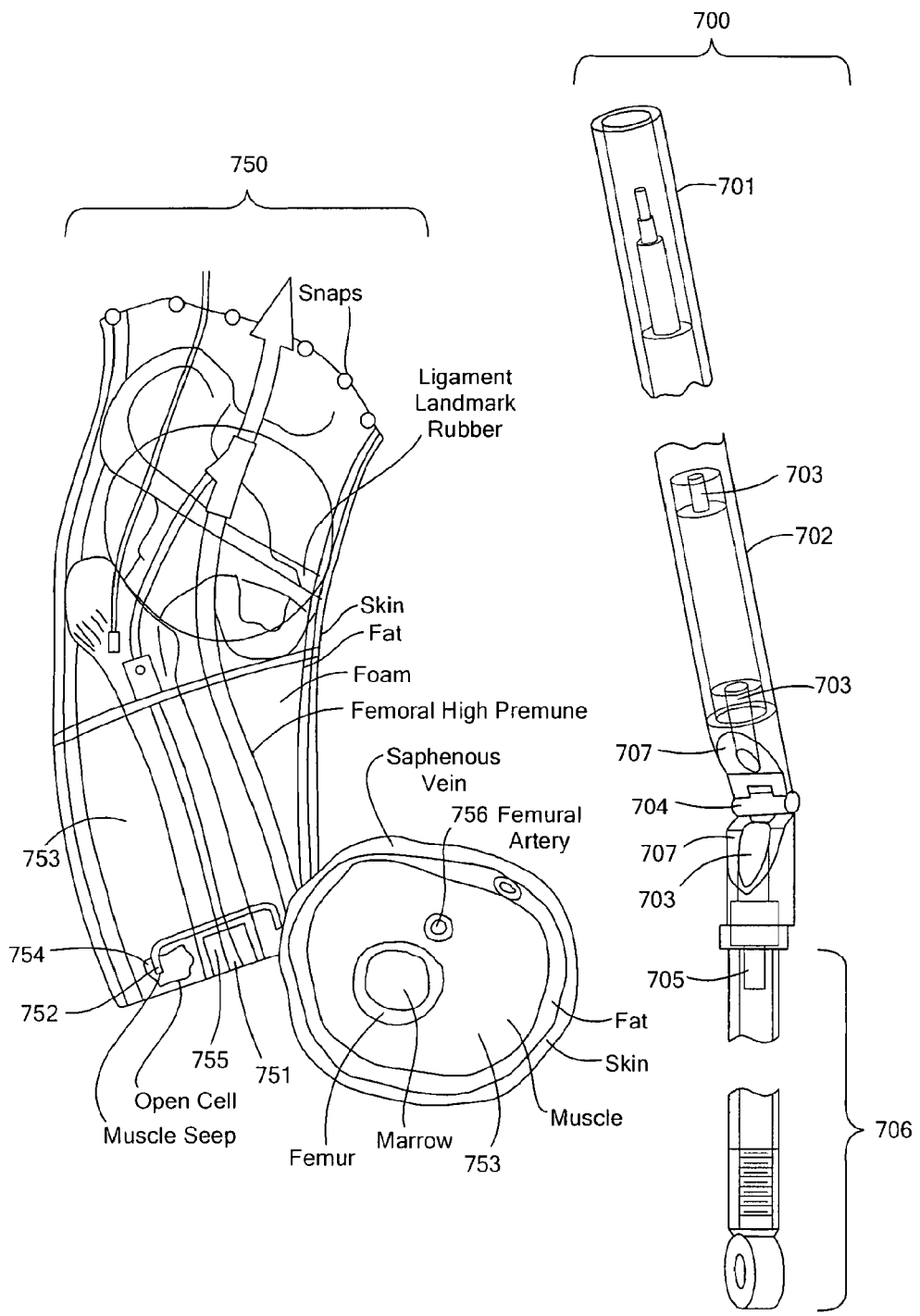
FIG. 7. is a pictorial representation of an exemplary trauma module limb skeleton of an arm as well as soft tissue and hemorrhage module layout.

FIG. 7 shows exemplary skeletal 700 and soft tissue elements 750 of the limb modules. On the left part of the FIG. 750 can be seen the flow channels for bone marrow seepage 751 (running through the femur segment included for illustrative purposes) and the soft tissue seepage 752, which passes through the muscular elements of the leg 753 but ends within the open cell foam 754 at the exposed end of the muscle material. Open cell foam is similarly used in the exposed end of the seeping bone 755. Arterial bleeding is achieved through a tube 756 placed such that its path corresponds with typical anatomy (e.g. femoral artery). The right side 700 shows a limb trauma module with complete dissection of the long bone 701, 702, the channels for fluid and electrical conduits 703, which prevent excessive bending during flexion and extension of the joint 704 (knee or elbow), and a roll joint 705 to enable twisting of the lower extremity 706. The knee or elbow joint angled surfaces 707 are designed to allow accurate limits of flexion and extension of the limb 700.

FIG. 8 shows an example of the SFE connector 800, 850. It includes in this embodiment, proximal 800 and distal 850 structural elements of the limb (e.g. humerus just below the shoulder and above the SFE connector, and humerus below the SFE connector), fluid conduits 801, 851 terminating at the SFE with self-sealing quick-disconnect fittings which allow unrestricted flow when the SFE connector is mated and electrical connectors 803, 853 with sufficient conductors to support all distal sensors and actuators. The SFE connector locks to prevent accidental disconnection through the use of the spring and peg system 804 shown in the figure, but could instead make use of a threaded external sleeve or bayonet-style connector.

Figure 9:
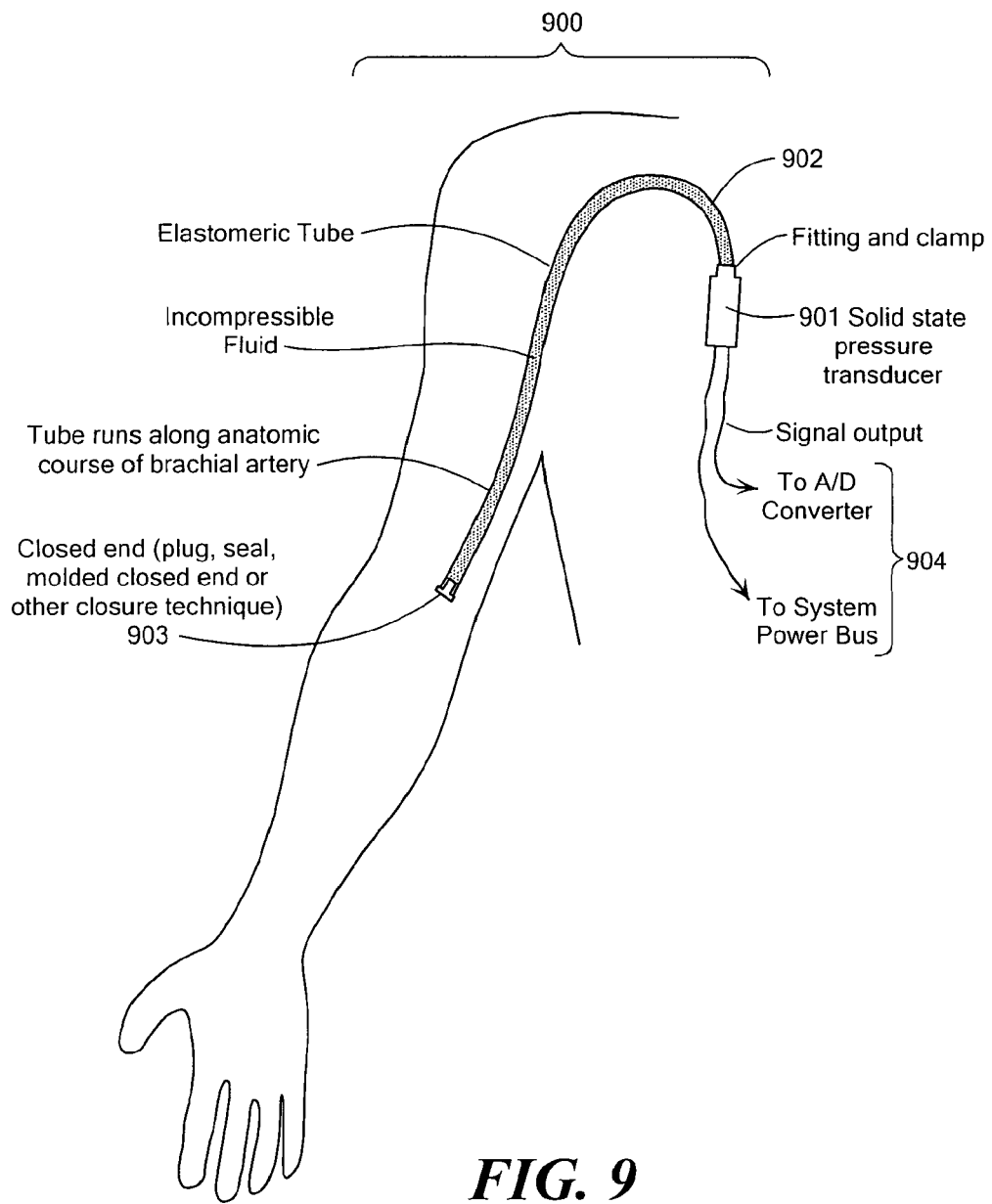
FIG. 9. is a schematic representation of a tourniquet pressure sensing system.

FIG. 9 shows a tourniquet pressure sensing system 900 comprising a solid-state pressure sensor 901 connected to a fluid filled elastomeric tube 902, which is molded closed at its distal end or closed with a plug or other seal 903. Electrical connections 904 from the pressure sensing system 900 include power and ground lines 904 from the ACS sensor power bus and signal output to the data acquisition system of the computer controller.

Figure 11:
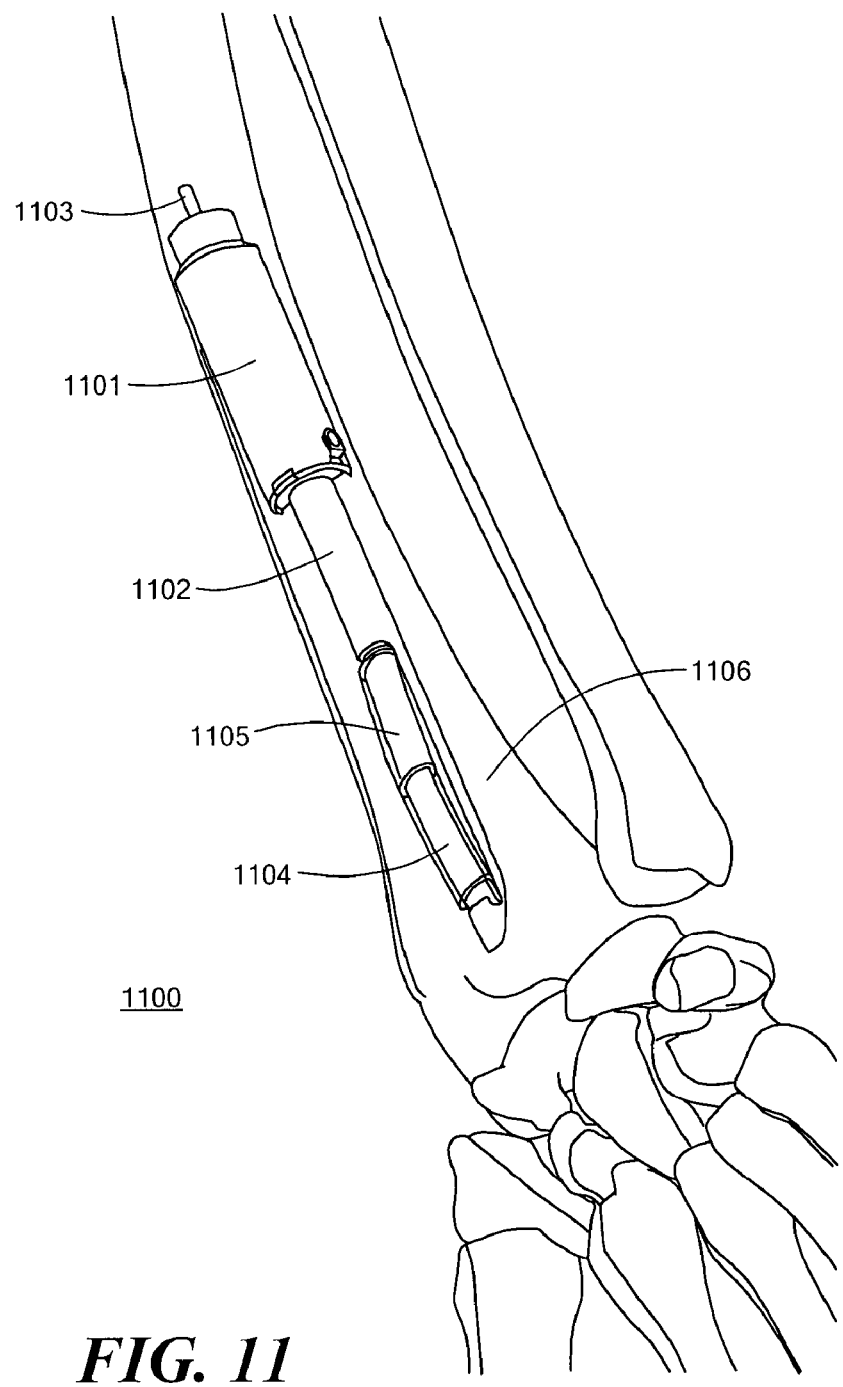
FIG. 11. is a pictorial representation of an electromechanical pulse generator.

FIGS. 10 and 11 show examples of pulse generation units 1000, 1100 placed in the ACS torso where carotid and femoral pulses are normally detected, in the arm modules at the brachial and radial pulse points and in the leg modules at the popliteal and pedal pulse points. FIG. 10 shows an example of a fluid-based system 1000. A fluid-filled elastomeric tube 1001, sufficiently long to extend through the entire anatomical region where a pulse would be detected, is attached to an open-ended cylinder 1002 (in this case the distal end of a syringe). The plunger 1003 of the syringe is mounted to the shaft 1004 of a push-type solenoid 1005. The solenoid 1005 drives the plunger 1003 under the control of the ACS computer controller to pressurize the elastomeric tube 1001 in time with the pulse rate determined by the physiological model. The solenoid 1005 may have a spring return if the recoil of the elastomeric tube 1001 is not sufficient to overcome the friction between the syringe body 1002 and the plunger 1003.

FIG. 11 shows an alternate pulse generation unit 1100 which is electromechanical. A solenoid 1101 is mounted to a hollow tube 1102, the side of which is removed over a region corresponding with the zone over which a pulse would be detected. The solenoid shaft 1103 pushes on the end of a buckled thin beam 1104, which is anchored at the distal end of the tube 1102, and bends outwards away from the axis of the tube 1102. The beam 1104 is embedded in a soft, polymeric material 1105 to simulate the softness of a pulsating artery. In both examples of pulse generating units 1000, 1100, the solenoid 1005, 1101 and pulsing elements 1001, 1104 are embedded within the soft tissue of the limb module (not shown) and attached to the structural elements of the skeleton 1006, 1106 (human bones shown in these figures for scale).

The ACS features unilateral and bilateral chest motion and will respond to appropriate cardiopulmonary resuscitation. In addition, it respires, drawing in and exhaling room air when not in pulmonary arrest or subject to an obstructed airway. This is accomplished in a biomimetic fashion, in that the motion of the chest wall expands the volume of the pleural space, drawing in air through the airway system (see above), and expelling it when the chest wall contracts.

Figure 12:
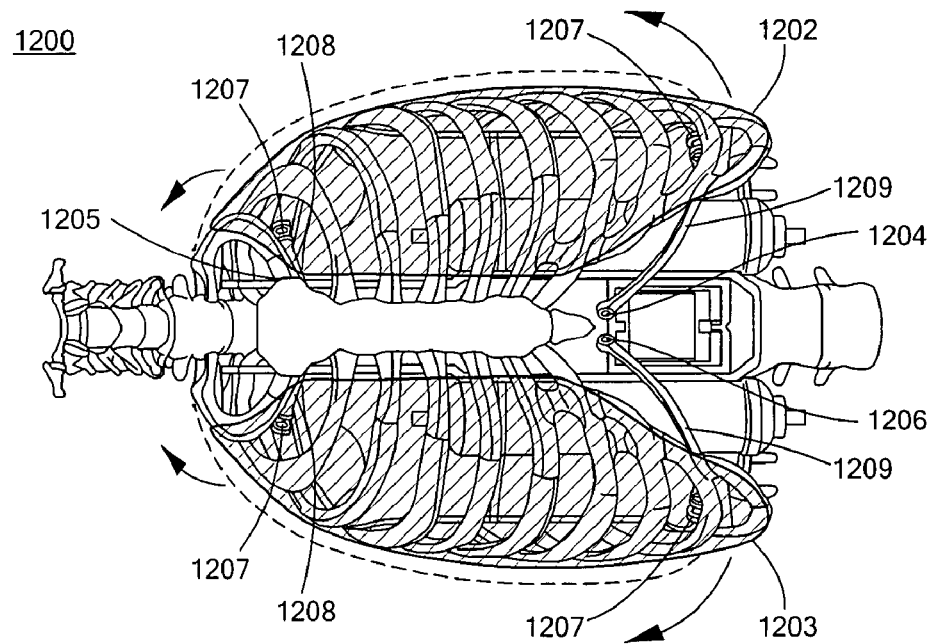
FIG. 12. is a pictorial representation of a chest wall compliance and CPR detection system.
Figure 12:
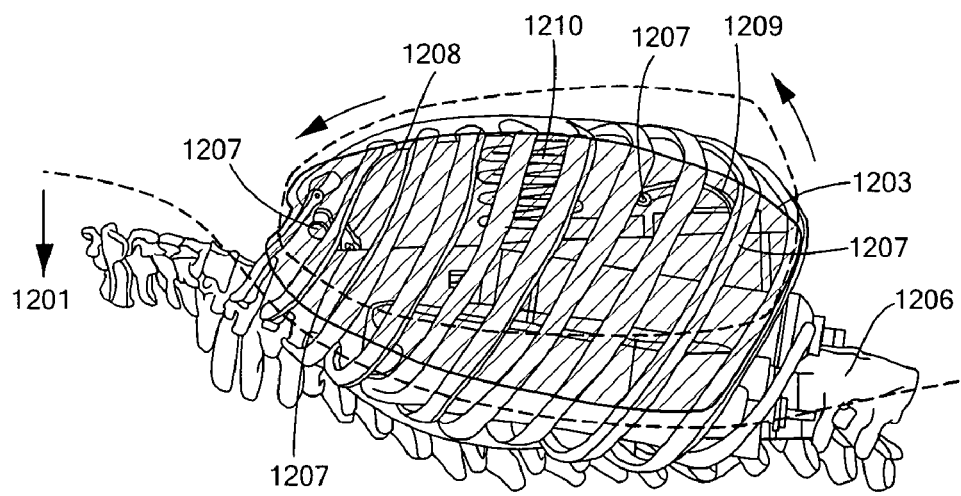

FIG. 12 shows an embodiment of the chest wall motion system 1200, in which the back of the torso 1201 includes rigid, immobile elements, and the front left, and front right surfaces are separate rigid costal bodies 1202, 1203. In addition to the costal bodies 1202, 1203, the sternum 1204 is represented by an anatomically molded structure which is hinged 1205 at the location of the junction with the first set of ribs. The sternal 1204 structure's lateral edges overlie the inner edges of the costal bodies 1202, 1203. The costal bodies are each attached to the internal frame 1206 of the ACS torso via pin joints 1207 and rigid links 1208, 1209, such that each costal bodies 1202, 1203 form the ungrounded link of a four-bar mechanism. By careful design of the lengths of the links 1208, 1209 and the distance of their junctions with the ACS frame 1206 and the costal bodies 1202, 1203, the path of motion of the costal bodies 1202, 1203 can be made to emulate the motion of real ribs. In particular, the path of the lower margin of the costal bodies 1202, 1203 tends to be upwards (towards the head) and outwards away from midline of the body, and the upper margin of the costal bodies 1202, 1203 tend to move more directly upwards. The links 1208, 1209 are curved in shape to conform with the inner surface of the costal bodies 1202, 1203 when in the fully exhaled state.

The motion of the four-bar mechanism can be accomplished in a variety of ways, including rotary actuators mounted at any of the four pin joints 1207, linear actuators acting between a hinged joint on the ACS frame 1206 and a point along the length of one of the links 1208, 1209. A practitioner skilled in the art will conceive of other methods in addition to these. In this embodiment, each of the four-bar mechanisms is driven by a ball-screw mechanism, driven by an electric motor. The ball-screw provides a low-friction, back-driveable linear actuation mode, such that a sufficiently large force will prevent chest wall motion (and passage of air into the ACS lungs).

Also shown in FIG. 12, there is a spring element 1210 between the sternal body 1204 and the ACS frame 1206. This spring 1210 has a stiffness of approximately 50 lbs/inch, corresponding with the stiffness of the human chest in response to the application of the chest compressions of CPR. The range of motion of the spring 1210 is slightly more than 2 inches, corresponding with the ideal compression depth of CPR. Sensors to detect depth of compression are mounted concentrically with the spring 1210, but may also be placed at the pivot point of the sternum 1205, or in other locations.

The treatment of hemothorax and pneumothorax require dissection through the chest wall at an appropriate location and puncturing through the pleural layer on the inside of the chest wall to enable placement of a tube that will drain air, blood or other fluids. The treatment of tension pneumothorax requires the insertion of a hollow needle through the chest wall to relieve the pressurized air within the pleural cavity.

Figure 13:
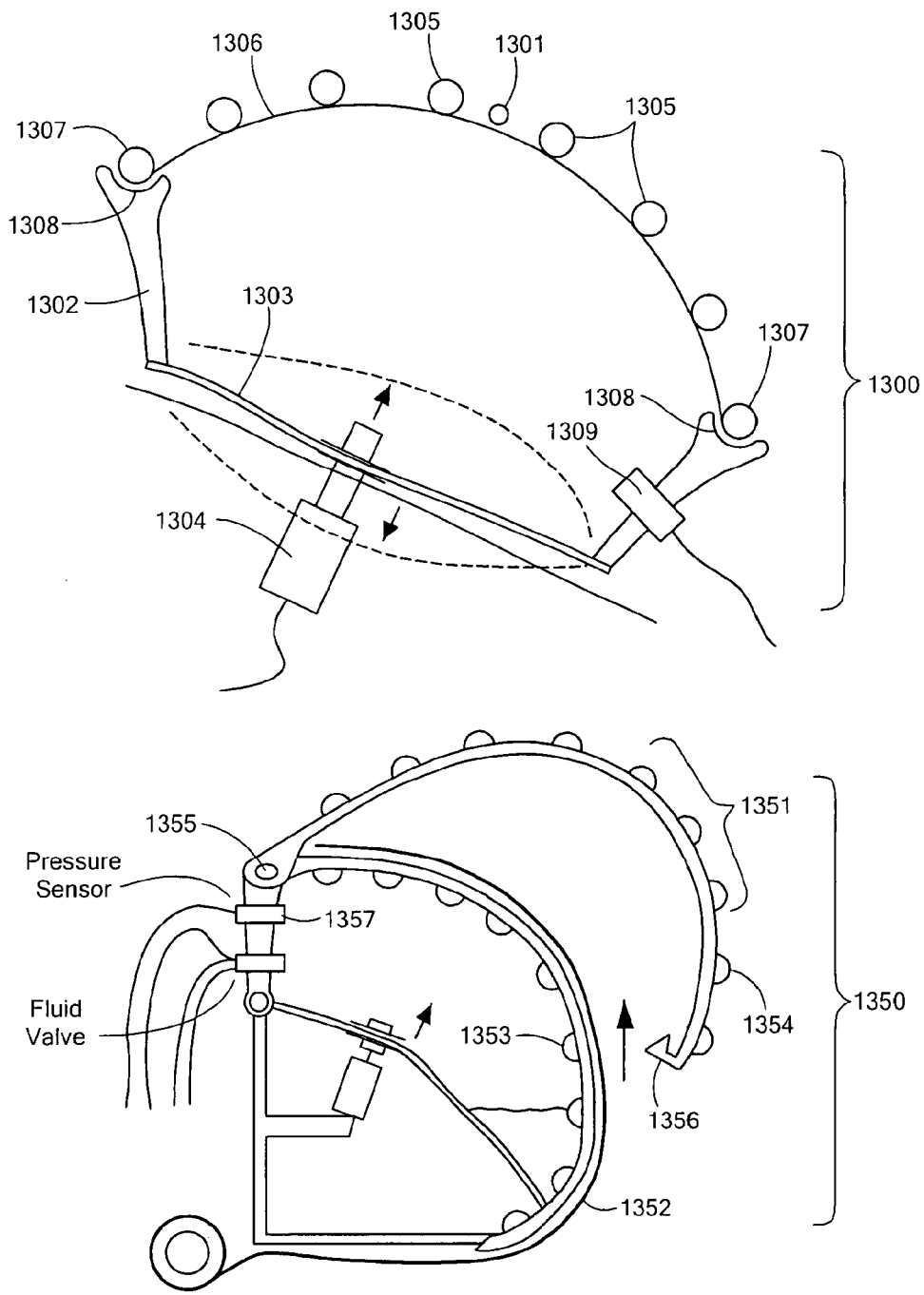
FIG. 13. is a schematic depiction of a hemopneumothorax chest portal.

FIG. 13 shows the configurations of separate chambers within the ACS torso, the upper cross section showing the chamber where tension pneumothorax is simulated, the lower cross section showing the chamber where pneumothorax and hemothorax are generated.

The tension pneumothorax chamber 1300 comprises a section of the anterior costal body 1301 in the region corresponding with the first through the fourth rib and interior sealed walls 1302. The bottom of the chamber is covered in a pliable material 1303 to simulate soft tissues that may be contacted upon excessively deep insertion of the hollow needle-thoracentesis needle. The elevated pressure within this chamber 1300 is created when low pressure air from the combined pneumatic and blood simulant system see above is admitted. An alternate embodiment makes use of a flexible lower layer 1303 of the chamber 1300 which is driven by a linear actuator 1304, such that in the default state, the chamber 1300 volume is large, and upon generation of the tension pneumothorax condition, the linear actuator 1304 pushes the flexible layer 1303 towards the costal body 1301, increasing the internal pressure. The tension pneumothorax section of the costal body 1301 is removable. It consists structurally of a series of rib-shaped members 1305, linked at their ends with a surrounding frame 1307. It is covered on its outer surface with a skin-mimicking polymer material, and on the inner surface by an easily replaceable plastic membrane 1306. The edges of the surrounding frame 1307 mate with a sealing lip 1308 that forms part of the main costal body 1202, 1203.

The hemothorax/pneumothorax chamber 1350 similarly comprises a removable outer section 1351 of the costal body, and an interior sealed space. Pneumothorax is achieved in the same way as the tension pneumothorax chamber 1300, by the injection of air from the pneumatic and blood simulant system see above. Hemothorax is generated by the injection of blood simulant. The schematic of FIG. 6 shows the arrangement of valves and fluid pathways. As the forces generated during the chest wall dissection and pleura puncture are much larger than for needle thoracentesis the plastic membrane 1352 is held between a fixed set of inner half-rib shaped members 1353 that are part of the costal body 1202, 1203, and a removable set of matching outer half-rib shaped members 1354. The outer set of ribs 1354 is similarly held together by a surrounding frame, is hinged 1355 at the sternal margin of the costal body, and has a latching feature 1356 at the mid-axillary margin of the costal body 1202, 1203.

In the case of both chambers 1300, 1350, water-resistant pressure sensors 1309, 1357 are installed to enable closed-loop control of the pneumothorax, hemothorax or tension pneumothorax states, such that the rapid increase corresponding with tension pneumothorax or the slower pressure increase of the other two conditions can be properly generated.

Figure 14:
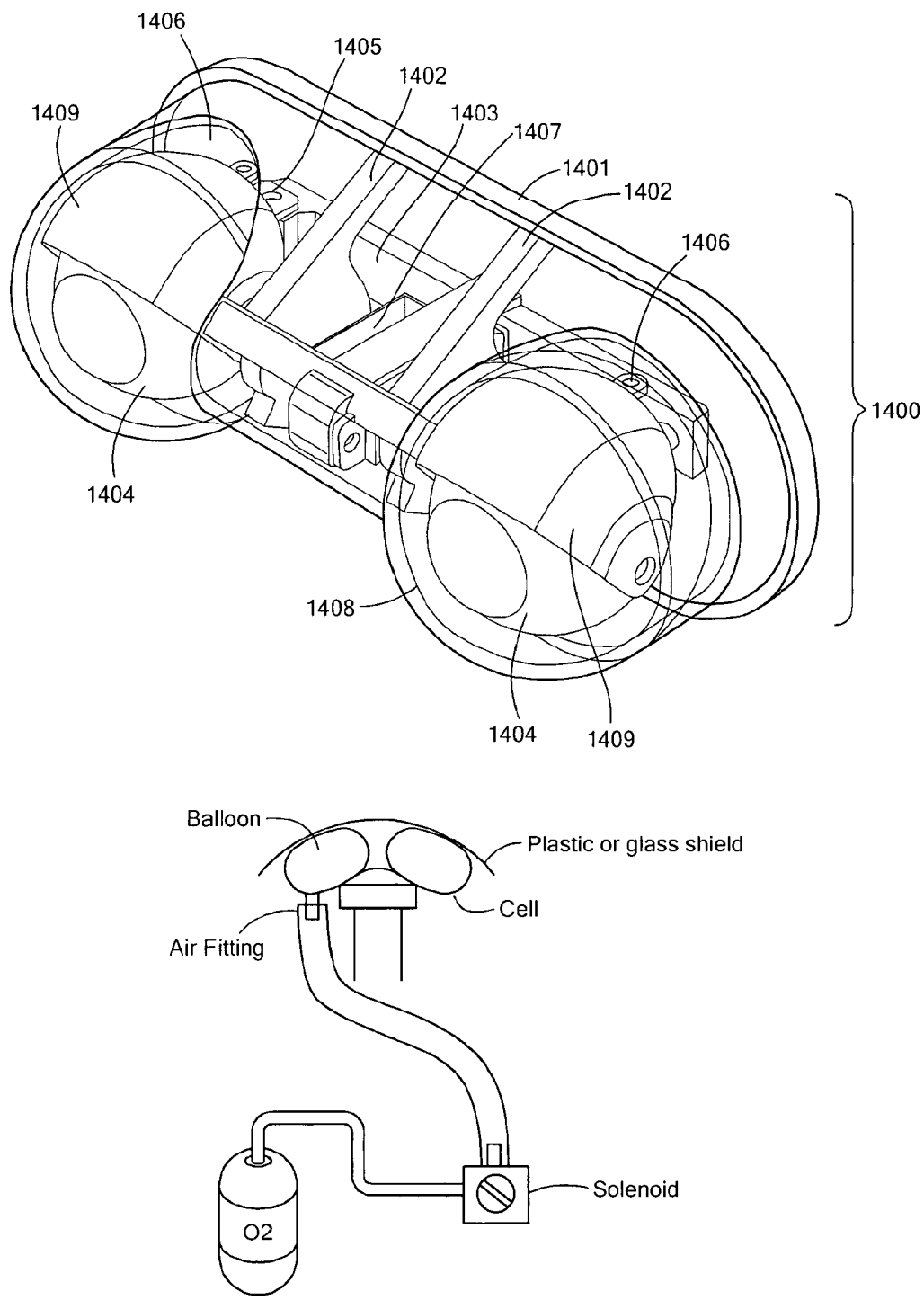
FIG. 14. is a schematic representation of a an assembly and pupillary response system.

FIG. 14 shows an exemplary eye assembly unit 1400 including a base-frame 1401 forming the back of the unit 1400 and support arms 1402 that extends forward from it. To the support arms 1402 is mounted a pitch-frame 1403 which pivots about an axis defined by the center points of each of the eyeballs 1404.

To the right end of the pitch-frame 1403 is mounted an R/C servo 1 405, with its rotational axis passing through the center point of the right eye 1404, and perpendicular to the plane of the pitch-frame 1403. The right eyeball unit 1404 is mounted to the R/C servo output shaft 1405 and to a bearing concentric with it below the R/C servo to provide stability. A control arm 1406 extends backwards from the servo output shaft behind the eyeball 1404.

The left end of the pitch-frame 1403 includes bearings to mount the left eyeball unit 1404. The left eyeball unit 1404 includes a control arm 1406 extending backwards from it's axis of the same length as the right eye control arm 1406. The control arms 1406 are connected to each other by a rigid link such that when the right eye R/C servo 1405 turns the right eye 1404, the left eye 1404 turns through the same angle due to the action of the connecting linkage (control arm 1406, rigid link, control arm 1406). This accomplishes the coupled yaw motion of the eyes. Depending on the choice of length of the rigid link, the eyes may gaze in a perfectly parallel direction, or if slightly longer, may give the eyes a slight inward fixed vergence. The latter might give the user a slight sense that ACS is focusing on them, rather than to the distance.

The pitch-frame 1403 has mounted to it an R/C servo 1407 which may have its rotational axis passing through the rotary axis of the pitch-frame 1403, or it may be parallel but offset to it. In the former case, this servo 1407 directly drives the pitch action of the pitch-frame 1403. In the latter, a series of gears or a toothed belt drive will transmit the torque from the servo 1407 to the motion of the pitch-frame 1403. This accomplishes the pitch motion of the eyes, moving in unison. An alternative design would mount the servo 1407 to the base-frame 1401, and through a gearing mechanism, with a gear section mounted to the pitch-frame 1403, would drive the pitch-frame 1403 about its axis.

The eyes are protected from contamination and damage by a sealed clear housing 1408. The eyelids 1409 will be mounted outside of the housing 1408 to provide manual access to them. The eyelids 1409 will be mounted about the same axis as the pitch-frame 1403. A single servo, mounted to the base-frame 1401, with its axis parallel to the eyelid axis controls the eyelid action.

One implementation that includes manual actuation of the eyelids 1409 includes control arms extending up and down from the eyelid component at the location of the rotary bearings. The upper and lower ends of the arms are attached to elastic cables would extend backwards from the eyelids 1409. They in turn are connected to control arms extending up and down from a shaft concentric with and mounted to the eyelid servo. As the servo rotates the upper control arm backwards, the eyelid opens, and vice versa. The presence of the elastic cables would permit a user to manually hold the eyes closed when otherwise in an open state, or open when in a closed state. Upon release, the eyelids would return to the state determined by the ACS consciousness level. The elastic cables will also prevent damage to the servo due to excessively rapid back-driving, which could occur if there was a geared or belted connection between the servo and the eyelid components. Speed of eyelid motion can be controlled by the rate of servo motion, and increased further by selecting long servo control arms and short eyelid control arms.

The range of motion of the eyelids 1409 will be limited by hard stops in the skull/face unit. The eyelid servo will be commanded to open the eyes slightly beyond the open limit, and close beyond the closed limit. In this manner, there will be a slight preload (due to the elastic cables) that will prevent the eyelids 1409 from being free to oscillate (which remains a possibility if the eyelids are commanded to an intermediate position between open and closed). Suitable selection of bearing materials with some finite friction would minimize this, though care must be taken so that the friction is not so high that the elastic cable forces are lower than the friction forces.

Ideally, the eye assembly 1400 is a self-contained unit that could be easily replaced if damaged, rather than requiring disassembly of excessively large numbers of components from the ACS head.

Figure 15:
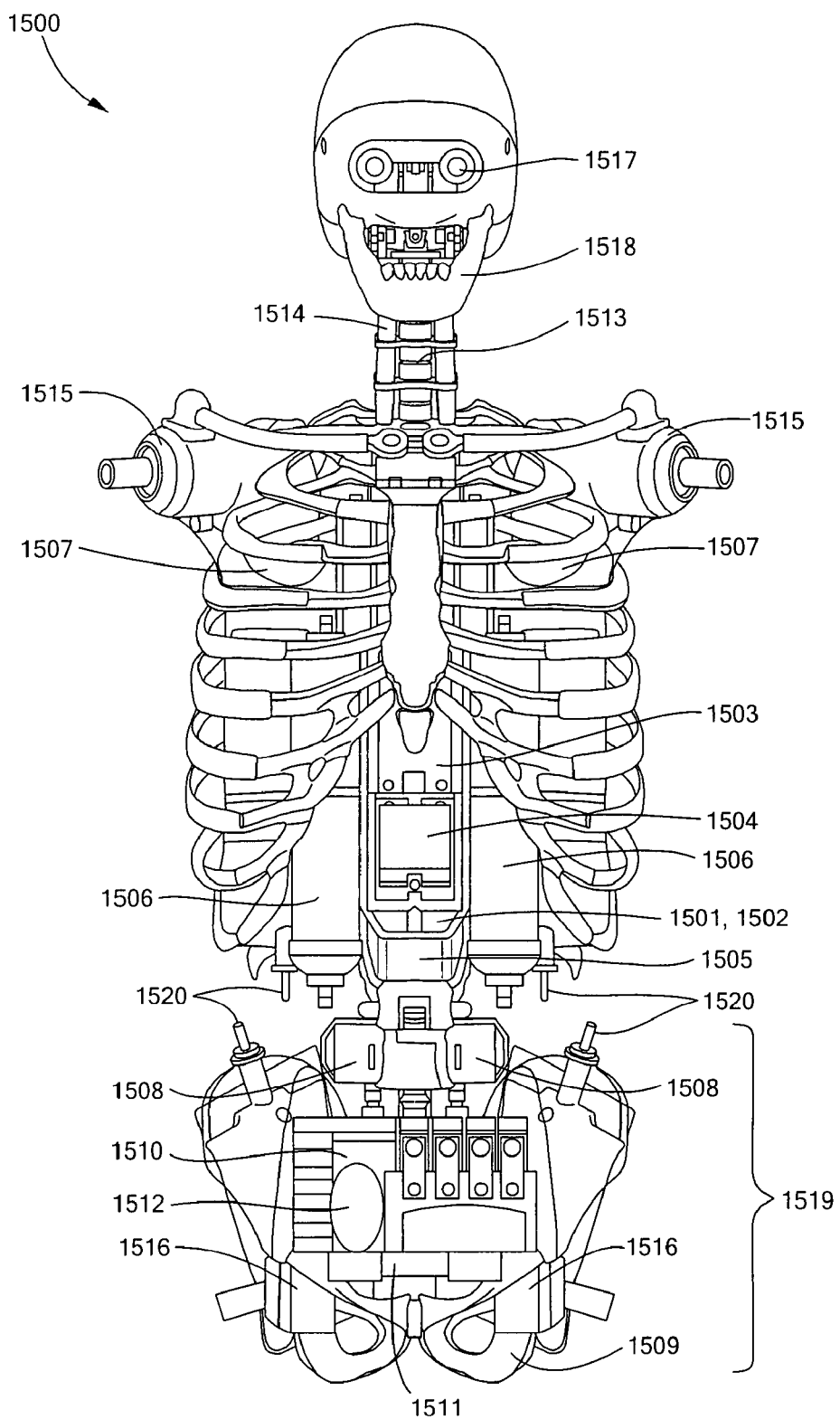
FIG. 15. is a frontal pictorial view of a skeletal chassis and nested torso components.
Figure 16:
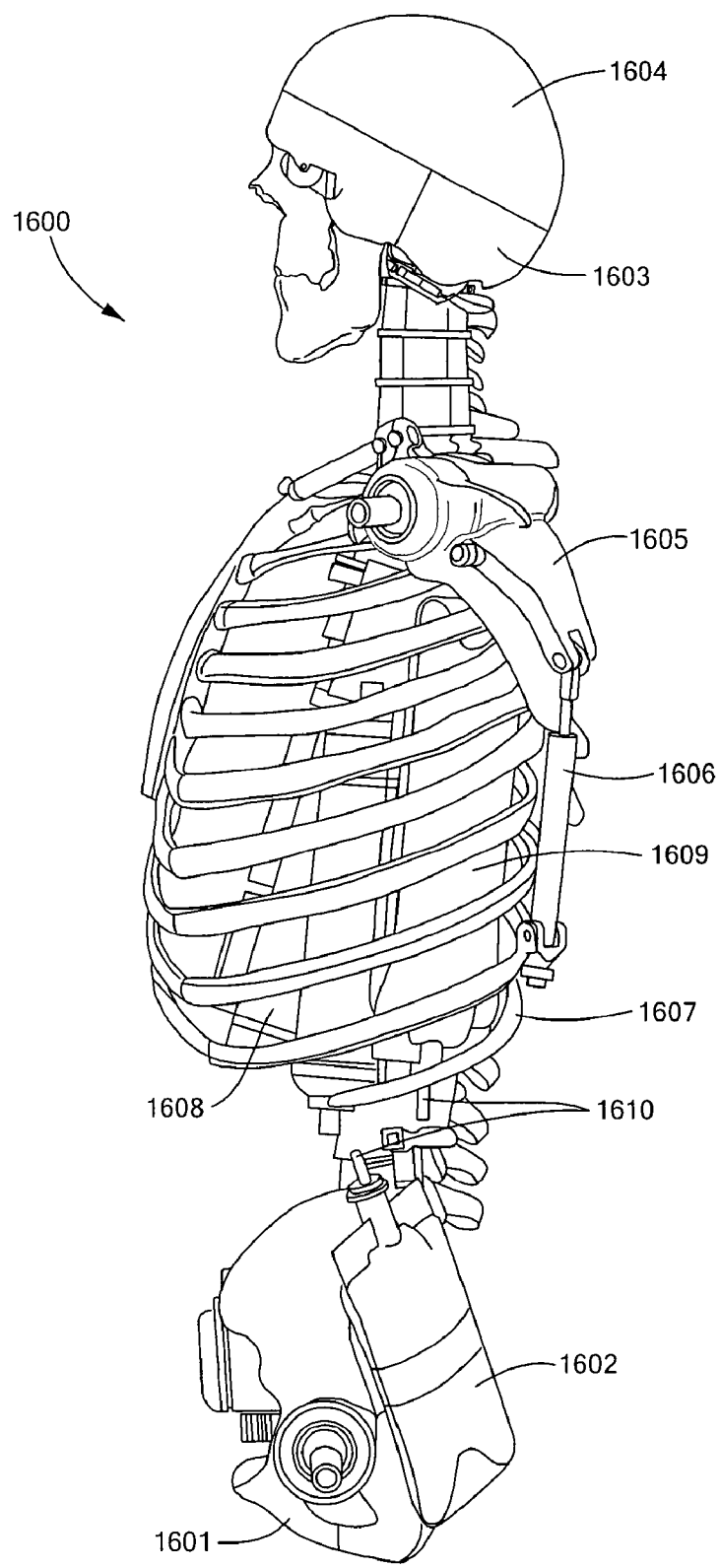
FIG. 16. is a lateral view of a skeletal chassis and nested torso components.

FIGS. 15 and 16 show an illustrative overall layout of the ACS torso components 1500, 1600. The ACS power systems, including the battery packs 1501 and holder 1502 and the DC/DC power converters 1503, 1504 are arranged in the center of the ACS torso frame 1505. To either side of the battery packs 1501 are the high pressure air reservoirs 1506, which, in this embodiment, consist of a pair of 28 cubic inch air Pneuaire (Anaheim, Calif.) reservoir cartridges. Behind the reservoir cartridges 1506 are the blood simulant containers 1507 (not shown are the pressure bags which surround them). Below the battery packs 1501 is the pair of fluid flow sensors 1508, one each for IV flow measurement and blood simulant flow measurement. In the pelvic region is the pelvic frame 1509, supporting the central processor 1510, the wireless network hub 1511, and the GPS sensor 1512. Behind the pelvic frame 1509, 1601 and enclosed in a rigid shell (not shown) are the IV collection bags 1602 and their associated pressure bags.

The animatronic components are made up of the flexible neck elements 1513 and their associated air muscles 1514, the pan-tilt mechanism 1603 (located within the skull housing 1604), the variable resistance shoulder 1515 and hip joints 1516 (not shown are the SFE connectors which would be connected at the end of each of the short tube segments). In addition, the eye system 1517 and the jaw 1518 are actuated. FIG. 16 shows more clearly the scapular elements 1605 of the shoulder mechanism and the fluid dampers 1606 attached to the lower margin of the scapulae 1605 and the ACS torso frame 1607.

Not shown is the access door at the lower back which provides for the removal and replacement of the battery packs 1501, 1608 and the blood simulant containers 1507, 1609.

Referring again to FIG. 6, in one embodiment, blood simulant is created by injecting concentrated liquid colorant and thickener into one liter bags of saline solution, which are then agitated to thoroughly mix the components. These bags of blood simulant form the disposable (yet refillable) simulant containers.

To install blood simulant containers, the simulator back panel is opened, exposing the two cavities in the torso that are occupied by one modified pressure infusion bag 604 each (e.g. Ethox, Corp., Infu-surg pressure infuser bag). The simulant container 1507, 1609 is placed inside the pressure infusion bag 604, and the spike connector 1520, 1610 is inserted through the main port of the simulant container 1507, 1609.

The pressure infusion bag 604 is connected to the low pressure circuit of the pneumatic system, described in FIG. 6.

During the priming sequence the pressure infusion bag 604 is pressurized to approximately 4 psi, using pressurized air from the air cylinders 601, 1506, regulated to 4 psi by the low pressure regulator 603. This pressure is sufficient to generate arterial bleeding during uncontrolled hemorrhage simulation.

Under physiological conditions of reduced blood pressure, reduction of bleeding flow rate and uncontrolled arterial spurting is achieved by reducing the duty cycle of open phase of the arterial flow valves 634 (see FIG. 6). An alternate embodiment of the system achieves reduced apparent blood pressure by controllably changing the setting of the low pressure regulator 603 through the use of a servo motor (of the radio-control type, however other servo motors are similarly suitable). A further alternate embodiment of the system achieves reduced apparent blood pressure by employing continuously variable analog valves (rather than binary on-off valves as the arterial flow valves 634), by reducing the maximum opening of the valve during each pulse.

Upon removal and replacement of empty simulant containers 610, the simulator back panel is opened, the spike connector 1520, 1610 removed from the empty container, and the container removed from the infusion pressure bag 604.

In another embodiment, blood simulant is contained within a pair of refillable cylinders containing a piston. At the upper end of the cylinder is a fitting that seals itself when disconnected from the rest of the system, and another fitting with the same property is mounted at the lower end. The piston, with seals around its circumference, can be driven downwards by air pressure, pushing the blood simulant through the lower fitting. The lower end cap of the cylinder can be removed for maintenance and for refilling.

The air pressure applied to the cylinder is sufficient to generate arterial spurting from simulated arterial bleeders in suitably designed limbs. Pulsatile flow is generated by controlling the opening and closing of valves leading to the limbs in question. Reduction of flow rates corresponding with a reduction of blood pressure can be achieved either by reducing the air pressure applied to the cylinder, or by restricting the flow out of it using a suitable valve, or by individually controlling the valves leading to the hemorrhaging limb(s) so that they do not open completely, thereby reducing the outflow. In another embodiment, the blood simulant cylinders will be easily replaceable from the mannequin, by making use of quick release fittings and integrated retention systems, including the back panel of the mannequin, which would also serve to hold the cylinders in place.

Each of the embodiments of the blood pressurization and containment systems is self-contained within the volume and anatomical constraints of a nominal human form. Tubing would extend from either blood system and transport pressurized blood simulant to each of the extremities. This would enable, for example, the torso to act as a full-featured platform even if the trauma modules connected do not require pulsatile flow.

Figure 17:
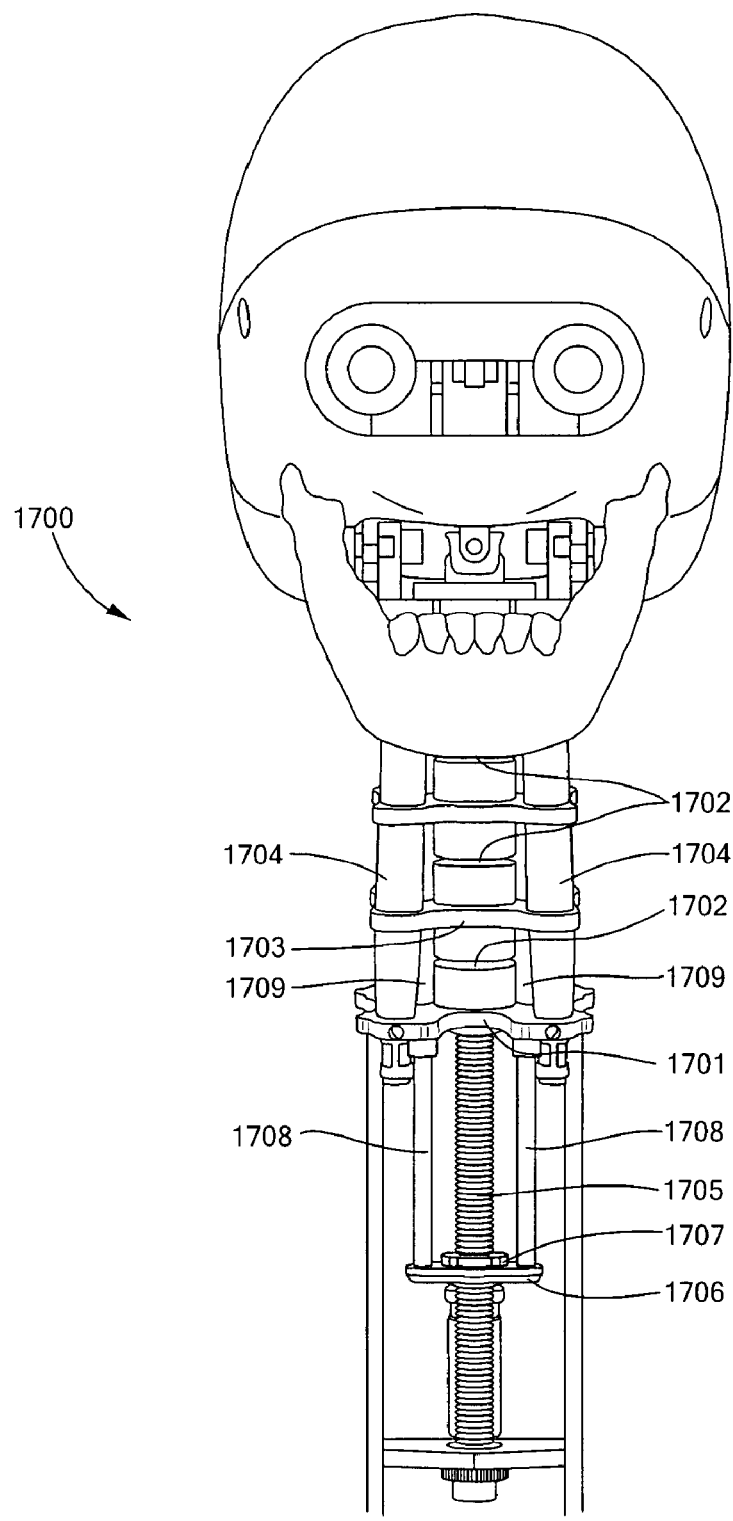
FIG. 17. is a front view of a skull and cervical spine mechanism.
Figure 18:
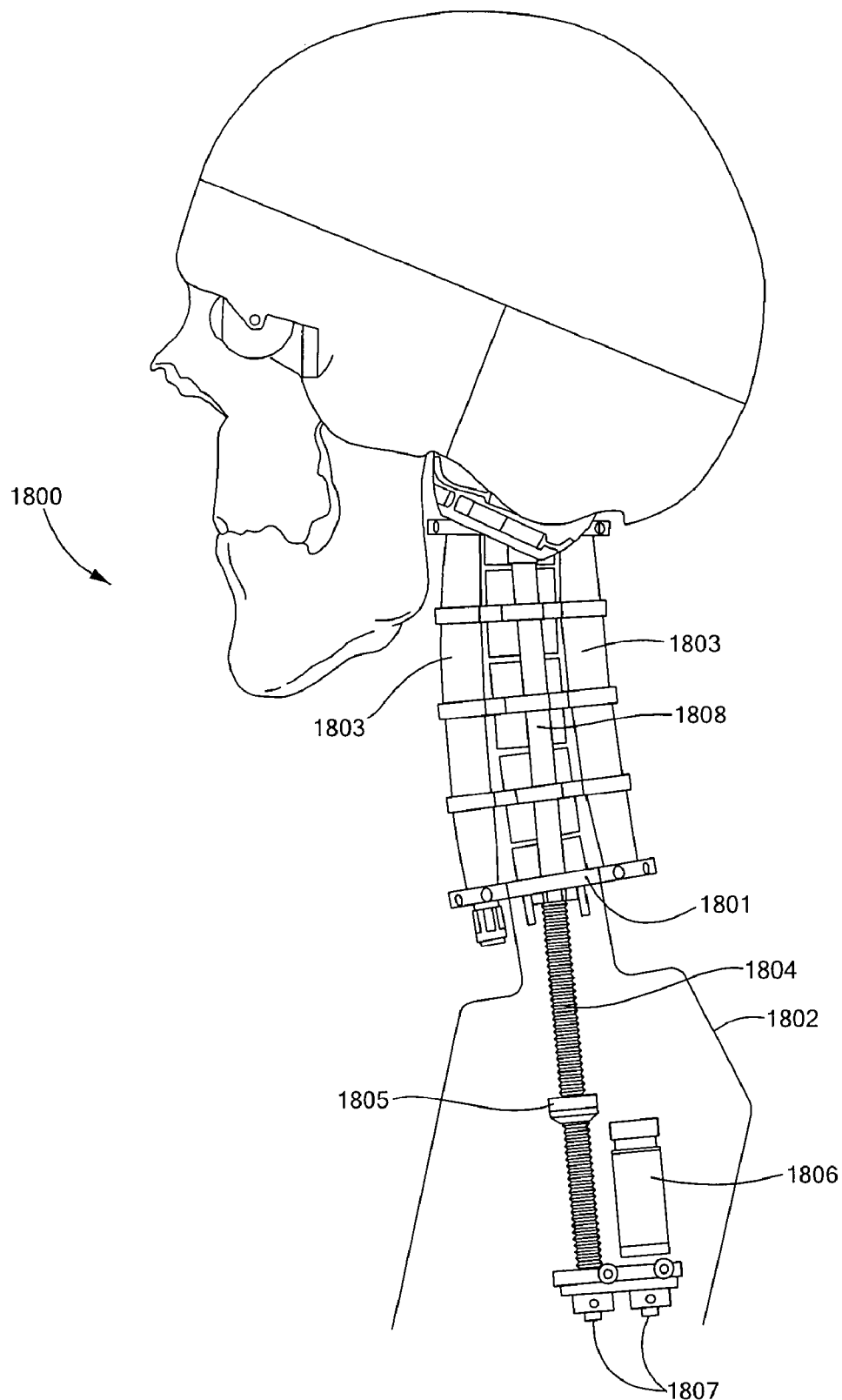
FIG. 18. is a lateral view of a skull and cervical spine mechanism.
Figure 19:
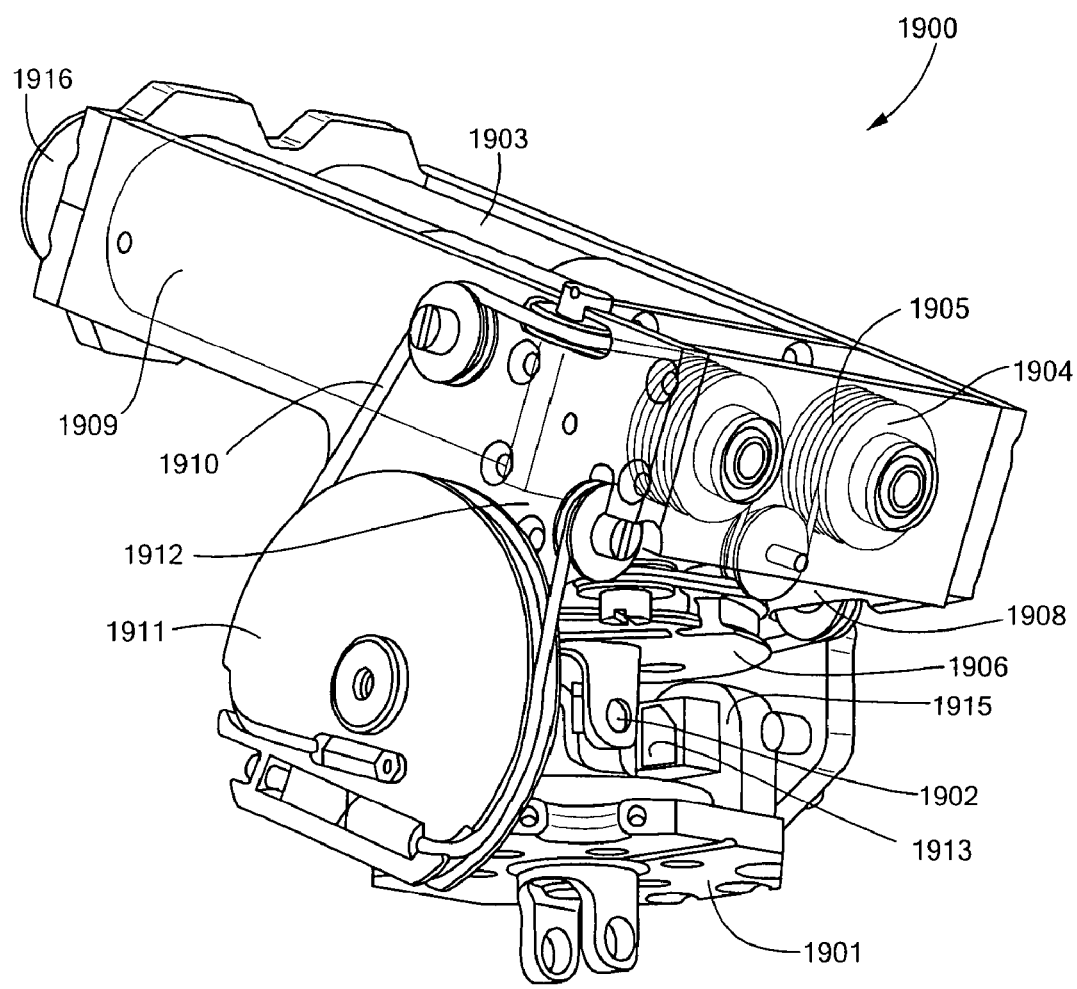
FIG. 19. is a left side perspective view of a pan-tilt mechanisms.

FIGS. 17 and 18 show the full head-neck system 1700 of one embodiment.

The base plate 1701, 1801 is rigidly mounted to the thoracic components of the simulator skeleton 1802.

Figure 22:
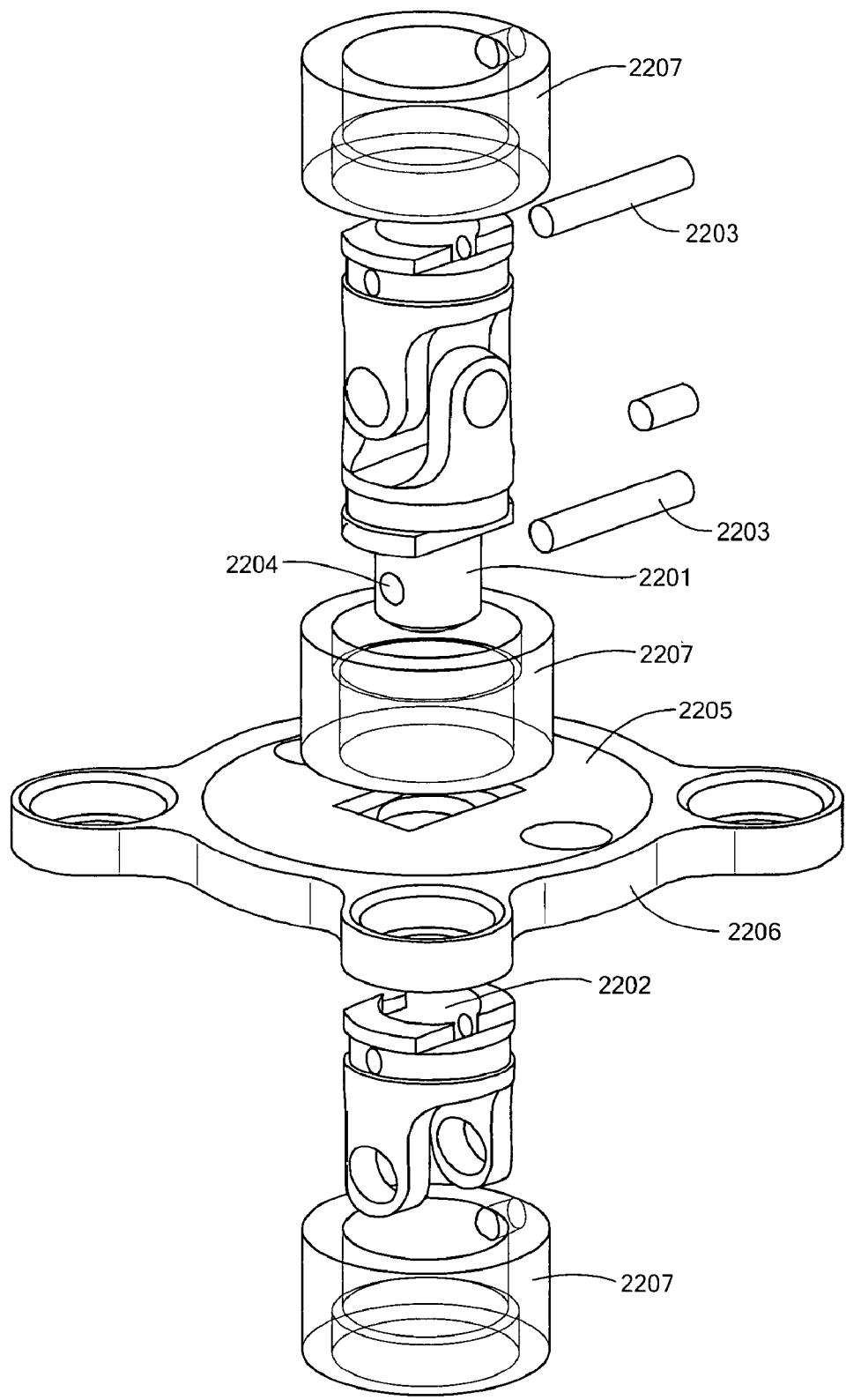
FIG. 22. is an exploded perspective view of a flexible neck segment including angular motion limiter geometry.

A serial chain of five universal joints (u-joints) 1702 connect the simulator torso and head. The u-joints 1702 are of sufficient strength such that the entire weight of the mannequin can be supported by any one of them. The u-joints 1702, which are typically purchased as individual elements, are connected to each other by modifying them such that one end forms a short rod and the other a mating hole (see FIG. 22). The rod 2201 of one u-joint 1702 is inserted into the mating hole of the next 2202, and a transverse pin 2203 of sufficient strength is removably inserted into a transverse hole 2204 that passes through both the rod-end 2201 and mating hole 2202. The transverse pin 2203 is mounted such that it can only be removed through deliberate action, and may be a press-fit pin, threaded element with suitable thread-locking material or other similar element.

Coincident with the mating location between adjacent u-joints 1702 is mounted a cervical disk element 2205. This element 2205 is mounted such that it cannot rotate about the longitudinal axis of the u-joints 1702. The cervical disk 2205 serves as the mounting element for an air muscle guide 1703, 2206, which can freely rotate about the axis of the cervical disk 2205. In this embodiment, the air muscle guides 1703, 2206 maintain the alignment of the air muscles 1704, 1803 and the distance of the air muscle 1704, 1803 from the axis of the u-joint chain 1702. In alternate embodiments employing cables or other flexible elements to provide stiffness or animatronic motion, similar air muscle guides 1703, 2206 would also be employed to maintain the geometric relations between the stiffening elements and the u-joint chain 1702.

Figure 21:
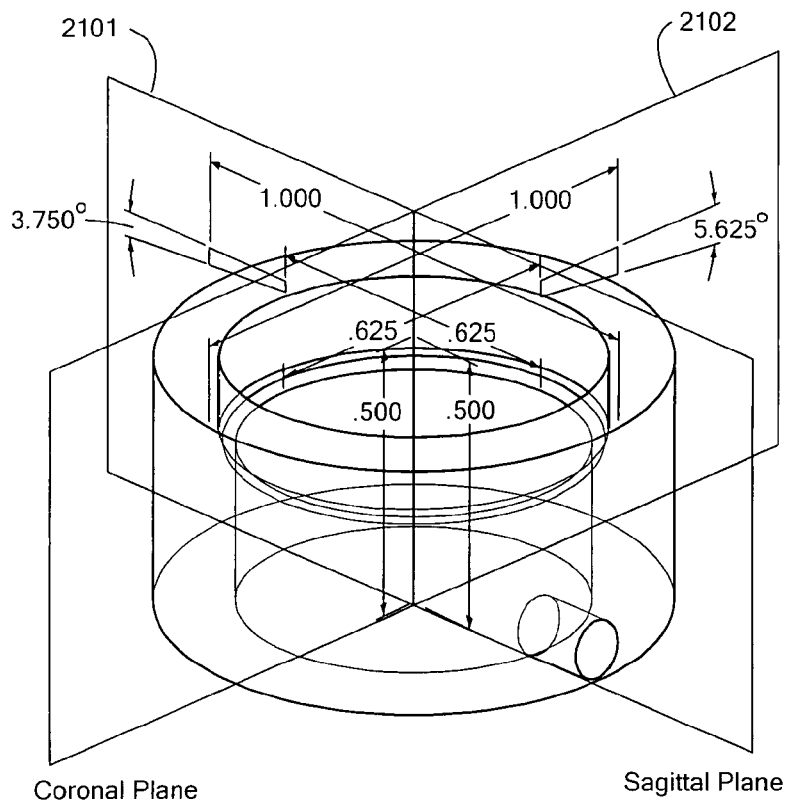
FIG. 21. is a perspective view of a flexible neck segment including angular motion limiter geometry.
Figure 21:
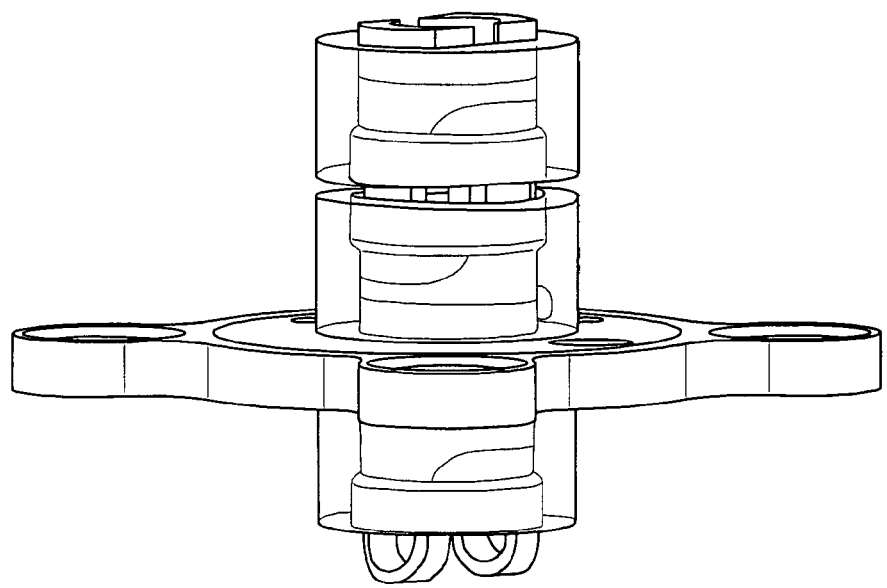

Between each pair of cervical disks 2205 (or the last cervical disk 2205 and the base-plate 1701, 1801) a pair of angle limiters 2207 is mounted co-axial with the u-joint 1702. The exposed surface of each angle limiter 2207 has a geometry such that when the u-joint 1702 bends, its motion is limited by contact between exposed surfaces. The geometry of the exposed surface of the angle limiters 2207 is generated such that a straight line through the central joint of the u-joint 1702 is coincident with the exposed surface, and that this straight line corresponds with the desired angular limit of bending in a given direction. For example, as shown in FIG. 21, the straight line through the sagittal plane 2101 of the joint has an angle of 3.75 degrees with respect to horizontal, while the line through the coronal plane 2012 has an angle of 5.625 degrees with respect to horizontal. These angles are selected such that the limits of motion of the full u-joint 1702/angle limiter system 2207 are 45 degrees to either side in lateral flexion and 30 degrees in both flexion and extension, which correspond to the approximate ranges of motion of the human cervical spine.

At the top of the u-joint chain 1702 is a pan-tilt mechanism 2000 which achieves the remaining motions of the head-neck system 1700, 1800, including an additional 30 degrees of flexion and extension and the full 80 degrees in rotation to both the left and right. The pan-tilt mechanism 2000 is described further below. Of note here is the pan plate 2001 of the pan-tilt mechanism 1900, 2000 which is mounted to the u-joint chain 2002 such that it can rotate about the axis of the chain 2002, but can support the axial load of the weight of the simulator. In the current embodiment, an aircraft bearing, which can resist both large radial loads and large axial loads, enables the motion of the pan plate 2001. As the pan-tilt mechanism 2000 causes rotation of the head about the u-joint chain 2002, the pan plate 2001 rotates with it. The 1704, 1803, which are rigidly attached to the pan plate 2001 and the base plate 1701, 1801, twist about the u-joint chain 2002, and the air muscle guides 1703, 2206, which can rotate with respect to the cervical disks 2205, twist with them, while still maintaining the distance of the air muscles 1704, 1803 from the chain axis.

Below the base plate 1701, 1801 are mounted the components to generate changes in passive neck stiffness. FIG. 18 shows a lead screw 1705, 1804 and a push plate 1706, 1805, which includes a threaded element 1707 that mates with the lead screw 1705, 1804. The lead screw 1705, 1804 is driven by the neck stiffness motor 1806 via a pair of spur gears 1807. Alternatively, the lead screw 1705, 1804 could be replaced by a ball-screw system, and the spur gears 1807 could be replaced by a belt drive, cable drive or other transmission, or the neck stiffness motor 1806 could be coupled coaxially with the lead screw 1705, 1804. In this embodiment, the transmission is employed as space for a coaxial arrangement is not available in the simulator torso. To the push plate 1706, 1805 are mounted a pair of stiffening rods 1708 which are aligned parallel to the lead screw 1705, 1804. When the stiffening rods 1708 are at the fully retracted position, the u-joint chain 1702 can be freely moved up to the limits imposed by the angle limiters 2207 and the pan-tilt mechanism 1900. When the neck stiffness motor 1806 turns the lead screw 1705, 1804 to move the stiffening rods 1708 into the extended position, the stiffening rods 1708 pass through holes in each of the cervical disks 2205. When extended, the u-joints 1702 can still bend, but the bending motion is resisted by the stiffening rods 1708. This generates a response similar the difference between an unconscious patient's neck which is completely limp, and a conscious patient's neck which can support the weight of the head or resist externally imposed motions. To ensure that the stiffening rods 1708 pass through the matching holes in the cervical disks 2205, the rods 1708 pass through guide tubes 1709, 1808 which are flexible, low friction tubes that are resident within the cervical disk holes 2205. The guide tubes 1709, 1808 are rigidly connected to the pan plate 2001 of the pan-tilt mechanism 1900, 2000, and are free to slide relative to the cervical disks 2205 and base plate 1701, 1801 as the u-joint chain 1702 flexes. The guide tubes 1709, 1808 are long enough so that they extend below the level of the base plate 1701, 1801 regardless of the motion of the u-joint chain 1702

FIG. 17 shows an exemplary embodiment of the animatronics of the head-neck system 1700. The passive structural elements of the system are described above, including the chain of universal joints 1702, the cervical disks 2205 and air muscle guide 1703, 2206, as well as the ranges of motion of these components.

The neck motion is generated by the coordinated inflation of the air muscles 1704, 1803 and release of air from them. McKibben type air muscles are well known in the art, and detailed descriptions of their manufacture and function can be found in such references as Daerden& Lefeber. In essence, they comprise an elastic tube surrounded by a helically wound mesh, in which the tube is typically sealed at one end, and attached to a source of pressurized air at the other. The mesh is bound to the tube at each end such that their lengths are kept identical. As pressurized air is introduced into the air muscle, the tube expands, causing the diameter of the helical mesh to expand with it. As the mesh diameter increases, the helix angle of the inextensible fibers within it decreases, causing the overall length to decrease. When one end of the air muscle is fixed and the other attached to a load, inflation of the muscle results in a force being exerted on the load in a direction towards and coaxial with the air muscle.

In the present embodiment, the neck actuation is enabled by antagonistic pairs of air muscles 1704, 1803, with one pair generating forces in the flexion/lateral right to extension/lateral left direction, and the other pair generating forces in the flexion/lateral left to extension/lateral right direction. As one muscle of the pair is inflated, the other is either held at current pressure or air is released. If both are inflated, this has the effect of stiffening the neck, and any difference in pressure results in motion towards the air muscle 1704, 1803 at higher pressure. By controlling the pressure in all four air muscles 1704, 1803, any combination of motions in flexion/extension and lateral flexion can be achieved.

Air muscles in general can achieve an engineering strain (ratio of maximum change in length to original length) of approximately 25%. For this reason, the geometry of the air muscle guides 1703, 2206 and the length of the chain of u-joints 1702 must be calculated such that the difference in length between, for example, the front left air muscle 1704, 1803 at full range extension and right lateral motion, and the length of the same air muscle 1704, 1803 full flexion and left lateral motion, is no more than the 25% of the full extension/right lateral air muscle length. In short, the strain capability of the air muscle must be matched to the change in length imposed by the full range of motion of the neck.

Alternate actuators to air muscles can include variations in air muscle design, the use of lead or ball screw mechanisms driving flexible cables, or a pulley system driving cables looping from an attachment point on the pan plate 2001, down the neck, under the base plate 1701, 1801, around a motor driven pulley, and up the other side of the neck to reattach at the pan plate 2001. This is by no means a comprehensive list of design solutions, but is intended to indicate some of the possible variations.

In particular, to generate neck flexion, the front two air muscles 1704, 1803 are pressurized, and air is exhausted from the back two air muscles 1704, 1803, or the pressure therein is reduced with respect to the pressure in the front pair.

Figure 20:
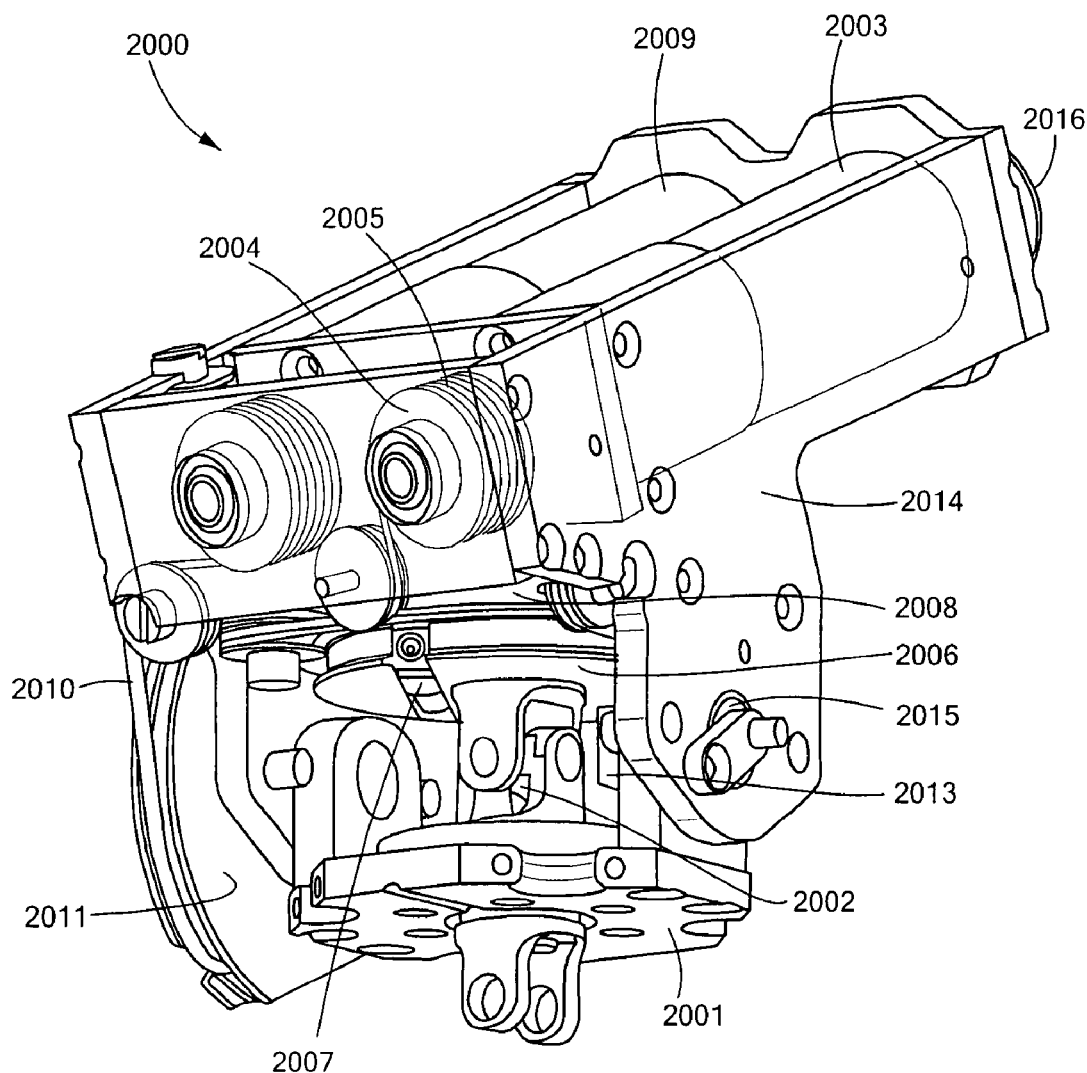
FIG. 20. is a right side perspective view of a pan-tilt mechanisms.

At the top of the neck section is the pan-tile mechanism 1900, 2000, which generates the rotational and part of the flexion-extension motion of the head. Pan motion (rotation) is achieved in this embodiment through the action of the pan motor 1903, 2003 with a gearhead if necessary to achieve the necessary torque, driving a pan capstan 1904, 2004 around which is wound the pan cable 1905, 2005. This cable passes over a series of pulleys as shown in FIG. 20, and is anchored to the pan drive wheel 1906, 2006 using a cable stop and a cable tensioner 2007. The pan drive wheel 1906, 2006 is rigidly fixed to the uppermost u-joint 1902, 2002. As the pan motor 1903, 2003 generates torque, this is transmitted through the pan cable 1905, 2005 to act on the pan drive wheel 1906, 2006. As the pan plate 2001 and tilt plate 1908, 2008 are mounted to the u-joint 1902, 2002 with rotary bearings, a torque equal to and opposite to that imposed on the pan drive wheel 1906, 2006 is imposed on the rest of the pan-tile mechanism 1900, 2000, causing it to rotate about the u-joints 1702. Similarly, tilt motion is achieve as torque from the tilt motor 1909, 2009 (and possible gearhead) is transmitted through the tilt cable 1910, 2010 to the tilt drive wheel 1911, 2011, and the tilt plate 1908, 2008 then tilts with respect to the tilt drive wheel 1911, 2011.

Closed loop control of the pan and tilt motions is achieved through the use of encoders 1916, 2016 or similar sensors mounted on the motors, and also from the pan potentiometer 1912 and tile potentiometer 1913, 2013, mounted between the tilt plate 1908, 2008 and uppermost end of the u-joint 1902, 2002, and between the right side plate 2014 and the right tilt shaft 1915, 2015 (which is fixed with respect to the pan plate 2001). The potentiometers provide absolute position sensing of pan and tilt, and are used to determine the initial position of the pan-tile mechanism 1900, 2000 at simulator start-up, while the encoders 1916, 2016 are used by the electronic motor control system to provide noise-free relative motion information, after the control system is initialized with information from the potentiometers.

Closed loop control enables both control of the rotation and flexion/extension motions, but also enables control of the stiffness of those joints. For example, if simple position control is employed, increasing the control system gain which relates output torque of the motors to error between commanded and actual position, will increase the stiffness of the neck system (provided that friction in the joints and imposed by external soft tissue components and bandwidth of the control system are sufficient to prevent control system instability). Other control algorithms can also be employed to achieve the desired stiffness and motion performance.

Figure 23:
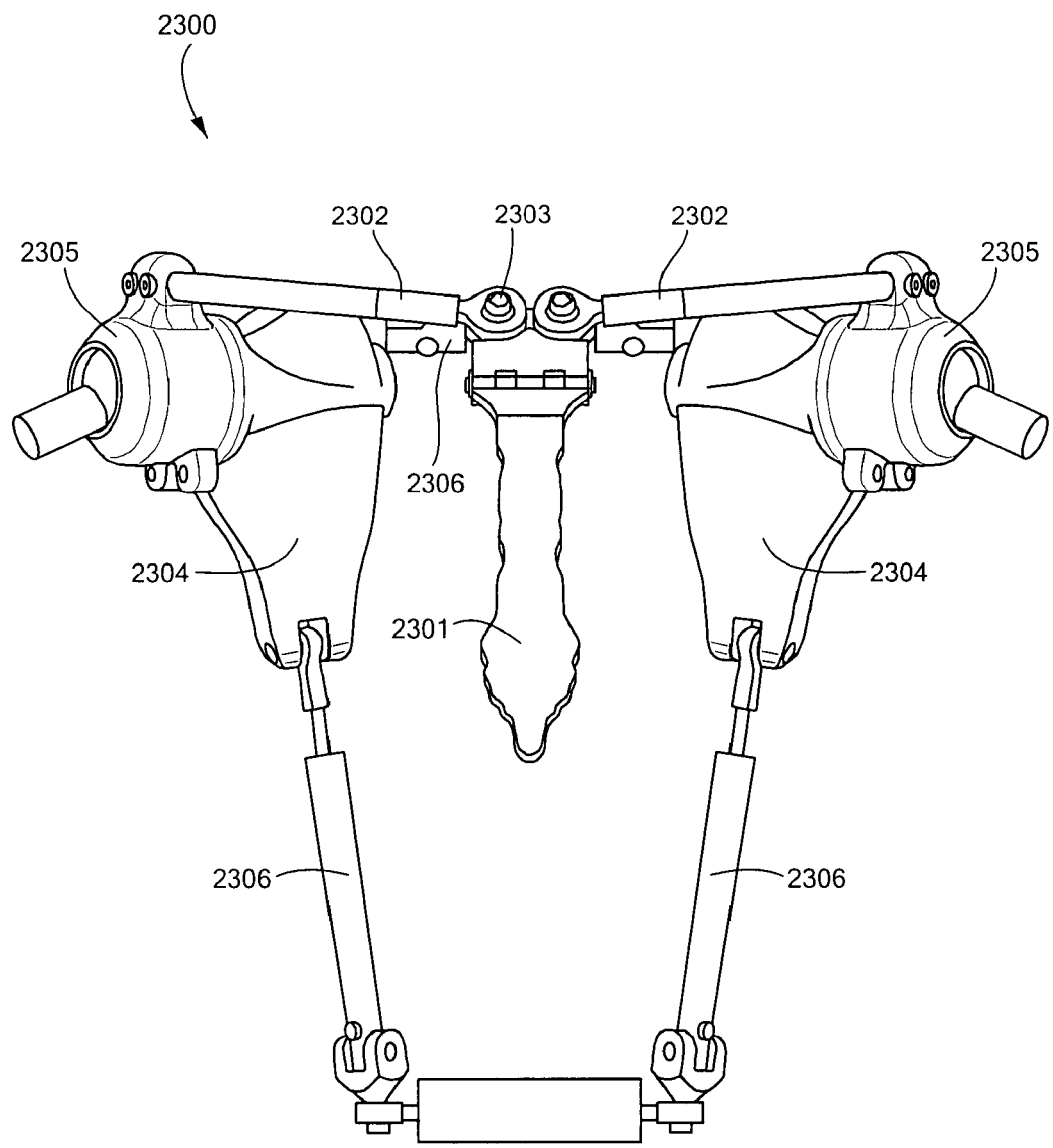
FIG. 23. is a pictorial representation of a shoulder wishbone assembly and damper systems.

FIG. 23 shows components of the passive shoulder mechanism. This front view shows the sternal plate 2301 (which forms part of the chest wall motion/CPR system, described above) in the center. The clavicular members 2302 extend to the left and the right from tie-rod end joints 2303 that allow limited motion of these members 2302. The clavicular members 2302 are rigidly attached to the scapular members 2304. The scapular members 2304 include the sockets of the ball-joint mechanism 2305 described below. The proximal margins of the scapular members 2304 are connected to each other by a linear fluid damper 2306. Additional fluid dampers 2306 connect the lower margins of the scapular members 2304 and attachment points on the ACS torso frame. The fluid dampers 2306 may be pre-tuned to provide fixed resistance to motion, or can have small servomotors attached to their adjustment points to enable actively tuned responses (similar to those of the shoulder, hip and head/neck joints).

Figure 24:
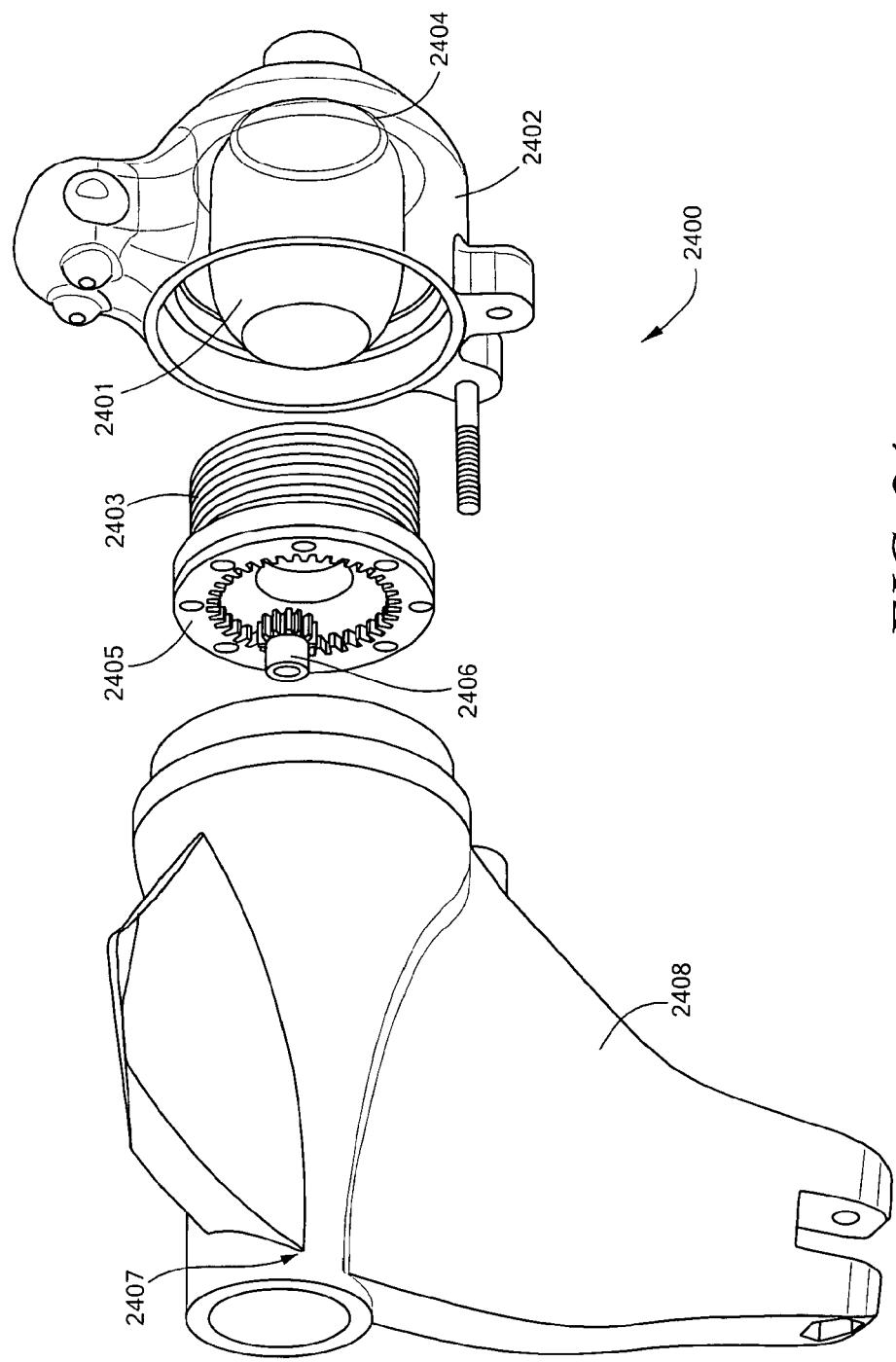
FIG. 24. is an exploded perspective view of a scapula assembly including consciousness controls.

In one embodiment of the spherical joint mechanism employed at each of the hip and shoulder locations (see FIG. 24), the joint comprises the ball assembly 2401, the socket assembly 2402, and the brake assembly 2403. In operation, the externally threaded brake assembly 2403 is rotated by a motor or other means, and as a result of the threads presses the ball assembly 2401 against a mating surface in the socket assembly 2402. With sufficient torque applied to the brake assembly 2403, the ball assembly 2401 is rendered resistant to motion, which is the desired state when the ACS is in conscious mode. Applying a torque to the brake assembly 2403 in the opposite sense releases the ball assembly 2401, allowing the joint to move freely, which is the desired state when the ACS is in unconscious mode.

The ball assembly 2401 is comprised of a spherical ball with a cylindrical member extending out from the center of the sphere. The cylindrical member and the spherical ball may optionally have a hole extending through their common axis (see FIG. 24) to allow the passage of tubes or cables or other elements, such that those elements pass through the joint, rather than needing to be channeled around the outside of the joint. The advantage of passing such elements through the joint is that additional cabling or tubing length is not required to allow the full range of motion of the joint, and reduces the possibility of tangling.

The socket assembly 2402 is comprised of a hollow cylindrical body with an interior spherical seating surface at the outer end of the cylindrical body. The ball assembly 2401 rests in this seat with the cylindrical member extending out through the outer end. In the case where water resistance is a desirable feature in the ACS (as in the preferred embodiment), an O-ring seat and an O-ring 2404 may be integrated into the spherical seating surface such that a seal is established between the socket assembly 2402 and the ball assembly 2401. In addition to the spherical seating surface, an additional O-ring seat and O-ring 2404 are incorporated adjacent to and proximal from the spherical seating surface. Proximal to that is an internally threaded section of the socket assembly 2402. This thread is provided to mate with the brake assembly 2403.

The brake assembly 2403 is a cylindrical element with a threaded outer surface to mate with the inner thread of the socket assembly 2402, and a spherical seat at its proximal end to mate with the ball assembly 2401's proximal aspect. As with the ball assembly 2401, the brake assembly 2403 may have a hole extending through it to permit cables, wires or other elements passing through the ball assembly 2401 to enter the torso of the ACS. To the inner face of the brake assembly 2403 is mounted a ring gear 2405 with internal teeth. A pinion gear 2406 driven by a motor 2407 causes the brake assembly 2403 to either move distally, squeezing the ball assembly 2401 against the seat of the socket assembly 2402, or proximally, releasing the braking force.

In the shoulder joint 1515, the motor 2407 is mounted in a housing that forms part of the scapular element 2408. In the hip joint 1516, the motor is mounted in the pelvic assembly 1519, which also incorporates the hip joint socket assembly 1516.

The use of a threaded connection between the brake assembly 2403 and the socket assembly 2402 results in a non-back-drivable braking system, such that power is only supplied to the motor during the transition between states. At all other times, the joint maintains its own state due to friction. This minimizes the power requirements for the joint.

Alternate embodiments to accomplish the functions of the shoulder and hip joints described above can include a threadless brake assembly 2403 driven by a pneumatic cylinder, a solenoid or other linear actuator, a system making use of a wedge that contacts an inner surface of the brake assembly 2403 that pushes it against the ball assembly 2401 (as in a photographic tripod bogen head), or other systems that may be conceived by one skilled in the art. Similarly, alternate rotary actuators can be employed to replace the motor 2407 described in the preferred embodiment.

Figure 25:
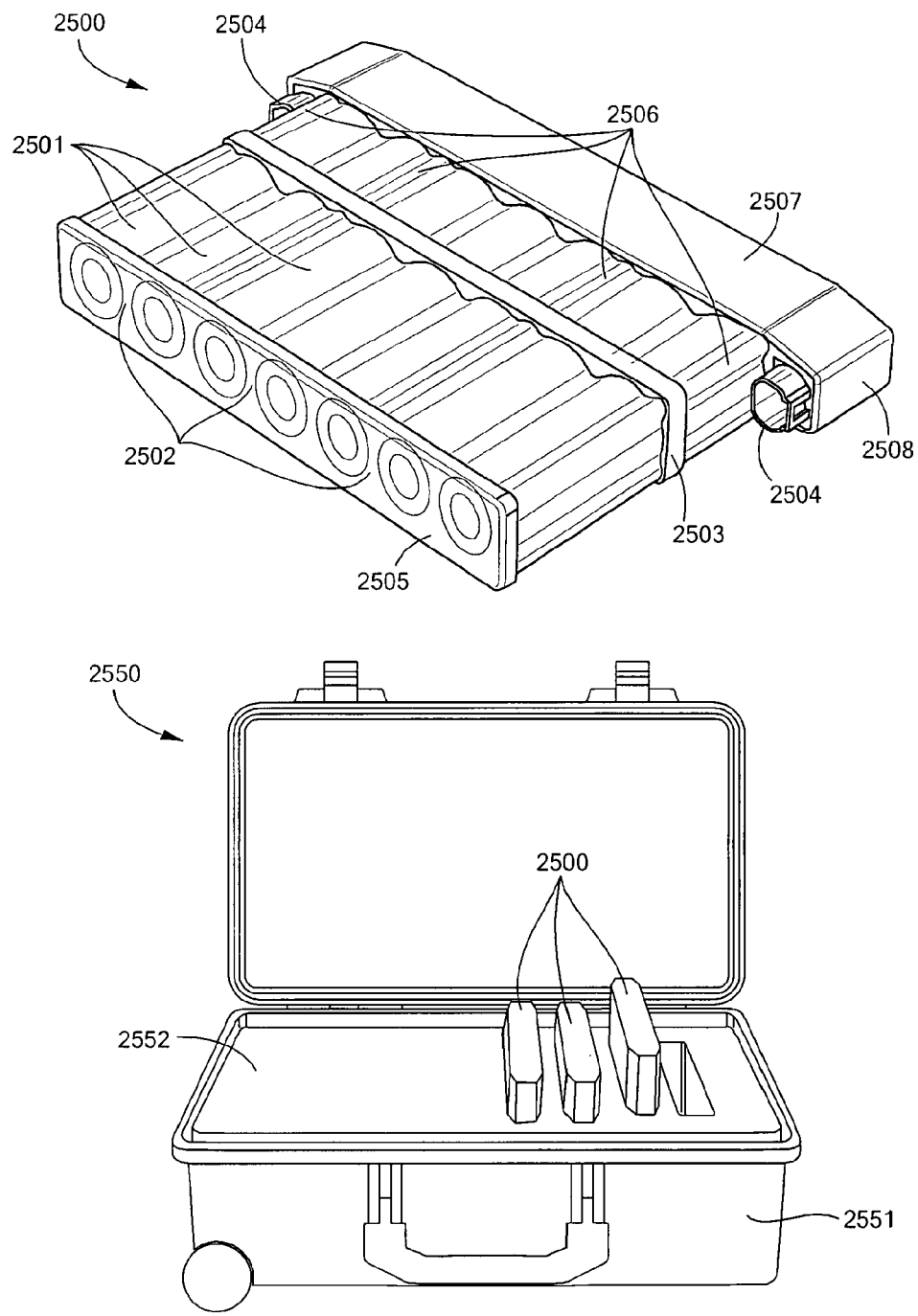
FIG. 25. is a pictorial representation of a battery pack including water resistant connectors and external waterproof encasement and a recharging system with battery packs fully and partially-inserted.

FIG. 25 shows one embodiment of a replaceable battery pack for the simulator comprising two sets of rechargeable cells 2501.

Each set of rechargeable cells 2501 is an arrangement of seven cells electrically in series, providing a nominal output voltage of 23.1 V, rated at 2.3 Ah. Flat conductors 2502 are welded between successive cells to provide the electrical connection. Two sets of cells are stacked vertically, separated by an insulating structure mid-pack insert 2503. Each set is connected via 18 gage (or similar) wire to a water resistant connector 2504, one at each end of the battery pack 2500.

Structural rigidity is provided by the arrangement of the aluminum base plate 1701, 1801, insulating plastic base insert 2505, a set of aluminum spacer rods 2506, the mid-pack insert 2503, an additional set of aluminum spacer rods 2506, a connector 2504 holder, and finally the insulating top insert 2507 and aluminum top plate 2508. The battery pack 2500 components are held together with machine screws. The water resistant connectors 2504 are held in place through the use of an epoxy adhesive or similar potting/bonding material, and the entire battery pack 2500 is coated in a continuous layer of waterproof plastic or rubber material, with the exception of the contact points within the connector 2504.

Alternate embodiments of the power system include the use of single sets of rechargeable cells (rather than the dual set described above), the use of a rigid waterproof shell (e.g. an injection molded part) rather than the system of separate structural and insulating members described, and other variations which may be found in similar replaceable power systems that exist in the prior art.

The battery packs 2500 will be held within the simulator by a hinged panel in the back of the simulator, which similarly restrains the blood simulant containers 1507, 1609. FIG. 25 shows a preferred embodiment of a recharging system 2550 for the simulator's battery packs 2500. This embodiment supports the charging of four battery packs 2500 simultaneously. One skilled in the art can easily conceive of variations to support the charging of more or fewer battery packs simultaneously.

It includes a water-resistant housing 2551, of a type similar to commercial Pelican cases, with the commercial foam insert in the lid of the case. In the body of the housing 2551 is a thermoformed panel 2552 which includes mating features to provide positive alignment for the battery packs 2500 and water resistant connectors 2504 at appropriate locations to mate with the connectors on the battery packs.

Adjacent to the sockets and mating features for the battery packs is an indicator panel which covers the charging circuitry, and includes indicator lights which show which battery packs 2500 are being charged and approximate charge level for charging packs. In addition, the panel 2552 includes a main power switch and power supply cables and storage space for said cables. The power supply cables include at least plugs to connect to 110 VAC power sources, and may include additional cables and connectors to connect to 12 VDC or 24 VDC vehicular power supplies.

The charging circuitry includes safety systems that include current limiting controls to avoid drawing excessive current from the power supply, internal cooling fans, temperature sensors to detect excessive internal temperatures (and reduce charging current or shut down the charging system as necessary).

The panel 2552 includes an interlock switch which disables charging when the lid is closed, to prevent overheating.

The panel 2552 further includes ventilation ports which are shielded to prevent water from splashing into the circuitry.

The panel 2552 further includes latches to retain each battery pack, and a spring-loaded ejection system to enable easy removal of the battery packs 2500 from the recharging system 2550.

Figure 26:
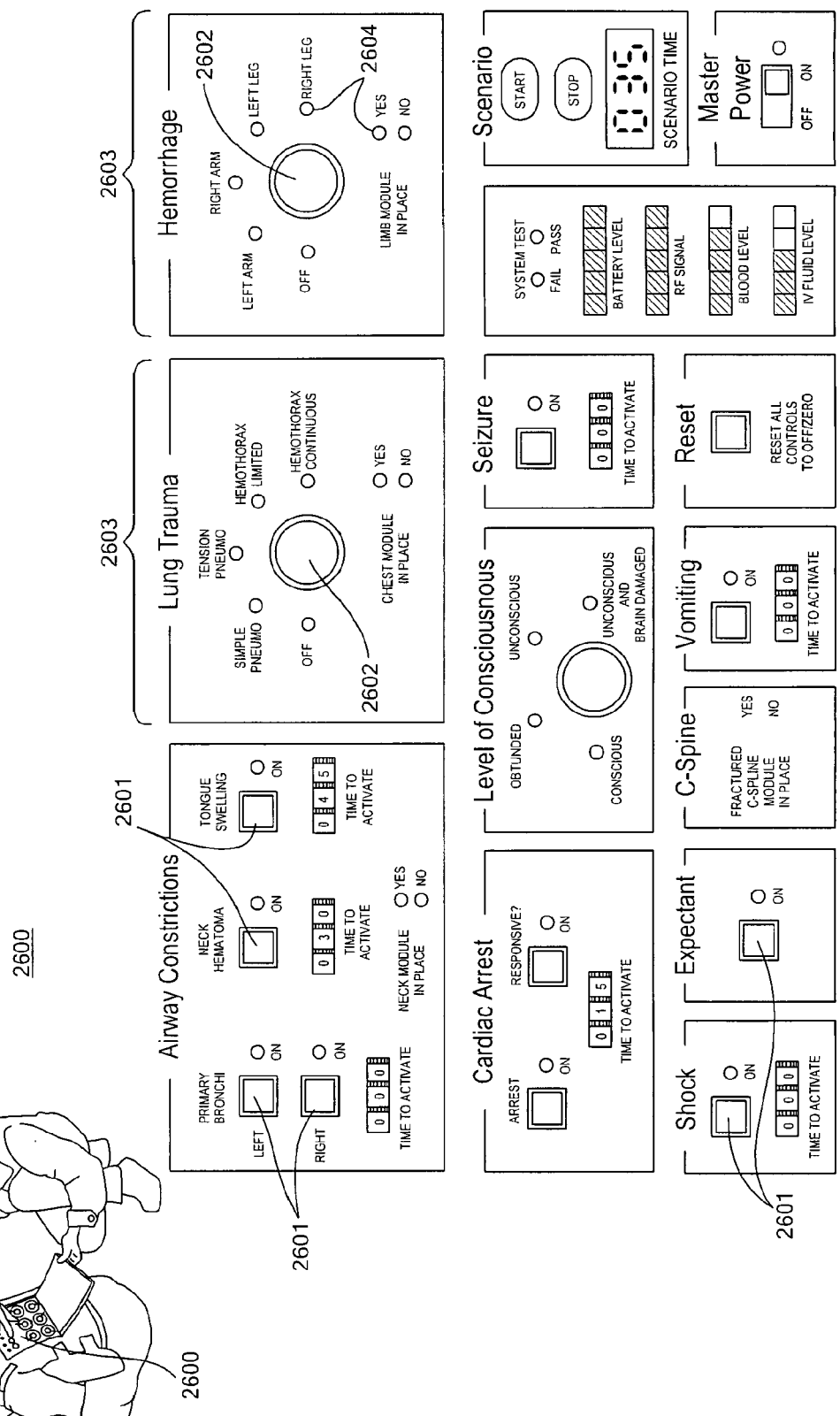
FIG. 26. is a schematic representation of a control panel.

FIG. 26 illustrates the tactile buttons 2601 and dials 2602 on the control panel 2600 which are intuitive to use and labeled to be self-explanatory. The use of stateless controls 2603 with separate LED indicators 2604 to show their position enables the entire panel 2600 to be reset electronically, or even remotely, without having to physically reset the switches.

It is understood that a wide variety of modifications and substitutions can be made without departing from the present invention. In addition, while the invention is primarily shown and described in conjunction with a human mannequin, other embodiments are contemplated in which other animal forms are used for veterinary training for example. Nominal form factors can be provided for horses, dogs, and other animals and pets.

While the invention is shown and described in conjunction with a particular embodiment having an illustrative architecture having certain components in a given order, it is understood that other embodiments well within the scope of the invention are contemplated having more and fewer components, having different types of components, and being coupled in various arrangements. Such embodiments will be readily apparent to one of ordinary skill in the art. All documents cited herein are incorporated herein by reference.

What is claimed is:

1. A medical training system, comprising:
    a human mannequin;
    a central processor in the mannequin, the processor being configured to receive input;
    a multidimensional lookup table stored in a memory, the multidimensional lookup table relating inputs from a plurality of sensors to outputs including cardinal physiological status values;
    a physiological modeling system coupled to the central processor to control physiological responses of the training system for simulating responses of a human to trauma, wherein the physiological modeling system includes a plurality of effectors, and the central processor is configured to:
        determine a current physiological state using a selected trauma sequence, and a time duration since an initiation of the selected trauma sequence,
        receive an input value from at least one of the plurality of sensors,
        interpret the input value using the multidimensional lookup table to determine a new physiological state, and
        use at least one of the plurality of effectors to generate a physiological response, wherein the physiological response is at least partially determined by the new physiological state and includes at least one of clenching a jaw of the human mannequin, modifying a tone of a muscle of the human mannequin, simulating signs of a tonic-clonic seizure, and rolling back a pair of eyes of the human mannequin; and
    wherein the human mannequin includes a support structure corresponding to a human skeleton, wherein the support structure articulates at joints including neck, cervical spine, lumbar spine, shoulders, elbows, wrists, hips, knees, and ankles, wherein the central processor is configured to modify a resistance of at least one of the joints of the support structure based upon the new physiological state.

2. The system according to claim 1, wherein the system is self-contained within the mannequin.

3. The system according to claim 1, wherein the system can operate autonomously outside of the line-of-sight of an operator or instructor.

4. The system according to claim 1, wherein the input value from the at least one of the plurality of sensors includes a total blood volume, an administered intravenous fluid volume, or a bronchial air flow rate.

5. The system according to claim 1, wherein the physiological response includes at least one of modifying a heart rate and modifying a blood pressure.

6. The system according to claim 1, wherein the multidimensional lookup table includes a representation of a nonlinear physiological system behavior.

7. The system according to claim 1, wherein the physiological modeling system includes a pulmonary system to generate clinical signs for enabling diagnosis of hemothorax, tension pneumothorax, or collapsed lung.

8. The system according to claim 1, wherein the mannequin simulates unconscious and conscious states.

9. The system according to claim 1, wherein the neck joint includes at least one stiffening rod, the at least one stiffening rod being selectively insertable through at least one cervical disk connected to the neck joint to control a stiffness of the neck joint.

10. The system according to claim 9, wherein the neck joint includes at least two air muscles, and a movement of the neck joint is achieved by selectively actuating at least one of the at least two air muscles.

11. The system according to claim 1, wherein the physiological modeling system includes a hemorrhage system configured to simulate pulsatile arterial blood flow, bone marrow seepage, or soft tissue bleeding.

12. The system according to claim 1, wherein the plurality of sensors includes a sensor to measure fluid input from a intravenous fluid input.

13. The system according to claim 12, further including a module to determine hemodilution.

14. The system according to claim 1, wherein the physiological responses includes vital signs including heart rate, heart rhythm, respiratory rate, respiratory depth, systolic blood pressure, diastolic blood pressure, and level of consciousness.

15. The system according to claim 1, further including medic RF-ID capability, GPS coordinate functionality, and time-of-day stamping.

16. The system according to claim 1, wherein the physiological modeling system includes a venous system configured to receive an intravenous (IV) fluid to which the system responds based upon the amount or type of IV fluid.

17. A medical training system, comprising:
a human mannequin including a support structure corresponding to a human skeleton;
a central processor in the mannequin, the processor being configured to receive input from a plurality of sensors;
a physiological modeling system coupled to the central processor to control physiological responses of the training system, the physiological modeling system being configured to:
determine a current physiological state,
receive an input value from at least one of the plurality of sensors,
interpret an input value from a sensor to determine a new physiological state, and
modify a resistance of at least one of a plurality of joints of the support structure based upon the new physiological state to simulate at least one of a generalized seizure and body stiffening.

18. The system according to claim 17, wherein the support structure includes a neck joint, and the neck joint includes at least one stiffening rod, the at least one stiffening rod being selectively insertable through at least one cervical disk connected to the neck joint to control a stiffness of the neck joint.

19. The system according to claim 17, wherein the support structure includes a neck joint, and the neck joint includes at least two air muscles, and a movement of the neck joint is achieved by selectively actuating at least one of the at least two air muscles.

20. A method of providing medical training using a human mannequin, comprising:
determining a current physiological state using a selected trauma sequence, and a time duration since an initiation of the selected trauma sequence;
receiving an input value from at least one of a plurality of sensors connected to the human mannequin;
interpreting the input value using a multidimensional lookup table to determine a new physiological state, the multidimensional lookup table relating inputs from a plurality of sensors to outputs including cardinal physiological status values; and
using at least one of the plurality of effectors connected to the human mannequin to generate a physiological response, wherein the physiological response is at least partially determined by the new physiological state.

21. The method of claim 20, including modifying a resistance of at least one of a plurality of joints of a support structure of the human mannequin based upon the new physiological state.

22. The system according to claim 1, further comprising an integrated teaching system coupled to the physiological modeling system, wherein the integrated teaching system is configured to:
receive the physiological responses and the inputs from the plurality of sensors; and
determine whether appropriate medical interventions are being performed by an operator interacting with the human mannequin based on the physiological responses and the inputs from the plurality of sensors.

23. The system according to claim 22, wherein the integrated teaching system is further configured to provide performance feedback and teaching content to the operator.

24. The system according to claim 23, wherein the integrated teaching system is further configured to modify the selected trauma sequence and the performance feedback based on a skill level of the operator.

25. The system according to claim 24, wherein the integrated teaching system is further configured to determine the skill level of the operator by receiving data from an identification tag carried by the operator.

* * * * *

UNITED STATES PATENT AND TRADEMARK OFFICE
CERTIFICATE OF CORRECTION

| | | |
|---|---|---|
| PATENT NO. | : 8,382,485 B2 | Page 1 of 1 |
| APPLICATION NO. | : 12/067260 | |
| DATED | : February 26, 2013 | |
| INVENTOR(S) | : Ryan Scott Bardsley | |

It is certified that error appears in the above-identified patent and that said Letters Patent is hereby corrected as shown below:

In the Specifications:

Column 8, Line 49, "Imiplement" should be -- Implement --.

Column 21, Line 7, "colmectors" should be -- connectors --.

Column 26, Line 13, "rhytlumic" should be -- rhythmic --.

Column 27, Line 33, "tlrough" should be -- through --.

Column 29, Line 13, "tliree" should be -- three --.

Column 29, Line 25, "points" should be -- (joints --.

Column 29, Line 45, "teclmologies" should be -- technologies --.

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,382,485 B2  
APPLICATION NO. : 12/067260  
DATED : February 26, 2013  
INVENTOR(S) : Bardsley et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this
First Day of September, 2015

Michelle K. Lee
*Director of the United States Patent and Trademark Office*